US010453142B2

(12) United States Patent
Mun

(10) Patent No.: US 10,453,142 B2
(45) Date of Patent: Oct. 22, 2019

(54) SYSTEM AND METHOD FOR MODELING AND QUANTIFYING REGULATORY CAPITAL, KEY RISK INDICATORS, PROBABILITY OF DEFAULT, EXPOSURE AT DEFAULT, LOSS GIVEN DEFAULT, LIQUIDITY RATIOS, AND VALUE AT RISK, WITHIN THE AREAS OF ASSET LIABILITY MANAGEMENT, CREDIT RISK, MARKET RISK, OPERATIONAL RISK, AND LIQUIDITY RISK FOR BANKS

(71) Applicant: Johnathan Mun, Dublin, CA (US)

(72) Inventor: Johnathan Mun, Dublin, CA (US)

( * ) Notice: Subject to any disclaimer, the term of this patent is extended or adjusted under 35 U.S.C. 154(b) by 175 days.

(21) Appl. No.: 14/547,225

(22) Filed: Nov. 19, 2014

(65) Prior Publication Data
US 2015/0088783 A1    Mar. 26, 2015

Related U.S. Application Data

(63) Continuation-in-part of application No. 14/211,112, filed on Mar. 14, 2014, now Pat. No. 9,811,794, which is a continuation-in-part of application No. 13/719,203, filed on Dec. 18, 2012, now Pat. No. 8,892,409, which is a continuation-in-part of application No. 12/378,174, filed on Feb. 11, 2009, now abandoned.

(51) Int. Cl.
| | |
|---|---|
| G06F 17/10 | (2006.01) |
| G06Q 40/06 | (2012.01) |
| G06Q 10/04 | (2012.01) |
| G06Q 10/06 | (2012.01) |
| G06Q 40/02 | (2012.01) |
| G06Q 40/08 | (2012.01) |

(52) U.S. Cl.
CPC ............ *G06Q 40/06* (2013.01); *G06Q 10/04* (2013.01); *G06Q 10/0635* (2013.01); *G06Q 40/02* (2013.01); *G06Q 40/08* (2013.01)

(58) Field of Classification Search
CPC ..................................................... G06Q 40/06
USPC .......................................................... 703/2
See application file for complete search history.

(56) References Cited

U.S. PATENT DOCUMENTS

2004/0015376 A1*   1/2004   Zhu et al. ..................... 705/7

OTHER PUBLICATIONS

Mun (inventor: book): Modeling Risk, Applying Monte Carlo Simulation, Real Options Analysis, Forecasting, and Optimization Techniques; John Wiley & Sons, Inc.; Sample chapters: Introduction Chapter 2 (to p. 43); 2006; 63 pages.*

(Continued)

*Primary Examiner* — Hugh M Jones
(74) *Attorney, Agent, or Firm* — Ellenoff Grossman & Schole LLP; James M. Smedley, Esq.

(57) ABSTRACT

The present invention is in the field of modeling and quantifying Regulatory Capital, Key Risk Indicators, Probability of Default, Exposure at Default, Loss Given Default, Liquidity Ratios, and Value at Risk, using quantitative models, Monte Carlo risk simulations, credit models, and business statistics, and relates to the modeling and analysis of Asset Liability Management, Credit Risk, Market Risk, Operational Risk, and Liquidity Risk for banks or financial institutions, allowing these firms to properly identify, assess, quantify, value, diversify, hedge, and generate periodic regulatory reports for supervisory authorities and Central Banks on their credit, market, and operational risk areas.

13 Claims, 41 Drawing Sheets

(56) References Cited

OTHER PUBLICATIONS

Mun (inventor: book): Modeling Risk, Applying Monte Carlo Simulation, Real Options Analysis, Forecasting, and Optimization Techniques; John Wiley & Sons, Inc.; 2006; pp. 1-5 (excerpts from pages in book cited above "u").*

Mun et al.: (Inventor): Quantitative Risk Analysis for Actuaries; Sample Case Applications of Monte Carlo Simulation, Real Options Analysis, Stochastic Forecasting, and Portfolio Optimization; tutorial "based on his two latest books, "Modeling Risk," (Wiley 2006) and "Real Options Analysis, Second Edition," (Wiley 2005)"; 2006; 23 pages.*

* cited by examiner

FIGURE 4

PEAT: ALM, CREDIT, MARKET, OPERATIONAL, LIQUIDITY RISK

| Credit Risk (ERC) | Market Risk | Asset Liability Management | Analytical Models | Advanced Analytics | Operational Risk |

Global Settings | Results

STEP 1: Start by setting up the types of credit loans.

Show: [10] categories

| Loan ID | Category Name | Loss Given Default (LGD) % | Basel Credit Type |
|---|---|---|---|
| 1 | | | Select... ⌄ |
| 2 | | | Select... ⌄ |
| 3 | | | Select... ⌄ |
| 4 | | | Select... ⌄ |
| 5 | | | Select... ⌄ |
| 6 | | | Select... ⌄ |
| 7 | | | Select... ⌄ |
| 8 | | | Select... ⌄ |
| 9 | | | Select... ⌄ |
| 10 | | | Select... ⌄ |

STEP 2: Continue by selecting how to enter your credit data.
- ● Manually enter summary default data
- ○ Paste data into a grid to run default analysis
- ○ Upload data from text files or Excel files for default analysis

[Open Database]  ☐ Data in multiple files

| Column 1 |
| Column 2 |          Date
| Column 3 |          Customer ID (Optional)
| Column 4 |  << MAP >>   Customer Name (Optional)
| Column 5 |          Product Segment
| Column 6 |  [Delete]    Central Bank Rating
|          |          Product Type Mapped Connections:
Column A is mapped to Required Variable X
Column B is mapped to Required Variable Y
Column C is mapped to Required Variable Z

STEP 3: Probability of Default (PD), Exposure at Default (EAD), and Value at Risk (VaR) settings.

Credit VaR Percentile (%): 99.90%
Average Commercial Loans Maturity (Years): 5
Run the PD Analysis from Year [2010] to [2013]
Run the EAD Analysis [Monthly ⌄] for the last [1] periods
Date Type in Data File [YYYY/MM/DD ⌄]
Central Bank Rating. Select the ratings that indicate Default: 1☐ 2☐ 3■ 4■ 5■   ☐ Custom:

STEP 4: Save the Models and Data:
You can save multiple analyses and notes in the profile for future retrieval.
● Save Settings Only   ○ Save Settings and Analysis Results Name: [                    ]
Notes: [                    ]

[New]       Name of Saved Data and Model 1
[Save As]   Name of Saved Data and Model 2
[Edit]      Name of Saved Data and Model 3
[Delete]    Name of Saved Data and Model 4
[Save]      Name of Saved Data and Model 5
            Name of Saved Data and Model 6
            ◁▷

FIGURE 6

PEAT: ALM, CREDIT, MARKET, OPERATIONAL, LIQUIDITY RISK

| Credit Risk (ERC) | Market Risk | Asset Liability Management | Analytical Models | Advanced Analytics | Operational Risk |

Value at Risk | Central Bank VaR | Results Visual

Market Data

- Number of Investment Assets:
- Number of Currency Assets:
- Historical Data Rows:
- Value at Risk Percentile:
- Value at Risk Percentile:

Select a Volatility Method: Standard Volatility
Select a Date Type: MM/DD/YYYY

Name of Dataset:
Notes:

[New] [Edit] [Save] [Del]   Save As

List of Saved Datasets:
- Saved Dataset A
- Saved Dataset B
- Saved Dataset C
- Saved Dataset D
- Saved Dataset E Investment

| No. | Dates | Asset 1 | Asset 2 | ... | Asset (N) | Currency 1 | Currency 2 | ... | Currency (N) |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| ... | | | | | | | | | |
| ... | | | | | | | | | |
| 498 | | | | | | | | | |
| 499 | | | | | | | | | |
| 500 | | | | | | | | | |

PEAT: ALM, CREDIT, MARKET, OPERATIONAL, LIQUIDITY RISK

| Credit Risk (ERC) | Market Risk | Asset Liability Management | Analytical Models | Advanced Analytics | Operational Risk |

- Interest Rate Risk
- Liquidity Risk — 090

| Input Assumptions | Scenario Analysis | Stress Testing | Gap Analysis | Charts |

Select the analysis Dataset: — 092
[ List of Saved Datasets ▼ ]

● Enter scenarios using % change
○ Enter scenarios using actual values

Add Scenarios:
[                    ]

List of Saved Scenarios: — 093      [ Save As ]

Scenario 1
Scenario 2
Scenario 3
Scenario 4
Scenario 5

[ New ] [ Edit ] [ Save ] [ Del ]

ASSETS — 091

| Month | Month 1 | Month 2 | ... | Month 11 | Month 12 |
|---|---|---|---|---|---|
| LOANS | | | | | |
| [Linked from Input Assumptions] | | | | | |
| [Linked from Input Assumptions] | | | | | |
| [Linked from Input Assumptions] | | | | | |
| [Linked from Input Assumptions] | | | | | |
| [Linked from Input Assumptions] | | | | | |
| [Linked from Input Assumptions] | | | | | |

LIABILITIES — 091

| Month | Month 1 | Month 2 | ... | Month 11 | Month 12 |
|---|---|---|---|---|---|
| REGULAR DEPOSITS | | | | | |
| [Linked from Input Assumptions] | | | | | |
| [Linked from Input Assumptions] | | | | | |
| TIME DEPOSITS | | | | | |
| [Linked from Input Assumptions] | | | | | |
| [Linked from Input Assumptions] | | | | | |

FIGURE 19

PEAT: ALM, CREDIT, MARKET, OPERATIONAL, LIQUIDITY RISK

| Credit Risk (ERC) | Market Risk | Analytical Models | Advanced Analytics | Operational Risk |

| Interest Rate Risk | Liquidity Risk |

| Input Assumptions | Scenario Analysis | Stress Testing | Gap Analysis | Charts |

Select the analysis Dataset: [ List of Saved Datasets ▶ ]

● Enter stress test using % change   ○ Enter stress test using actual values

Add Stress Tests:

[                            ] Save As

List of Saved Datasets:
- Saved Dataset A
- Saved Dataset B
- Saved Dataset C
- Saved Dataset D
- Saved Dataset E

[ New ] [ Edit ] [ Save ] [ Del ]

◀ ▶

| LIABILITIES | Balances | Month 1 | Month 2 | ... | Month 12 |
|---|---|---|---|---|---|
| Month | | | | | |
| REGULAR DEPOSITS | | | | | |
| [Linked from Input Assumptions] | | | | | |
| [Linked from Input Assumptions] | | | | | |
| TIME DEPOSITS | | | | | |
| [Linked from Input Assumptions] | | | | | |
| [Linked from Input Assumptions] | | | | | |

PEAT: ALM, CREDIT, MARKET, OPERATIONAL, LIQUIDITY RISK

| Credit Risk (ERC) | Market Risk | Asset Liability Management | Analytical Models | Advanced Analytics | Operational Risk |

| KRI Dashboard | Scenarios | Risk Simulation | Historical Bootstrap | VaR Optimization | Extreme Values | Yield Curves | Data Prep |

Select a probability distribution to compute or keep the default:

Generalized Pareto ▼

Input 1:
Input 2:
Input 3:

RUN

Alternatively, copy/paste historical events data and perform a distributional data fitting to find the best-fitting distribution Data Fitting...

Selected distribution's parameters:
Input 1: X   Input 2: Y   Input 3: Z

| Distribution | | P-Value of Fit | |
|---|---|---|---|
| | | | |
| | | | |
| | | | |

Save the model if desired:

NAME

List of Saved Analyses:
Saved Analysis A
Saved Analysis B
Saved Analysis C
Saved Analysis D
Saved Analysis E Edit | Save | Save As | Delete Simulated Value at Risk
VaR Percentiles: ___ %
Simulated VaR: ___ %

Mean
Median
Stdev
Variance
Skew
Kurtosis
Minimum
Maximum
Range
25% Percentile
75% Percentile Probability Distribution 176 — KRI Dashboard
177 — Generalized Pareto
178 — Input 1/2/3
179 — RUN
184 —
180 — Simulated Value at Risk
181 — Statistics
182 — Probability Distribution
183 — Data Fitting
185 — List of Saved Analyses

SYSTEM AND METHOD FOR MODELING AND QUANTIFYING REGULATORY CAPITAL, KEY RISK INDICATORS, PROBABILITY OF DEFAULT, EXPOSURE AT DEFAULT, LOSS GIVEN DEFAULT, LIQUIDITY RATIOS, AND VALUE AT RISK, WITHIN THE AREAS OF ASSET LIABILITY MANAGEMENT, CREDIT RISK, MARKET RISK, OPERATIONAL RISK, AND LIQUIDITY RISK FOR BANKS

CROSS REFERENCE TO RELATED APPLICATIONS

The application is a continuation-in-part of U.S. Non-Provisional Utility patent application Ser. No. 14/211,112 filed Mar. 14, 2014, which is a continuation-in-part of U.S. Non-Provisional Utility patent application Ser. No. 13/719,203, which was filed Dec. 18, 2012, which is a continuation-in-part of U.S. Non-Provisional Utility patent application Ser. No. 12/378,174, which was filed Feb. 11, 2009, each of which is incorporated by reference herein.

FIELD OF THE INVENTION

The present invention is in the field of modeling and quantifying Regulatory Capital, Key Risk Indicators, Probability of Default, Exposure at Default, Loss Given Default, Liquidity Ratios, and Value at Risk, using quantitative models, Monte Carlo risk simulations, credit models, and business statistics, and relates to the modeling and analysis of Asset Liability Management, Credit Risk, Market Risk, Operational Risk, and Liquidity Risk for banks and financial institutions, allowing these firms to properly identify, assess, quantify, value, diversify, hedge, and generate periodic regulatory reports for supervisory authorities and Central Banks on their credit, market, and operational risk areas, as well as for internal risk audits, risk controls, and risk management purposes.

COPYRIGHT AND TRADEMARK NOTICE

A portion of the disclosure of this patent document contains materials subject to copyright and trademark protection. The copyright and trademark owner has no objection to the facsimile reproduction by anyone of the patent document or the patent disclosure as it appears in the U.S. Patent and Trademark Office patent files or records, but otherwise reserves all copyrights whatsoever.

BACKGROUND OF INVENTION

In today's competitive global banking and financial economy, banks and financial institutions are faced with many difficult credit lending and market investment decisions, coupled with regulatory requirements. These decisions include determining returns and risks of market investments, riskiness of credit loads and debt, and determining asset and liability portfolio mix strategies. Such decisions might involve thousands or millions of potential alternatives and simulated results. Manually considering and evaluating each of them would be impractical or even impossible. A model can provide valuable assistance in incorporating relevant variables when analyzing decisions and in finding the best solutions for making decisions. Models capture the most important features of a problem and present them in a form that is easy to interpret. Additionally, models can often provide insights that intuition alone cannot.

Currently available methods require the user to understand advanced statistics, financial modeling, structural credit and market models, and mathematics in order to know what analysis to run on some existing data or to have the ability to interpret the raw numerical results. Furthermore, currently available methods do not automatically run the relevant analyses in an integrated fashion nor do they provide detailed descriptions in their reports coupled with the numerical results and charts for easy interpretation.

Therefore, there is need in the art for a system and method that can automatically run an intelligent set of statistical and analytical tests and compile those tests into an easily interpreted set of key risk indicator (KRI) reports and charts. These and other features and advantages of the present invention will be explained and will become obvious to one skilled in the art through the summary of the invention that follows.

SUMMARY OF THE INVENTION

Accordingly, it is an aspect of the present invention to provide a system and method encapsulated within Project Economics Analysis Tool (PEAT) software that incorporates advanced analytical techniques and algorithms (credit risk models, market risk models, operational risk models, liquidity analysis, Monte Carlo risk simulation, stochastic and predictive forecasting, business statistics, business intelligence, decision analysis, optimization, flexibility analysis, and strategic real options techniques, providing a novel way to analyze a user's existing set of input assumptions to extract valuable and important information) and compiles them in a unique and novel way to facilitate credit, market, liquidity, operational, and business risk analysis through an intelligent set of statistical and analytical tests of a user's existing set of input assumptions to analyze and extract valuable information that otherwise cannot be obtained manually.

According to an embodiment of the present invention, a computer-implemented system is used to model and quantify Regulatory Capital, Key Risk Indicators, Probability of Default, Exposure at Default, Loss Given Default, Liquidity Ratios, and Value at Risk, using quantitative models, Monte Carlo risk simulations, credit models, and business statistics, and relates to the modeling and analysis of Asset Liability Management, Credit Risk, Market Risk, Operational Risk, and Liquidity Risk for banks or financial institutions, allowing these firms to properly identify, assess, quantify, value, diversify, hedge, and generate periodic regulatory reports for supervisory authorities and Central Banks on their credit, market, and operational risk areas, as well as for internal risk audits, risk controls, and risk management purposes.

These models are both based on proprietary models as well as those required by Basel I, Basel II, and Basel III. These Basel Accords are global, voluntary regulatory standards on banks' capital adequacy, stress testing, and market liquidity risk.

According to an embodiment of the present invention, a computer-implemented system for qualitative and quantitative modeling and analysis of Asset Liability Management (ALM), as well as Credit Risk, Market Risk, Operational Risk, and Liquidity Risk (CMOL) comprising a processor and an ALM-CMOL analytics module consisting of computer-executable instructions stored in nonvolatile memory, wherein said processor and said ALM-CMOL analytics module are operably connected and configured to provide a user interface to a user, wherein said user interface is a database of historical assets, liabilities, returns, risks, valuation, foreign exchange rates, and interest rates that allows said user to organize and manage one or more historical data elements; receive historical performance input from said user, wherein said historical performance input is comprised of said one or more balance sheets, assets, liabilities, foreign exchange instruments, interest-sensitive investment instruments, historical stock prices and market returns on investment vehicles, where data elements entered by said user are selected from a group of assets, liabilities, and currencies that are interest rate-sensitive comprising historical performance data; analyze said historical performance input, wherein a risk-based performance management and analysis is performed on each of said one or more historical performance data elements; create historical performance and risk-based historical analysis charts, wherein one or more graphs are generated based on said risk-based historical performance management and analysis of each of said one or more historical performance data elements; analyze historical- and risk-level trends of said one or more historical performance data elements, wherein patterns of change in historical and risk levels for said one or more historical performance data elements can be plotted over time; forecast changes in said historical and risk levels of said one or more historical performance data elements, wherein said historical- and risk-level trends are evaluated to provide a predictive analysis of future, historical- and risk-level change of said one or more historical performance data elements via stress testing, scenario analysis, historical simulation, and analytical Monte Carlo risk simulation; compute the required Economic Regulatory Capital (ERC) as prescribed by the three Basel Accords in accordance with the different credit types (credit issues such as loans, credit lines, and debt at the commercial, retail, or personal levels); compute, return, recommend, and report on one or more risk-based results and Key Risk Indicators (KRI) such as Value at Risk (VaR), Loss Given Default (LGD), Exposure at Default (EAD), Economic Capital (EC), and Economic Regulatory Capital (ERC) based on said historical performance and on stress-tested, scenario-driven, and simulated future state of events; and create a repository of historical and forward-looking KRI metrics and results.

According to an embodiment of the present invention, the system is further comprised of a communications means operably connected to said processor and said ALM-CMOL analytics module.

According to an embodiment of the present invention, the one or more historical asset and liability performance data elements can be segmented and managed according to one or more of the following: (i) by risk type (asset-liability, credit, market, operational, liquidity, and interest rate sensitive risks) and (ii) by period (daily, monthly, quarterly, annually, and other custom periodicities). These historical data can also be entered as standard balance sheets and income statements, and the present invention's data preparation tool can automatically segment and compute the required inputs that go into the various credit risk, market risk, liquidity risk, and interest rate risk models.

According to an embodiment of the present invention, the one or more graphs are selected from the group of graphs comprising bar graphs, heat map matrixes, Pareto charts, scenario tables, tornado charts, control charts, time-series charts, risk-simulated probability histogram charts, and pie charts.

According to an embodiment of the present invention, each of said heat map matrixes is a Key Risk Indicator (KRI) heat map that is color coded to detail a plurality of historical performance levels, as well as plotted in time-series charts to show said KRI levels over time. These KRI heat maps are organized by risk types and periodicity based on said plurality of historical performance levels as well as on stress-tested, scenario-based, simulated future forecast levels.

According to an embodiment of the present invention, the ALM-CMOL analytics module and said processor are further configured to perform historical performance mapping to reveal how each of said one or more historical performance data elements affects each risk type.

According to an embodiment of the present invention, the ALM-CMOL analytics module and the processor are further configured to perform Monte Carlo risk simulations using historical performance data, historical simulation, bootstrapping of historical simulations, future forecasts, management assumptions, scenario analyses, and stress testing under various conditions (from basic market fluctuations to a full-blown market and economic meltdown) to determine the economic and regulatory capital requirements under the Basel I, II, and III accords, and investment assets are put into a portfolio where investment allocation weights can be optimized to generate the highest returns subject to the least amount of risk while minimizing the Value at Risk (VaR) of the portfolio. Further, extreme value theory is applied with Monte Carlo risk simulations to obtain empirical VaR results based on simulating the occurrence of extreme events in the market, where assumptions of said extreme and catastrophic events can be entered or historical market data of such events can be used to fit to the appropriate extreme event probability distributions. Fluctuations in interest rates by modeling interest rate yield curves, including simple basis point or percentage increases and decreases, as well as complex twists and turns of the yield curve's shapes, can be modeled, and effects of said fluctuations can be modeled.

According to an embodiment of the present invention, the ALM-CMOL analytics module and the processor are further configured to capture, model, and report on operational risks within the organization. Such operational risks are defined as all risks other than credit, market, liquidity, interest rate, business, and reputational risks, such as the risks within the realms of litigation, security, reputation, fraud, IT, staffing, human resources, development, and so forth, where the occurrence of risk events can be entered and captured, then sorted and reported as time-dependent, period-specific, risk-type and risk-segment specific (by department, by division, by time period), where said historical operational risk events are charted as control charts to see if any specific risk events are in- or out-of-control, as well as to predict the exact probability of occurrence using various probability distributions' probability density functions and cumulative distribution functions. In addition, historical operational risk loss data are fitted to probability distributions specific to severity or financial impact, and frequency or likelihood of occurrence. Said distributions are then Monte Carlo risk simulated to generate the probabilistic loss distributions (severity multiplied by frequency) to determine the expected simulated losses based on Value at Risk percentiles (e.g., 99.90%), using distributional fitting routines as well as force-fitting to extreme value distributions to examine the extreme tails of the risk event distributions.

According to an embodiment of the present invention, the ALM-CMOL analytics module is a network-based module for basic inputs by end users.

According to an embodiment of the present invention, the ALM-CMOL analytics module is a local module for administrative use.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 4 illustrates the PEAT utility's ALM-CMOL module for Credit Risk: Economic Regulatory Capital's (ERC) Global Settings tab.

FIG. 6 illustrates the PEAT utility's ALM-CMOL module for Market Risk where Market Data is entered.

FIG. 8 illustrates the Central Bank's method and results in computing Value at Risk (VaR) based on historical asset data.

FIG. 18 illustrates the Liquidity Risk's Scenario Analysis inputs tab on testing interest rate sensitive assets and liabilities.

FIG. 19 illustrates the Liquidity Risk's Stress Testing inputs tab on testing interest rate sensitive assets and liabilities.

FIG. 32 illustrates the Extreme Values analysis tab.

DETAILED DESCRIPTION OF THE INVENTION

The present invention is in the field of modeling and quantifying Regulatory Capital, Key Risk Indicators, Probability of Default, Exposure at Default, Loss Given Default, Liquidity Ratios, and Value at Risk, using quantitative models, Monte Carlo risk simulations, credit models, and business statistics, and relates to the modeling and analysis of Asset Liability Management, Credit Risk, Market Risk, Liquidity Risk, and Operational Risk for banks or financial institutions, allowing these firms to properly identify, assess, quantify, value, diversify, hedge, and generate regulatory reports for supervisory authorities and Central Banks on their credit, market, and operational risk areas, as well as for internal risk audits, risk controls, and risk management purposes.

According to a preferred embodiment of the present invention, the systems and methods described herein are for the analysis modeling and analysis of Asset Liability Management, Credit Risk, Market Risk, Liquidity Risk, and Operational Risk for banks or financial institutions. One of ordinary skill in the art would appreciate that the methodologies described herein may be applied to wide array of different fields, and embodiments of the present invention are contemplated for use in any such field.

According to an embodiment of the present invention, the computer-implemented system and methods herein described may comprise one or more separate and individually executable applications.

Figure 1:
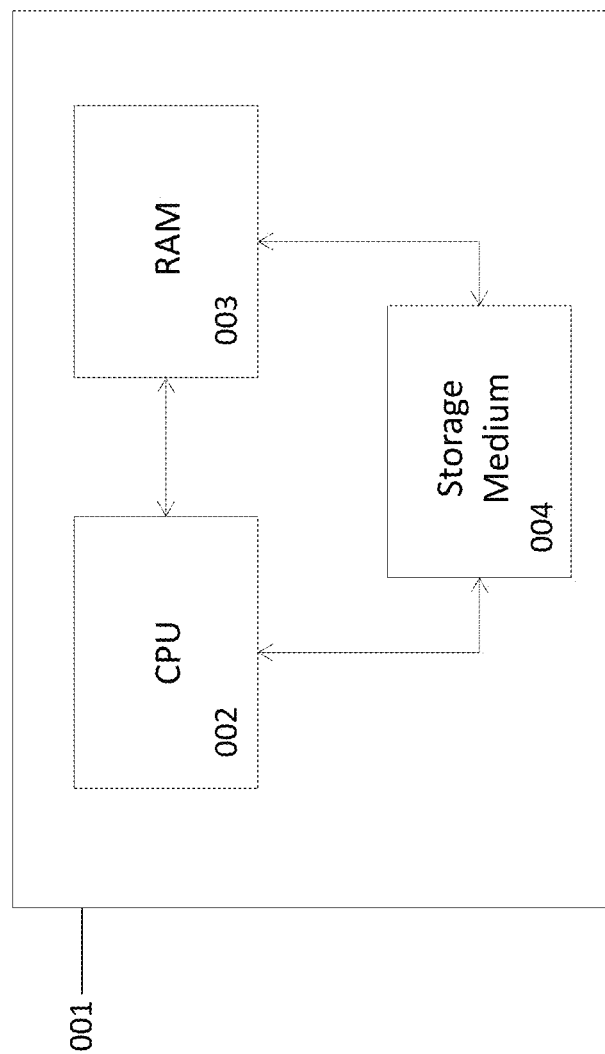
FIG. 1 illustrates a schematic overview of a computing device.

According to an embodiment of the present invention, the system and method are accomplished through the use of one or more computing devices. As shown in FIG. 1, one of ordinary skill in the art would appreciate that a computing device 001 appropriate for use with embodiments of the present application may generally comprise one or more central processing units (CPU) 002, random access memory (RAM) 003, and a storage medium (e.g., hard disk drive, solid state drive, flash memory, cloud storage) 004. Examples of computing devices usable with embodiments of the present invention include, but are not limited to, personal computers, smartphones, laptops, mobile computing devices, tablet PCs, and servers. The term "computing device" may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system, and provided by the system to users of the system across local area networks (LANs, e.g., office networks, home networks) or wide area networks (WANs, e.g., the Internet). In accordance with the previous embodiment, the system may comprise numerous servers communicatively connected across one or more LANs and/or WANs. One of ordinary skill in the art would appreciate that there are numerous manners in which the system could be configured, and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network; however, a user may be able to compose data offline that will be consumed by the system when the user is later connected to a network.

Figure 2:
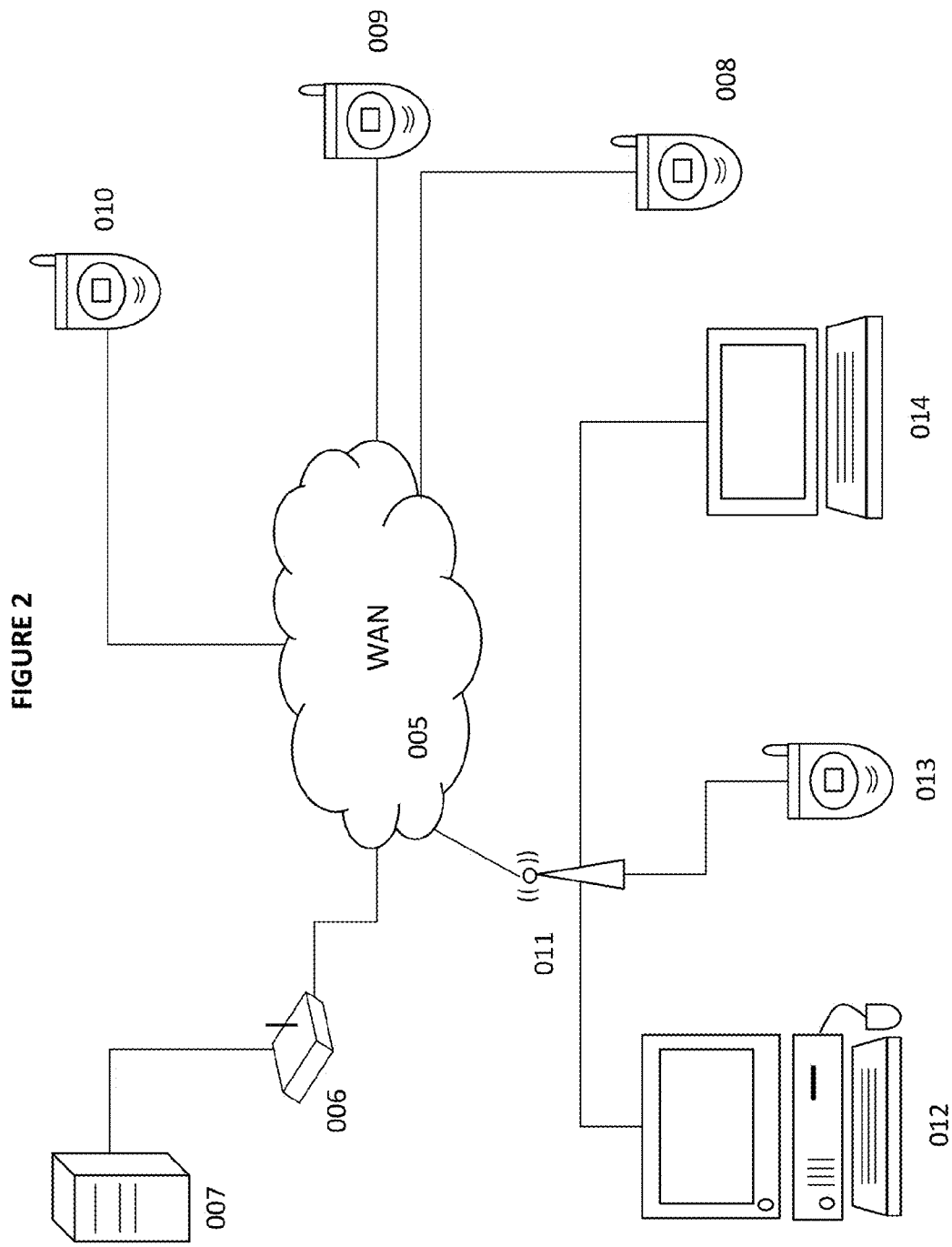
FIG. 2 illustrates a network schematic of a system.

Referring to FIG. 2, a schematic overview of a system in accordance with an embodiment of the present invention is shown. The system consists of one or more application servers 007 for electronically storing information used by the system. Applications in the application server 007 may retrieve and manipulate information in storage devices and exchange information through a WAN 005 (e.g., the Internet). Applications in a server 007 may also be used to manipulate information stored remotely and to process and analyze data stored remotely across a WAN 005 (e.g., the Internet).

According to an exemplary embodiment of the present invention, as shown in FIG. 2, exchange of information through the WAN 005 or other network may occur through one or more high-speed connections. In some cases, high-speed connections may be over-the-air (OTA), passed through networked systems, directly connected to one or more WANs 005, or directed through one or more routers 006. Routers 006 are completely optional, and other embodiments in accordance with the present invention may or may not utilize one or more routers 006. One of ordinary skill in the art would appreciate that there are numerous ways a server 007 may connect to a WAN 005 for the exchange of information, and embodiments of the present invention are contemplated for use with any method for connecting to networks for the purpose of exchanging information. Further, while this application refers to high-speed connections, embodiments of the present invention may be utilized with connections of any speed.

According to an embodiment of the present invention, components of the system may connect to a server 007 via a WAN 005 or other network in numerous ways. For instance, a component may connect to the system (i) through a computing device 008, 009, 010 directly connected to the WAN 005; (ii) through a computing device 007 connected to the WAN 005 through a routing device 006; (iii) through a computing device 012, 013, 014 connected to a wireless access point 011; or (iv) through a computing device 011 via a wireless connection (e.g., CDMA, GMS, 3G, 4G) to the WAN 005. One of ordinary skill in the art would appreciate that there are numerous ways that a component may connect to a server 007 via a WAN 005 or other network, and embodiments of the present invention are contemplated for use with any method for connecting to a server 007 via a WAN 005 or other network. Furthermore, a server 007 could be a personal computing device, such as a smartphone, tablet PC, or laptop or desktop computer, acting as a host for other computing devices to connect to.

Figure 3:
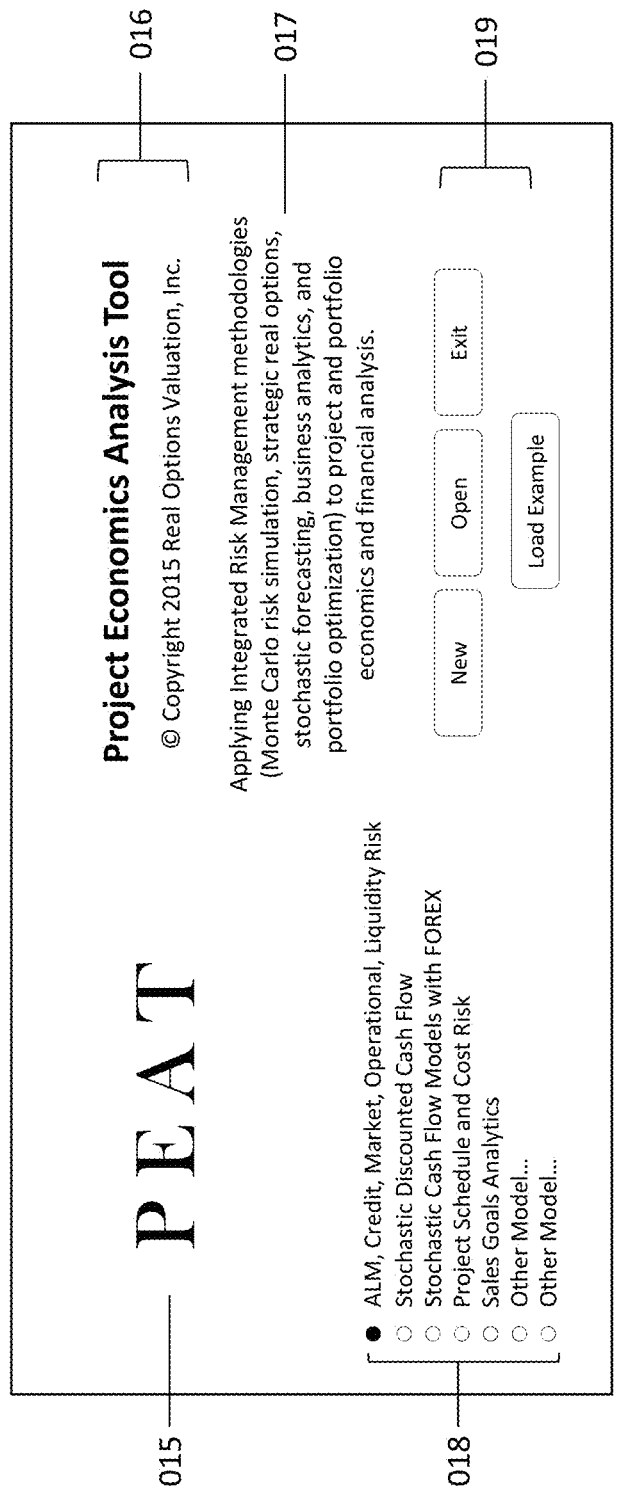
FIG. 3 illustrates the Project Economics Analysis Tool (PEAT) utility's starting screen.

According to an embodiment of the present invention, FIG. 3 illustrates the Project Economics Analysis Tool (PEAT) software utility 015 and 016. In a preferred embodiment, this utility is designed to apply Integrated Risk Management methodologies (Monte Carlo risk simulation, strategic real options, stochastic and predictive forecasting, business analytics, business statistics, business intelligence, decision analysis, and portfolio optimization) to project and portfolio economics and financial analysis 017. The PEAT utility can house multiple industry-specific or application-specific modules 018 such as oil and gas industry models (industry specific) or discounted cash flow model (application specific). The utility can house multiple additional types of models (industry or application specific) as required. The user can choose the model desired and create a new model from scratch, open a previously saved model, load a predefined example, or exit the utility 019. As mentioned, additional industry-specific, solution-specific, or generic models can be added as new modules to the system. One such new module is the current invention's Asset Liability Management, Credit Risk, Market Risk, Operational Risk, and Liquidity Risk (ALM-CMOL) module discussed at length in this disclosure.

In banking finance and financial services firms, economic capital is defined as the amount of risk capital, assessed on a realistic basis based on actual historical data, the bank or firm requires to cover the risks as a going concern, such as market risk, credit risk, liquidity risk, and operational risk. It is the amount of money that is needed to secure survival in a worst-case scenario. Firms and financial services regulators such as Central Banks, Bank of International Settlements, and other regulatory commissions should then aim to hold risk capital of an amount equal at least to its economic capital. Typically, economic capital is calculated by determining the amount of capital that the firm needs to ensure that its realistic balance sheet stays solvent over a certain time period with a prespecified probability (e.g., usually defined as 99.00%). Therefore, economic capital is often calculated as Value at Risk (VaR).

In an exemplary embodiment according to the present invention, FIG. 4 illustrates the PEAT utility's ALM-CMOL module 020 for Credit Risk: Economic Regulatory Capital's (ERC) 022 Global Settings tab 023. This current analysis is performed on credit issues such as loans, credit lines, and debt at the commercial, retail, or personal levels. To get started with the utility, existing files can be opened or saved, or a default sample model can be retrieved from the menu 021. The number of categories to loans and credit types can be set 024 as well as the loan or credit category names, a loss given default (LGD) value in percent, and the Basel credit type (residential mortgages, revolving credit, other miscellaneous credit, or wholesale corporate and sovereign debt) 025. Each credit type has its required Basel model that is public knowledge, and the present invention uses said prescribed models per Basel regulations. Further, historical data can be entered by the user manually 026 into the utility or via existing databases and data files 027. Such data files may be large and, hence, stored either in a single file or multiple data files 028 where each file's contents can be mapped 029 to the list of required variables (e.g., credit issue date, customer information, product type or segment, Central Bank ratings, amount of the debt or loan, interest payment, principal payment, last payment date, and other ancillary information the bank or financial services firm has access to) for the analysis, and the successfully mapped connections are displayed 030. Additional information such as the required Value at Risk (VaR) percentiles 031, average life of a commercial loan, and historical data period on which to run the data files to obtain the probability of default (PD) are entered. Next, the Exposure at Default (EAD) analysis periodicity is selected 032 as is the date type and the Central Bank ratings 033. Different Central Banks in different nations tend to have similar credit ratings but the present invention allows for flexibility in choosing the relevant rating scheme (i.e., Level 1 may indicate on-time payment of an existing loan whereas Level 3 may indicate a late payment of over 90 days and therefore constitutes a default). All these inputs and settings can be saved 034 either as stand-alone settings and data or including the results. Users would enter a unique name and notes 035 and Save 036 the current settings (previously saved models and settings can be retrieved, Edited, or Deleted, a New model can be created, or an existing model can be duplicated through a Save As). The saved models are listed 037 and can be rearranged 038 according to the user's preference.

Figure 5:
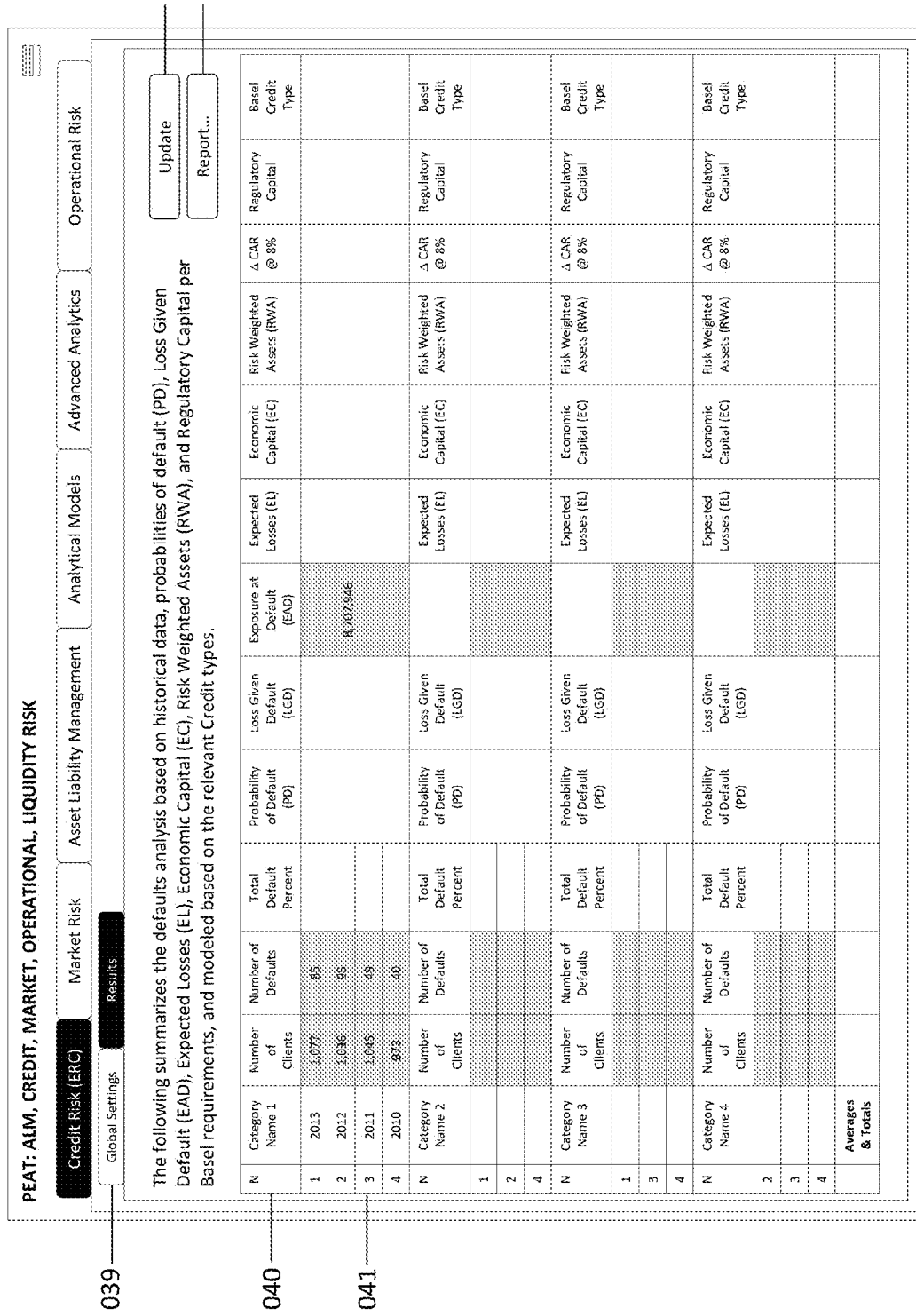
FIG. 5 illustrates the PEAT utility's ALM-CMOL module for Credit Risk: Economic Regulatory Capital's (ERC) Results tab.

In an exemplary embodiment according to the present invention, FIG. 5 illustrates the PEAT utility's ALM-CMOL module for Credit Risk: Economic Regulatory Capital's (ERC) Results 039 tab. The results are shown in the grid 040 if data files were loaded and preprocessed and results were computed and presented here (the loading of data files was discussed in FIG. 4 and the preprocessing of a bank's data will be discussed in a later section). However, if data are to be manually entered (as previously presented in FIG. 4), then the grey areas 041 in the data grid are available for manual user input, such as the number of clients for a specific credit or debt category, the number of defaults for said categories historically by period, and the exposure at default values (total amount of debt issued within the total period).

The present invention's utility as shown in FIG. 5 allows users to manually input the number of clients and number of credit and loan defaults within specific annual time period bands 040. The utility computes the percentage of defaults (number of credit or loan defaults divided by number of clients within the specified time periods) and the average percentage of default is the proxy used for the Probability of Default (PD). If users have specific PD rates to use, users can simply enter any number of clients and number of defaults as long as the ratio is what the user wants as the PD input (e.g., a 1% PD means users can enter 100 clients and 1 as the number of default). The Loss Given Default (LGD) can be user inputted in the global settings as a percentage (LGD is defined as the percentage of losses of loans and debt that cannot be recovered when they are in default). The Exposure at Default (EAD) is the total loans amount within these time bands. These PD, LGD, and EAD values can also be computed using structural models as will be discussed in FIG. 22. Expected Losses (EL) is the product of PD×LGD× EAD. Economic Capital (EC) is based on Basel II and Basel III requirements and is a matter of public record. Risk Weighted Average (RWA) is regulatory requirements per Basel II and Basel III such as 12.5×EC. The change in Capital Adequacy Requirement (ΔCAR @ 8%) is simply the ratio of the EC to EAD less the 8% holding requirement. In other words, the Regulatory Capital (RC) is 8% of EAD.

In an exemplary embodiment according to the present invention, FIG. 6 illustrates the PEAT utility's ALM-CMOL module for Market Risk 044 where Market Data 045 is entered. Users start by entering the global settings 046 such as the number of investment assets and currency assets the bank has in its portfolio and that require further analysis, the total number of historical data that will be used for analysis, and various Value at Risk percentiles to run (e.g., 99.00% and 95.00%). In addition, the volatility method of choice (industry standard volatility or Risk Metrics volatility methods) and the date type (mm/dd/yyyy or dd/mm/yyyy) are entered. The amount invested (balance) of each asset and currency is entered 048 and the historical data can be entered, copy and pasted from another data source, or uploaded to the data grid 049, and the settings as well as the historical data entered can be saved 050 for future retrieval and further analysis in subsequent subtabs.

Figure 7:
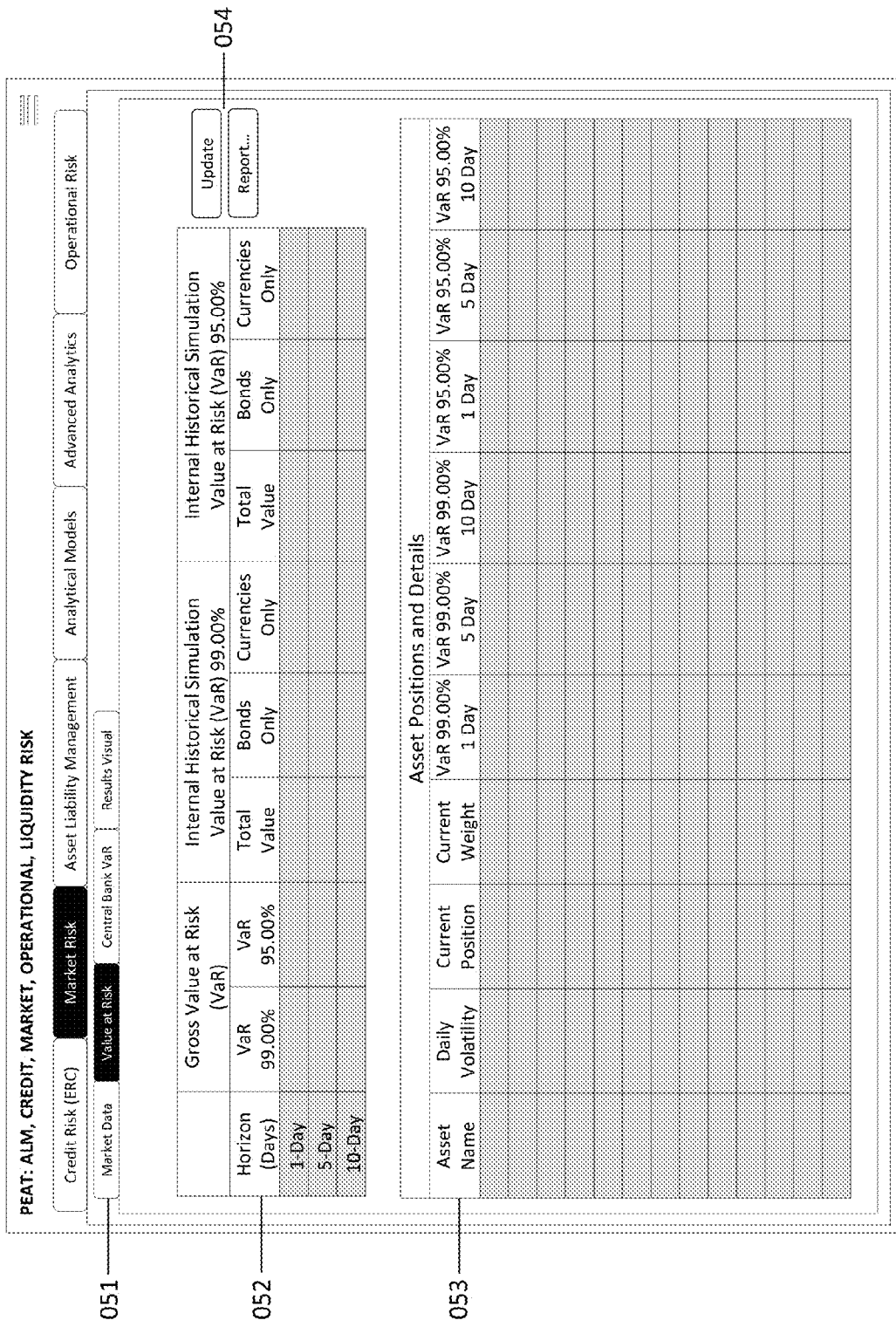
FIG. 7 illustrates the Market Value at Risk (VaR) computed results.

In an exemplary embodiment according to the present invention, FIG. 7 illustrates the Market Value at Risk (VaR) 051 computed results. Based on the data entered in FIG. 6's interface, the results are computed and presented in two separate grids: the Value at Risk (VaR) results 052 and asset positions and details 053. The computations can be triggered to be rerun or Updated, and the results can be Reported 054 to an Excel report template if required.

in FIG. 7, the results computed in the first grid 052 are based on user input market data 051. For instance, the Value at Risk (VaR) calculations are simply the Asset Position× Daily Volatility×Inverse Standard Normal Distribution of VaR Percentile×Square Root of the Horizon in Days. Therefore, the Gross VaR is simply the summation of all VaR values for all assets and foreign exchange denominated assets. In comparison, the Internal Historical Simulation VaR uses the same calculation based on historically simulated time-series of asset values. The historically simulated time-series of asset values is obtained by the Asset's Investment×Asset Price$_{t-1}$×Period-Specific Relative Returns–Asset's Current Position. The Asset's Current Position is simply the Investment×Asset Price$_t$. From this simulated time-series of asset flows, the (1−X %) percentile asset value is the VaR X %. Typically, X % is 99.00% or 95.00% and can be changed as required by the user based on regional or country-specific regulatory agency's statutes.

Figure 8:
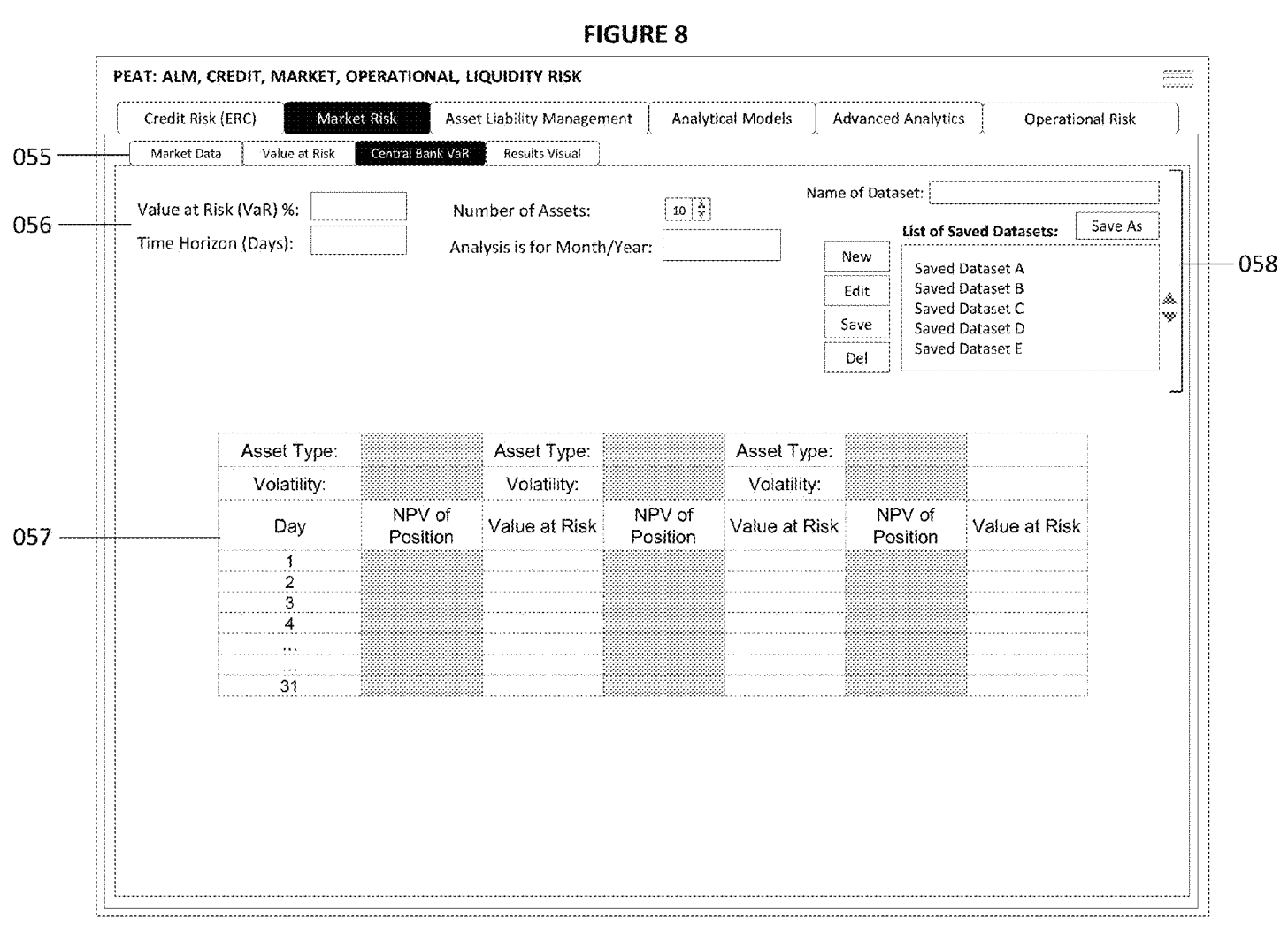

In an exemplary embodiment according to the present invention, FIG. 8 illustrates the Central Bank VaR 055 method and results in computing Value at Risk (VaR) based on user settings 056 (e.g., the VaR percentile, time horizon of the holding period in days, number of assets to analyze, and the period of the analysis) and the assets' historical data 057. The VaR computations are based on the same approach as previously described, and the inputs, settings, and results can be saved 058 for future retrieval.

Figure 9:
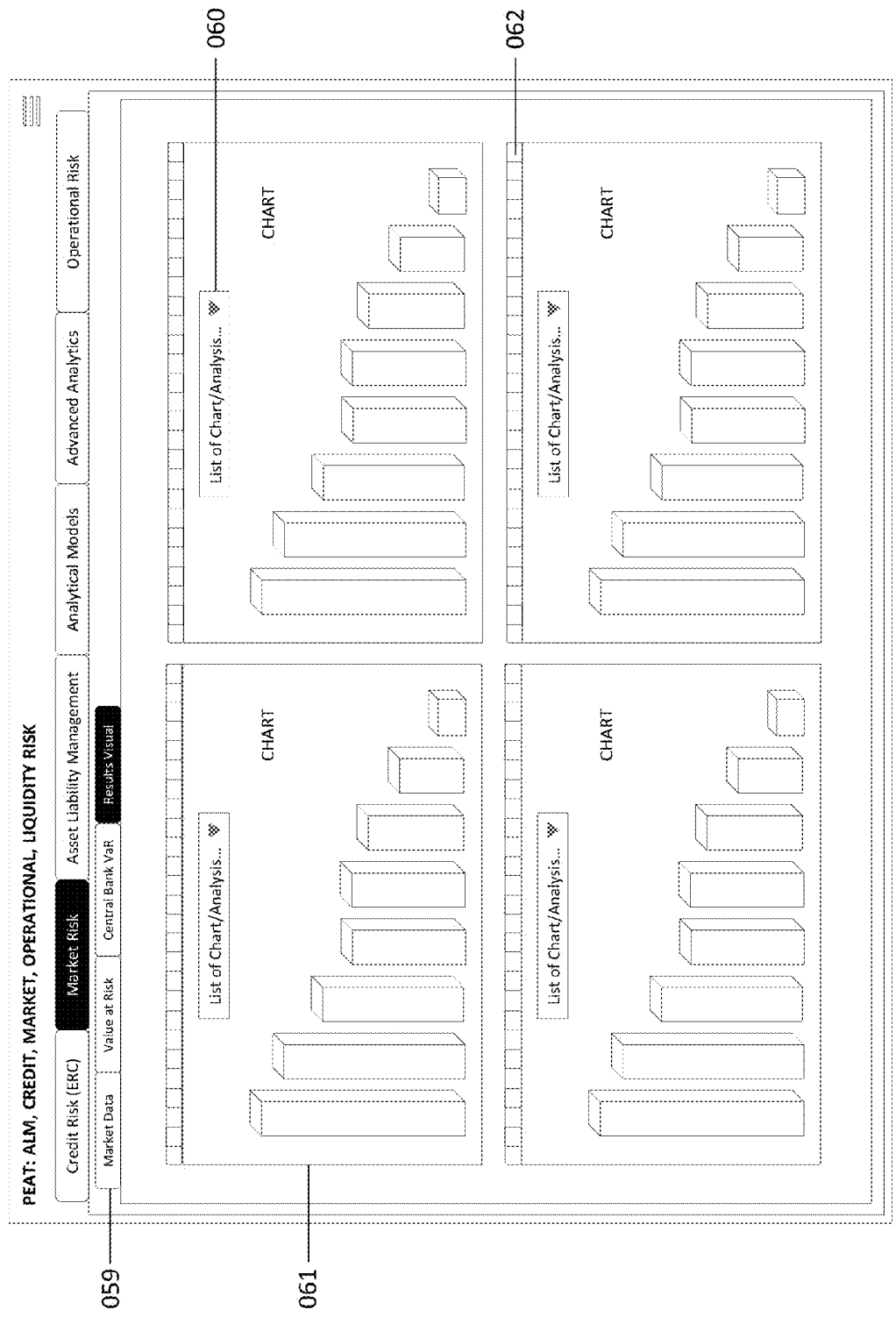
FIG. 9 illustrates the visual chart results of the Market Risk analyses.

In an exemplary embodiment according to the present invention, FIG. 9 illustrates the Results Visual 059 or charts of the Market Risk analyses. Based on user selection of chart type 060 such as time-series charts or bar charts of the computed results shown in FIG. 7, the relevant charts 061 will be plotted in a time-series manner, and said charts can be modified using the chart controls and icons 062.

Figure 10:
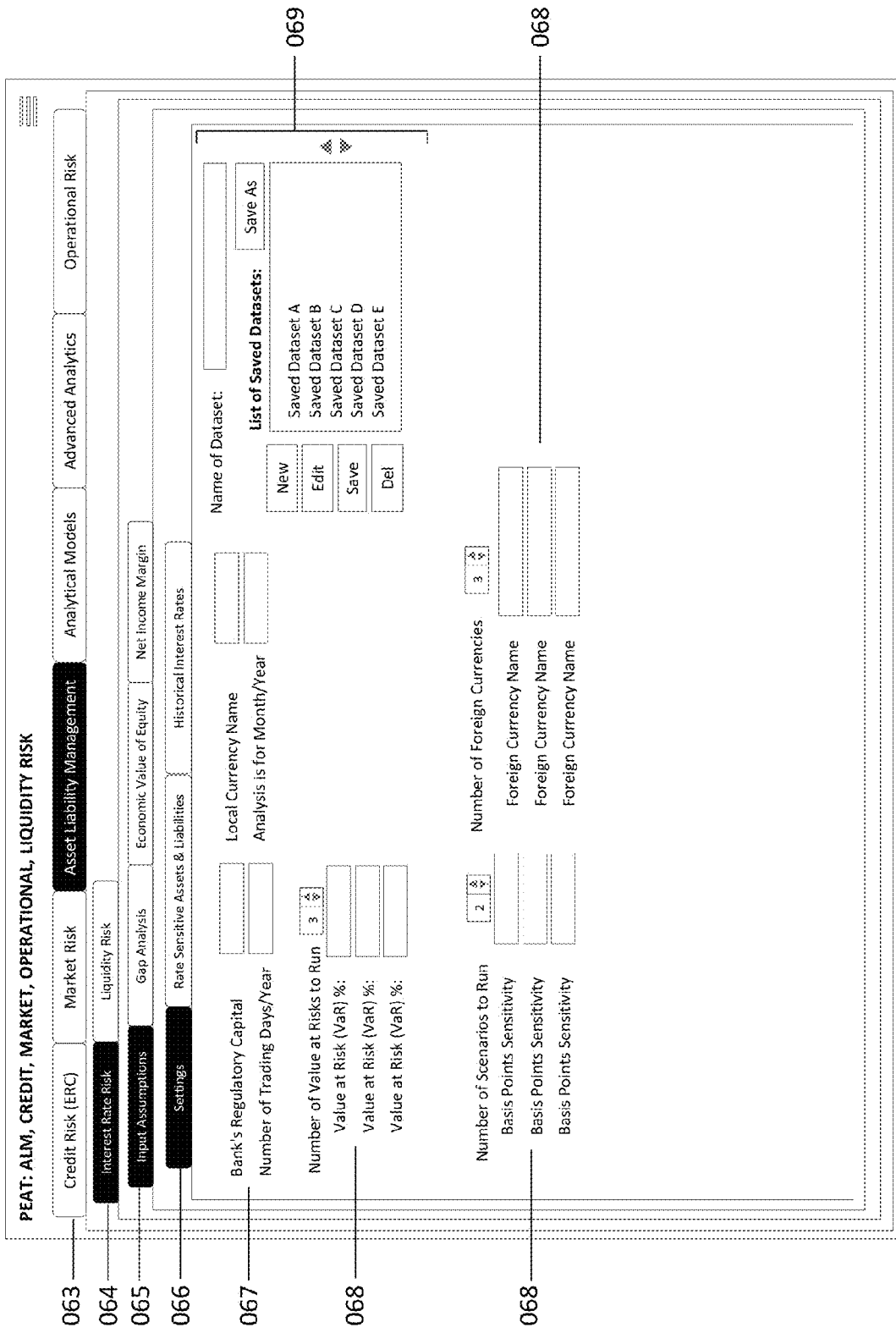
FIG. 10 illustrates the PEAT utility's ALM-CMOL module for Asset Liability Management: Interest Rate Risk's Input Assumptions and general Settings tab.

In an exemplary embodiment according to the present invention, FIG. 10 illustrates the PEAT utility's ALM-CMOL module for Asset Liability Management 063: Interest Rate Risk's 064 Input Assumptions 065 and general Settings 066 tab. This segment represents the analysis of ALM or Asset Liability Management computations. Asset Liability Management (ALM) is the practice of managing risks that arise due to mismatches between the assets and liabilities. The ALM process is a mix between risk management and strategic planning for a bank or financial institution. It is about offering solutions to mitigate or hedge the risks arising from the interaction of assets and liabilities as well as the success in the process of maximizing assets to meet complex liabilities such that it will help increase profitability. The current tab starts by obtaining, as general inputs 067, the bank's regulatory capital 067 obtained earlier from the credit risk models. In addition, the number of trading days in the calendar year 067 of the analysis (e.g., typically between 250 and 253 days), the local currency's name 067 (e.g., U.S. Dollar or Argentinian Peso), the current period when the analysis is performed and results reported to the regulatory agencies 067 (e.g., January 2015), the number of Value at Risk percentiles 068 to run (e.g., 99.00%), number of scenarios 068 to run and their respective basis point sensitivities (e.g., 100, 200, and 300 basis points, where every 100 basis points represent 1%), and number of foreign currencies 068 in the bank's investment portfolio. As usual, the inputs, settings, and results can be saved 069 for future retrieval.

Figure 11:
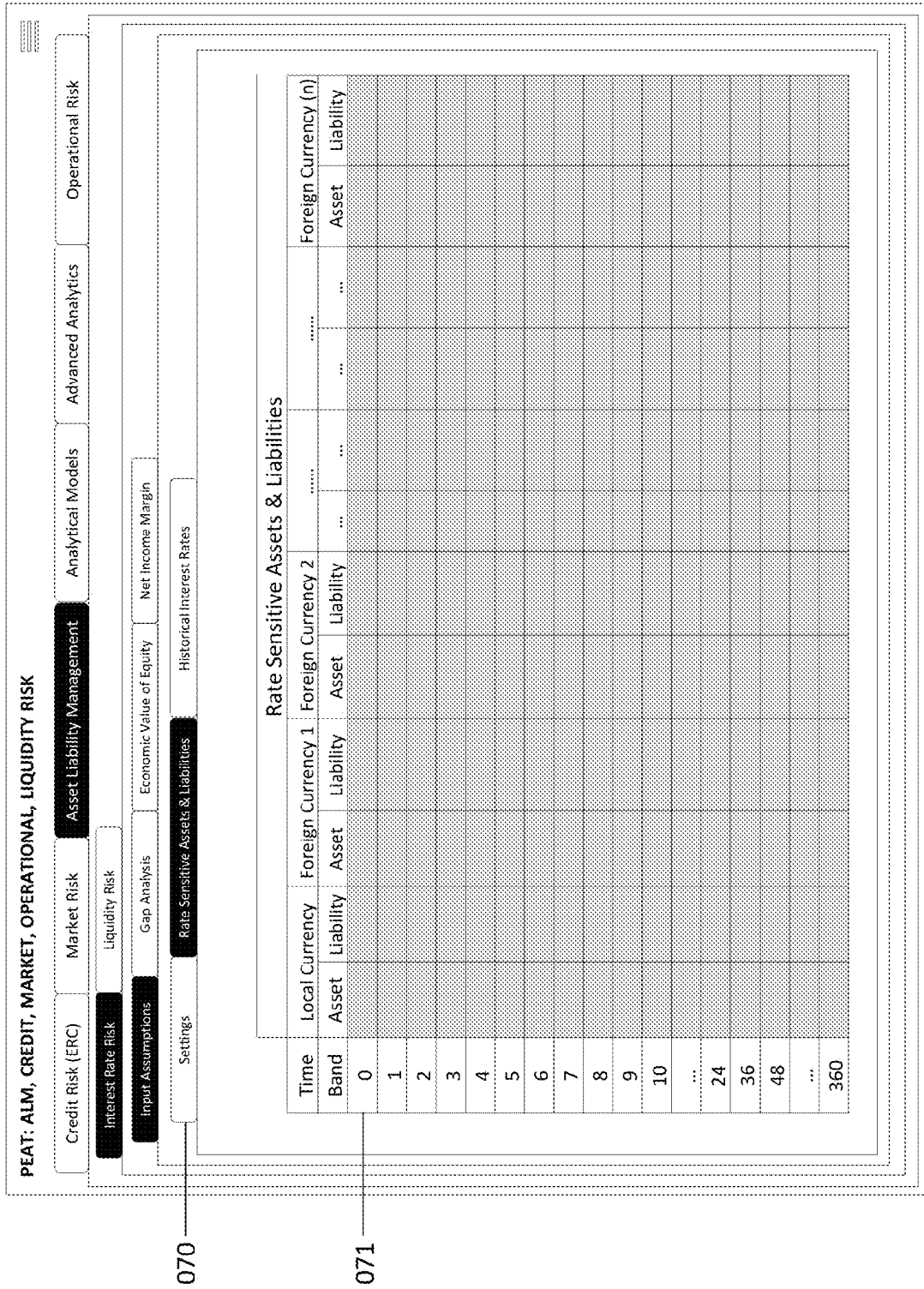
FIG. 11 illustrates the PEAT utility's ALM-CMOL module for Asset Liability Management: Interest Rate Risk's data input tab on the historical impact of interest rate sensitive assets and liabilities.

In an exemplary embodiment according to the present invention, FIG. 11 illustrates the PEAT utility's ALM-CMOL module for Asset Liability Management. The tab is specifically for Interest Rate Sensitive Assets and Liabilities 070 data where historical impacts of interest rate sensitive assets and liabilities, as well as foreign currency denominated assets and liabilities are entered 071, copy and pasted, or uploaded from a database.

Figure 12:
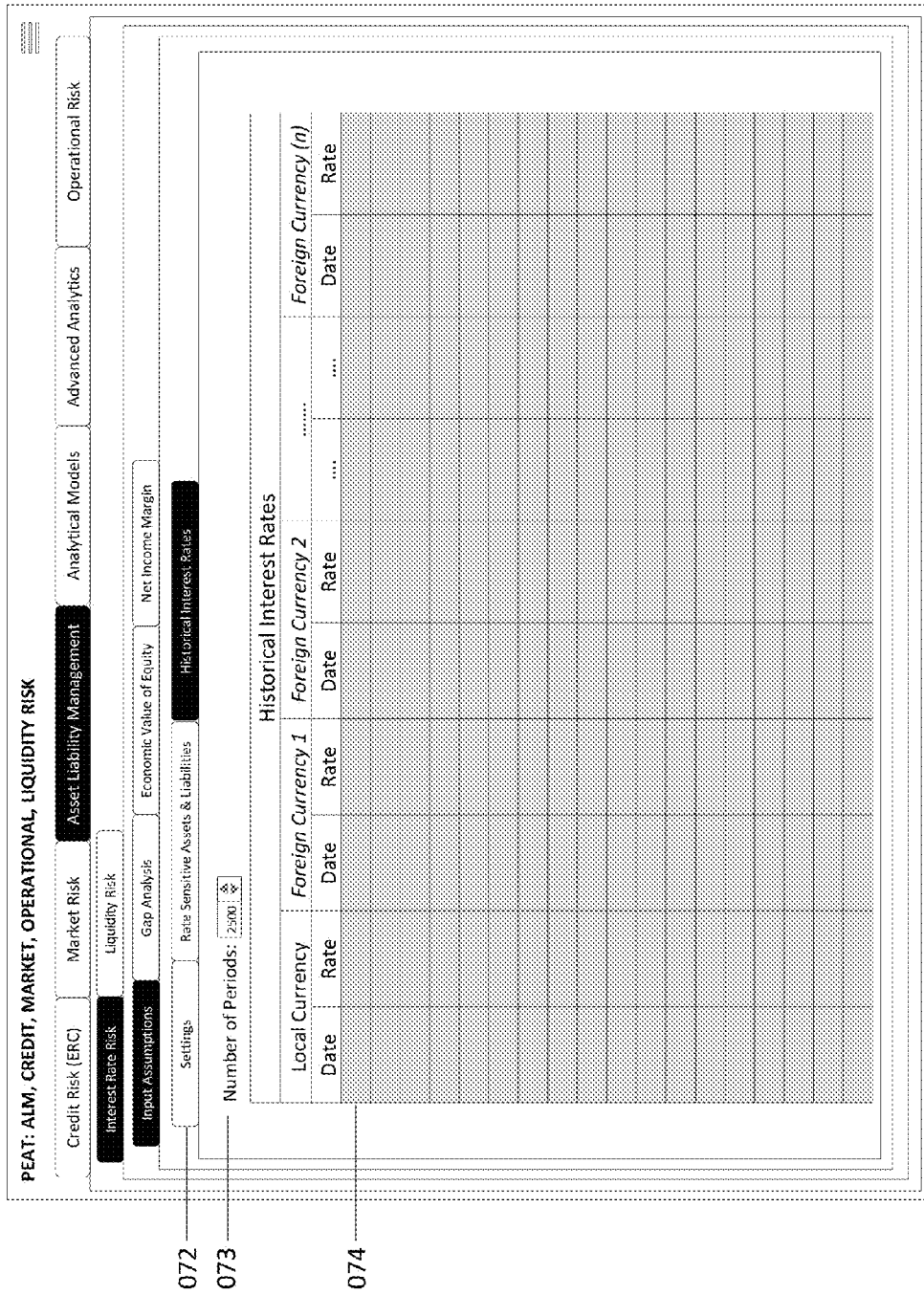
FIG. 12 illustrates the Interest Rate Risk's data input tab on the historical interest rates of local and foreign currencies.

In an exemplary embodiment according to the present invention, FIG. 12 illustrates the Historical Interest Rate 072 data input tab where rows of periodic 073 historical interest rates of local and foreign currencies are entered 074, copy and pasted, or uploaded from a database.

Figure 13:
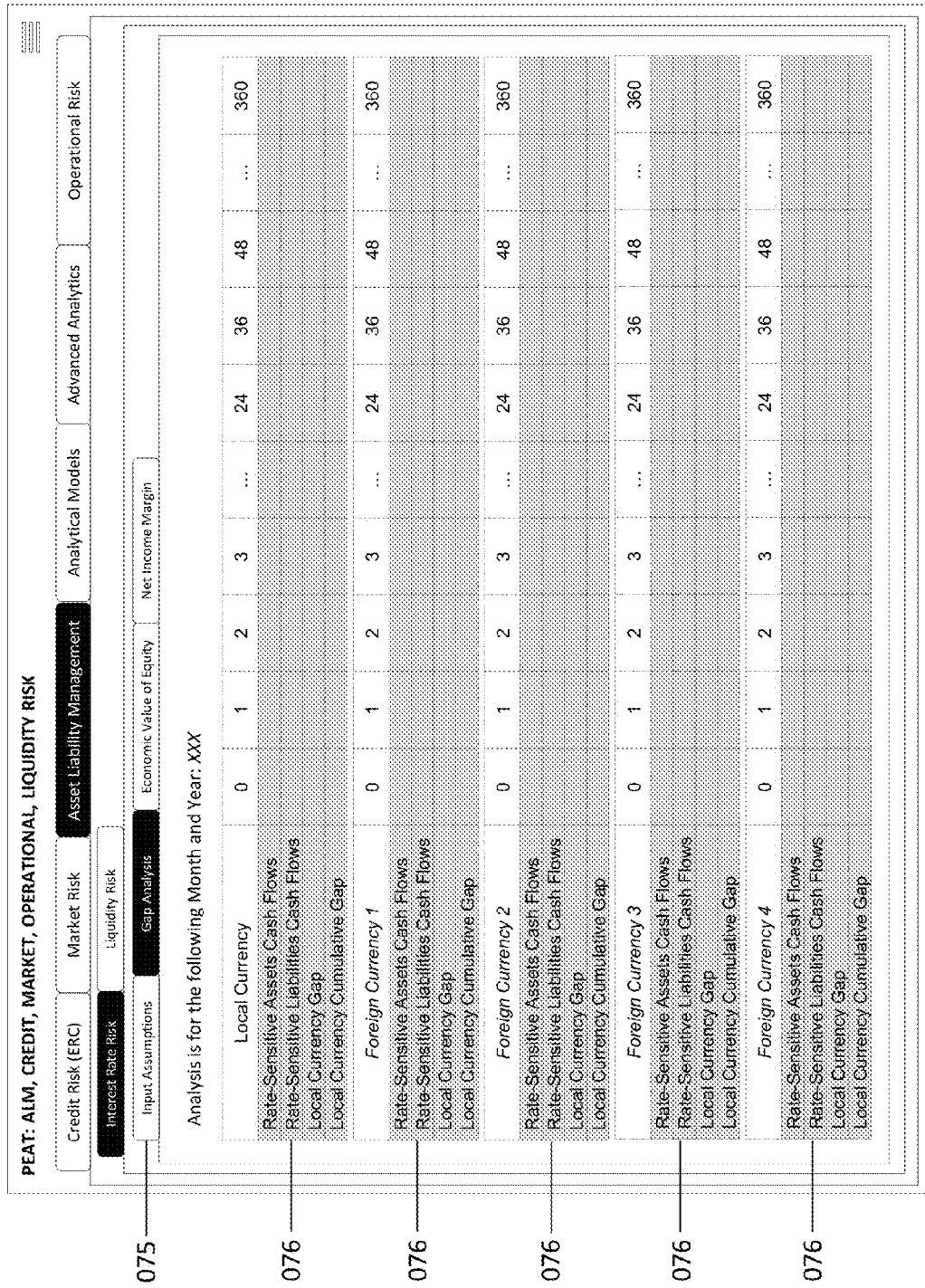
FIG. 13 illustrates the Gap Analysis results of Interest Rate Risk.

In an exemplary embodiment according to the present invention, FIG. 13 illustrates the Gap Analysis 075 results of Interest Rate Risk. The results are shown in different grids 076 for each local currency and foreign currency. Gap Analysis is, of course, one of the most common ways of measuring liquidity position and represents the foundation for scenario analysis and stress-testing, which will be executed in subsequent tabs. The Gap Analysis results 076 are from user inputs in the input assumptions tab. The results are presented for the user again for validation and in a more user-friendly tabular format.

Figure 14:
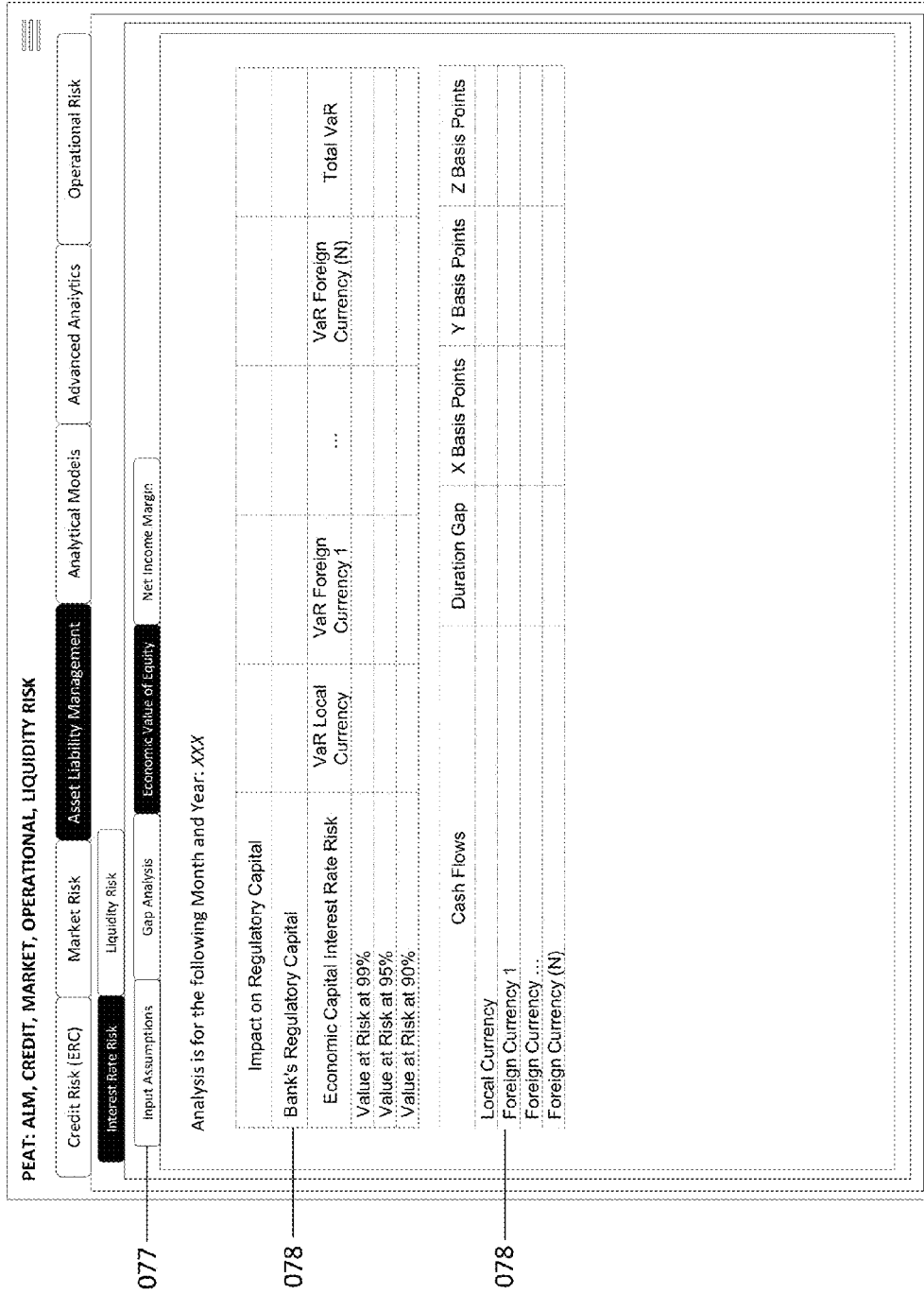
FIG. 14 illustrates the Economic Value of Equity results based on interest rate risk computations.

In an exemplary embodiment according to the present invention, FIG. 14 illustrates the Economic Value of Equity 077 results based on interest rate risk computations in previous tabs. The impact on regulatory capital as denoted by VaR levels on local and foreign currencies 078 are computed, as are the duration gaps and basis point scenarios 078 affecting the cash flows of local and foreign currencies.

In FIG. 14, the results grid 078 shows the regulatory capital as calculated in the Credit Risk ERC model as previously described. Further, the Economic Capital Interest Rate Risk of the local and foreign currencies are computed by taking the Asset Value×Annualized Volatility×Average Historical Currency Rate×Inverse Standard Normal Distribution of VaR Percentile×Modified Duration. The Modified Duration is obtained from Duration Gap/(1+Interest Rate), where Duration Gap as shown in the second results grid 078 is computed by taking the Sum of the Ratio of the Present Value of Cash Flows×Time Period, and then less the Liabilities Duration×the Ratio of Total Present Values of Liabilities to the Total Present Values of Assets. Finally, the X, Y, Z Basis Points values (where X, Y, Z are typically 100, 200, 300 basis points, equivalent to 1%, 2%, and 3% changes in the interest rates) are computed using −Modified Duration×Asset Value×Change in Basis Points in %.

Figure 15:
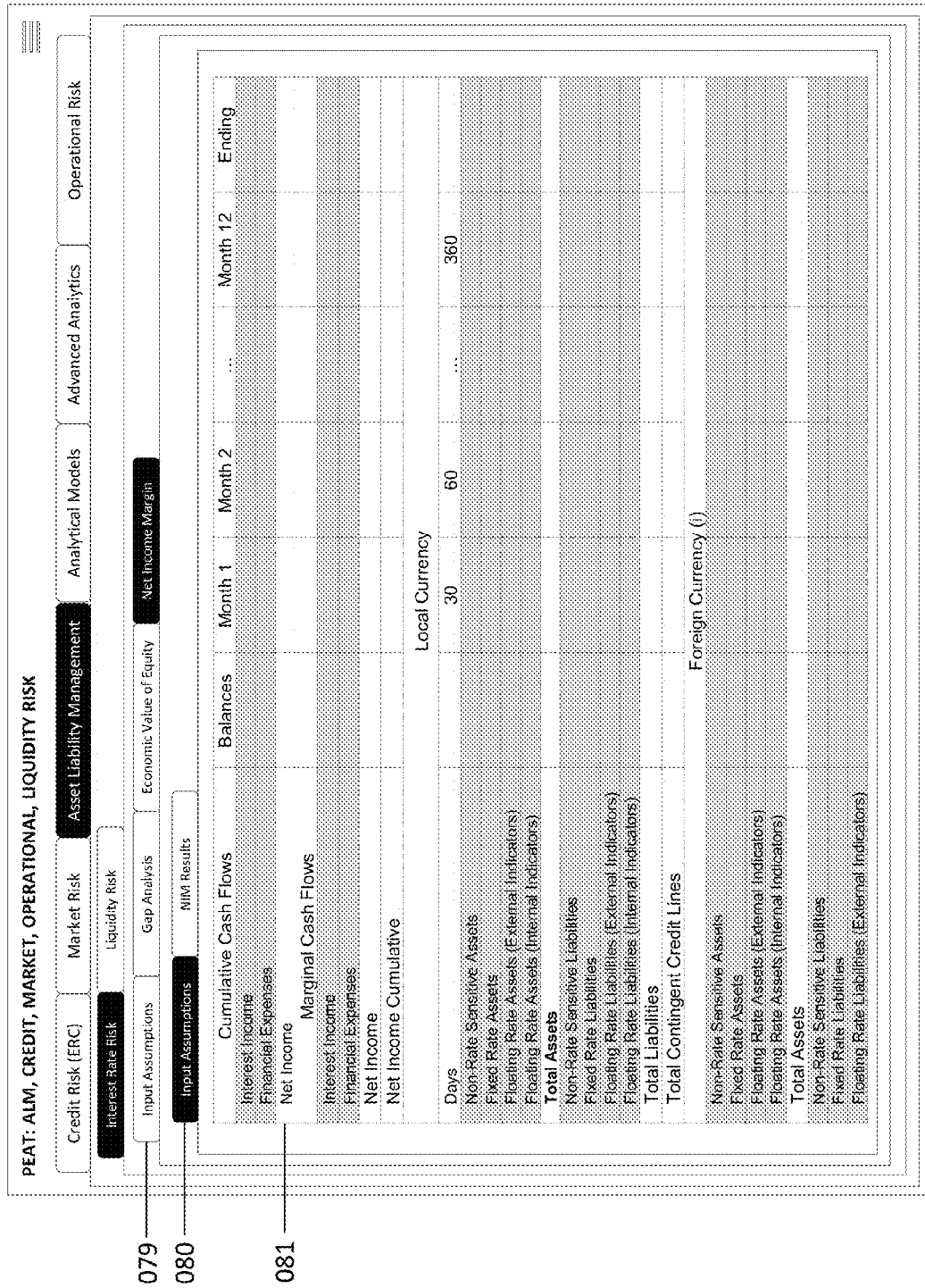
FIG. 15 illustrates the Net Income Margin (NIM) input requirements based on interest rate risk.

In an exemplary embodiment according to the present invention, FIG. 15 illustrates the Net Income Margin (NIM) 079 Input Assumptions 080 requirements based on interest rate risk analysis. The highlighted cells in the data grid 081 represent user input requirements for computing the NIM model. The Economic Value of Equity and Gap Analysis calculations described above are for longer-term interest rate risk analysis, whereas the NIM approach is for shorter-term (typically 12 months) analysis of liquidity and interest rate risk effects on assets and liabilities.

Figure 16:
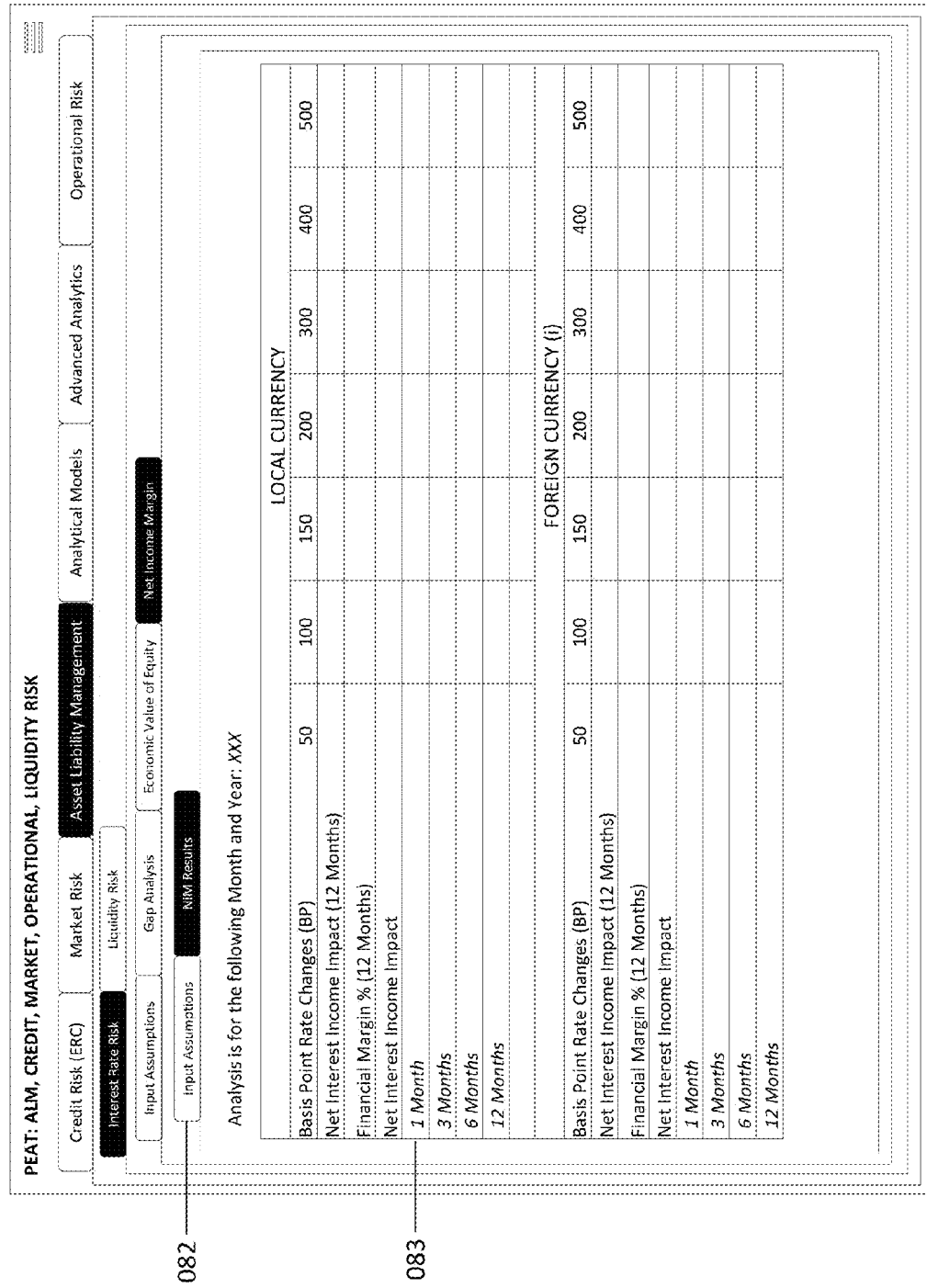
FIG. 16 illustrates the Net Income Margin (NIM) results based on interest rate risk computations.

In an exemplary embodiment according to the present invention, FIG. 16 illustrates the Net Income Margin (NIM) Results 082 based on interest rate risk computations. The results are shown as a grid 083 separated by local versus foreign currencies, listed for short-term effects by basis points (e.g., 50, 100, 150, 200, 300, 400, and 500).

In FIG. 16, the results grid 083 shows the key results of Net Interest Income Impact depending on the multitude of Basis Point (BP) scenario changes in interest rates. Each 100 BP represents 1% change in interest rates. The Net Interest Income Impact is computed by taking the Sum of all Changes in Net Income Margins, which, in turn, is computed by taking the Monthly Gap×BP Change×% of Days Left to Maturity of 1 Year÷10000. The Monthly Gap is, of course, the difference between Monthly Assets and Liabilities, accounting for any Contingency Credit Lines.

Figure 17:
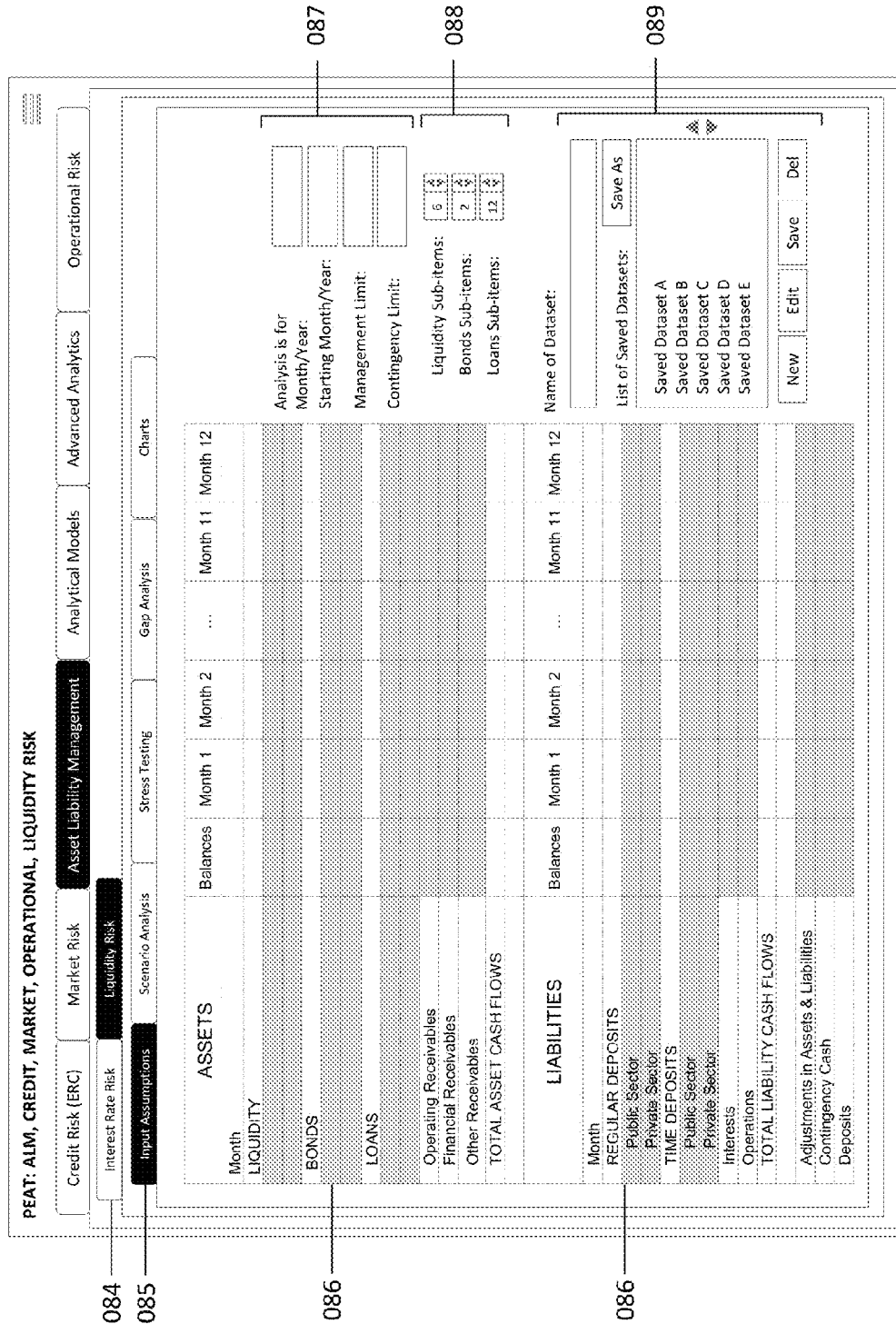
FIG. 17 illustrates the PEAT utility's ALM-CMOL module for Asset Liability Management: Liquidity Risk's Input Assumptions tab on the historical monthly balances of interest rate sensitive assets and liabilities.

In an exemplary embodiment according to the present invention, FIG. 17 illustrates the PEAT utility's ALM-CMOL module for Asset Liability Management: Liquidity Risk 084 Input Assumptions 085 tab on the historical monthly balances of interest rate sensitive assets and liabilities 086. The typical time horizon is monthly for one year (12 months) where the various assets such as liquid assets (e.g., cash), bonds and loans are listed, as well as other asset receivables. On the liabilities side, regular short-term deposits and timed deposits are listed, separated by private versus public sectors, as well as other payable liabilities (e.g., interest payments and operations). Adjustments can also be made to account for rounding issues and accounting issues that may affect the asset and liability levels (e.g., contingency cash levels, overnight deposits, etc.). The data grid can be set up with some basic inputs 087 as well as the number of sub-segments or rows for each category 088. As usual, the inputs, settings, and results can be saved 089 for future retrieval.

In an exemplary embodiment according to the present invention, FIG. 18 illustrates the Liquidity Risk's Scenario Analysis 090 inputs tab on testing interest rate sensitive assets and liabilities 091. The scenarios to test can be entered as data or percentage changes 092. Multiple scenarios can be saved 093 for future retrieval and analysis in subsequent tabs as each saved model constitutes a stand-alone scenario to test.

In an exemplary embodiment according to the present invention, FIG. 19 illustrates the Liquidity Risk's Stress Testing 094 inputs tab on testing interest rate sensitive liabilities. Scenario analysis typically tests both fluctuations in assets and liabilities and their impacts on the portfolio's ALM balance, whereas stress testing typically tests the fluctuations on liabilities (e.g., runs on banks, economic downturns where deposits are stressed to the lower limit) 096 where the stressed limits can be entered as values or percentage change from the base case 095. Multiple stress tests can be saved 097 for future retrieval and analysis in subsequent tabs as each saved model constitutes a stand-alone stress test.

Figure 20:
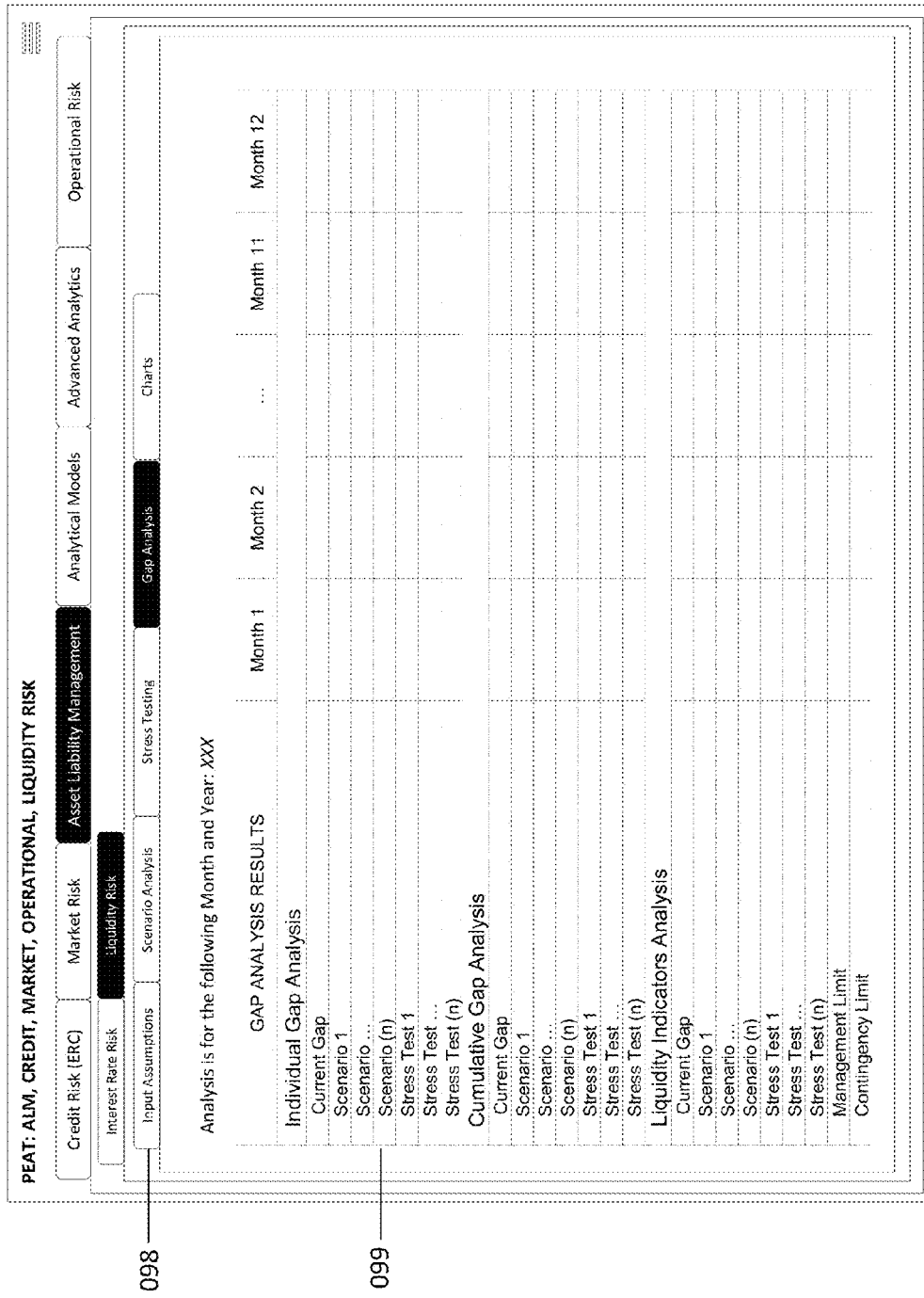
FIG. 20 illustrates the Liquidity Risk's Gap Analysis results.

In an exemplary embodiment according to the present invention, FIG. 20 illustrates the Liquidity Risk's Gap Analysis 098 results. The data grid shows the results based on all the previously saved scenarios and stress test conditions 099.

The Gap is, of course, calculated as the difference between Monthly Assets and Liabilities, accounting for any Contingency Credit Lines. The gaps for the multitude of Scenarios and Stress Tests are reruns of the same calculation based on various user inputs on values or percentage changes as described previously in the Scenario Analysis and Stress Testing sections.

Figure 21:
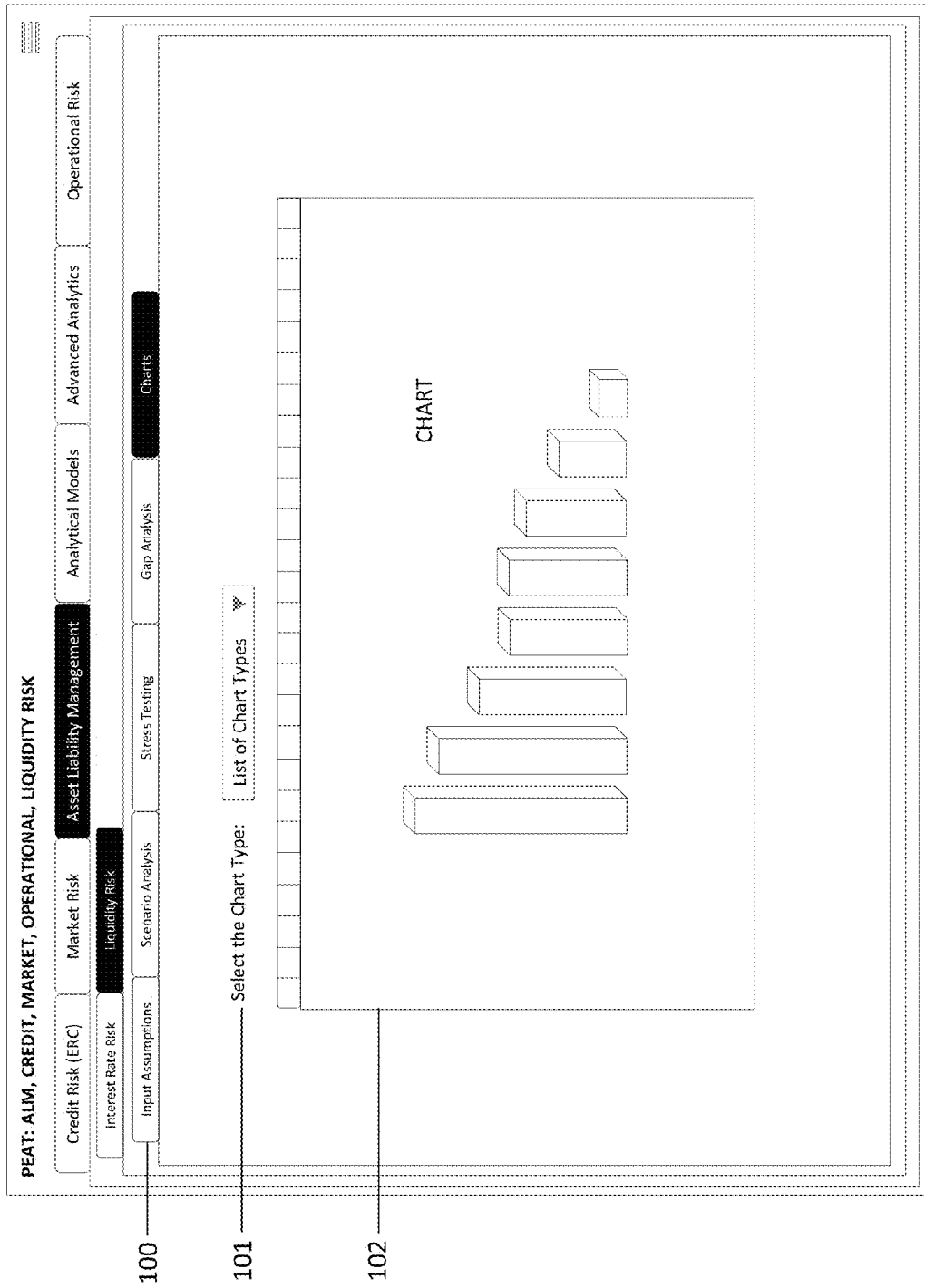
FIG. 21 illustrates the Liquidity Risk's Gap Analysis results in a graphical chart format.

In an exemplary embodiment according to the present invention, FIG. 21 illustrates the Liquidity Risk's Gap Analysis results in a graphical Charts 100 format. Based on user selection of chart type 101 such as time-series charts or bar charts of the computed results shown in FIG. 20, the relevant charts 102 will be plotted in a time-series manner.

Figure 22:
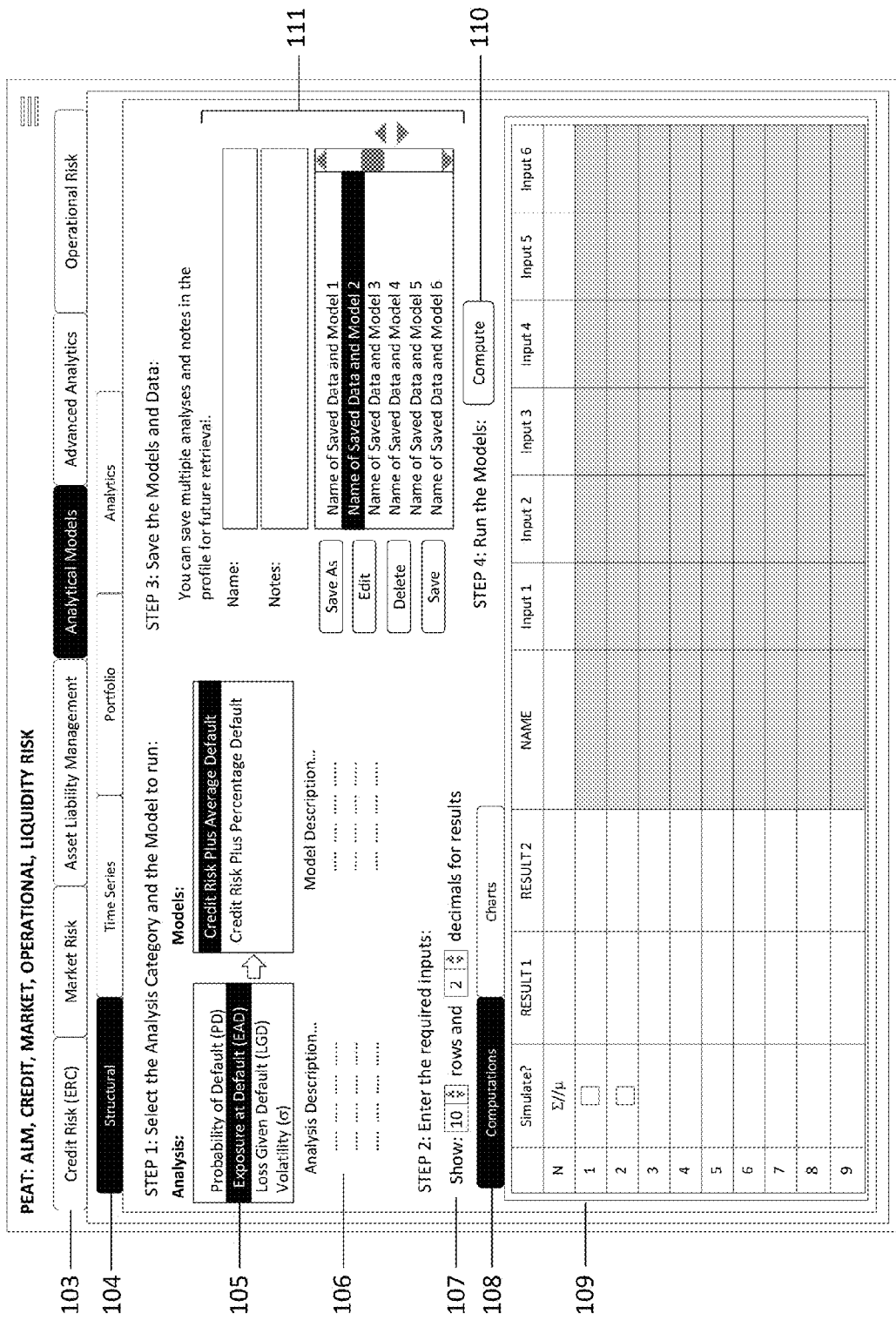
FIG. 22 illustrates the Structural Analytical Models tab with input assumptions and results.

In an exemplary embodiment according to the present invention, FIG. 22 illustrates the Analytical Models 103 tab with input assumptions and results. This analytical models segment is divided into Structural, Time Series, Portfolio, and Analytics 104 models. The current figure shows the Structural models tab where the computed models pertain to credit risk-related model analysis categories such as Probability of Default (PD), Exposure at Default (EAD), Loss Given Default (LGD), and Volatility 105 calculations. Under each category, specific models can be selected to run 105. Selected models are briefly described 106 and users can select the number of model repetitions to run and the decimal precision levels 107 of the results. The data grid in the Computations tab 108 shows the area in which users would enter the relevant inputs into the selected model 109 and the results would be Computed 110. As usual, selected models, inputs, and settings can be saved 111 for future retrieval and analysis.

Figure 23:
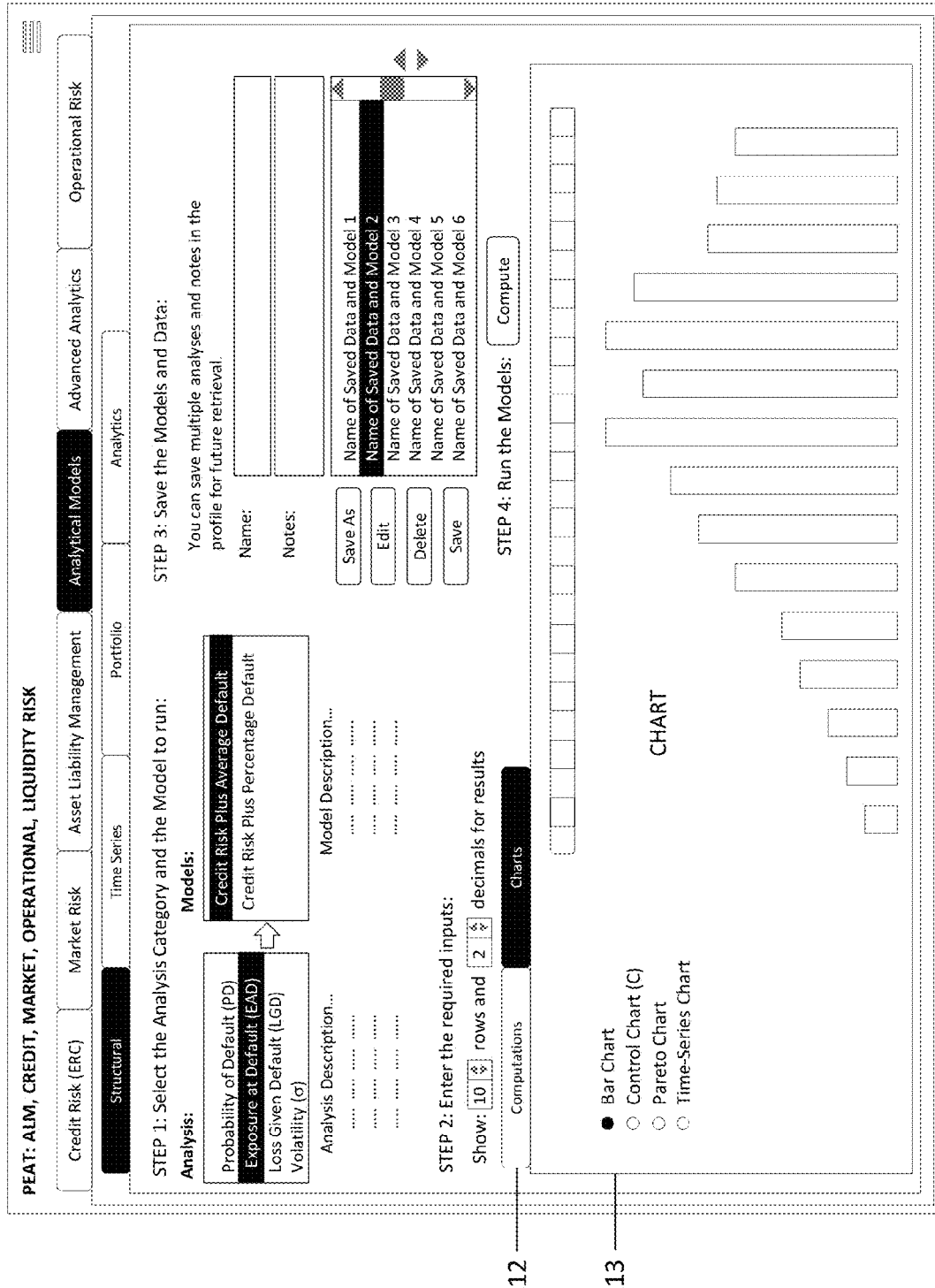
FIG. 23 illustrates the Structural Analytical Models tab with visual chart results.

In an exemplary embodiment according to the present invention, FIG. 23 illustrates the Structural Analytical Models tab with visual chart 112 results. The results computed are displayed as various visual charts 113 such as bar charts, control charts, Pareto charts, and time-series charts.

Figure 24:
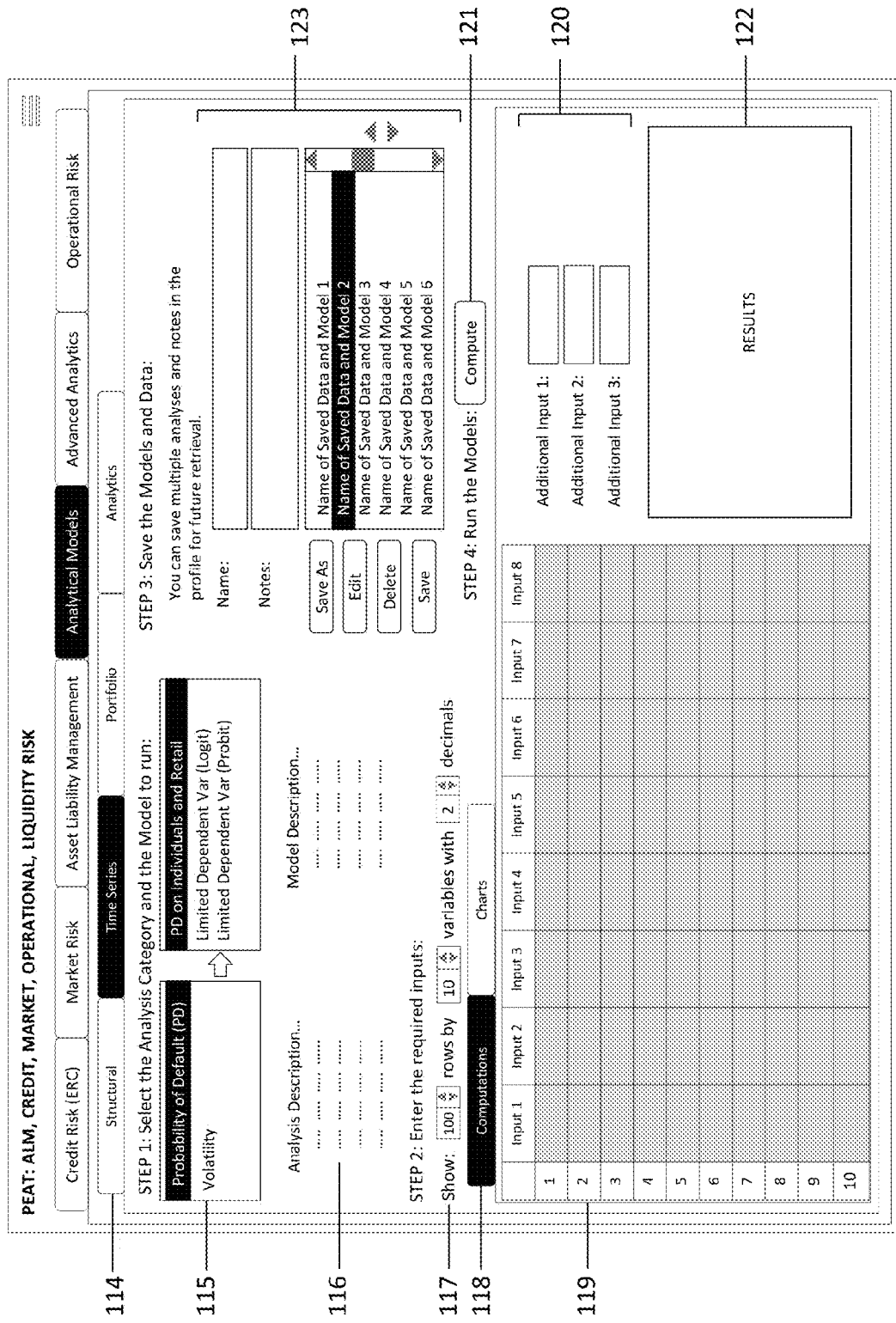
FIG. 24 illustrates the Time-Series Analytical Models tab with input assumptions and results.

In an exemplary embodiment according to the present invention, FIG. 24 illustrates the Time-Series 114 Analytical Models tab 114 with input assumptions and results. The analysis category and model type is first chosen 115 where a short description 116 explains what the selected model does, and users can then select the number of models to replicate as well as decimal precision settings 117. Input data and assumptions 118 are entered in the data grid provided 119 (additional inputs 120 can also be entered if required) and the results are Computed 121 and shown 122. As usual, selected models, inputs, and settings can be saved 123 for future retrieval and analysis.

Figure 25:
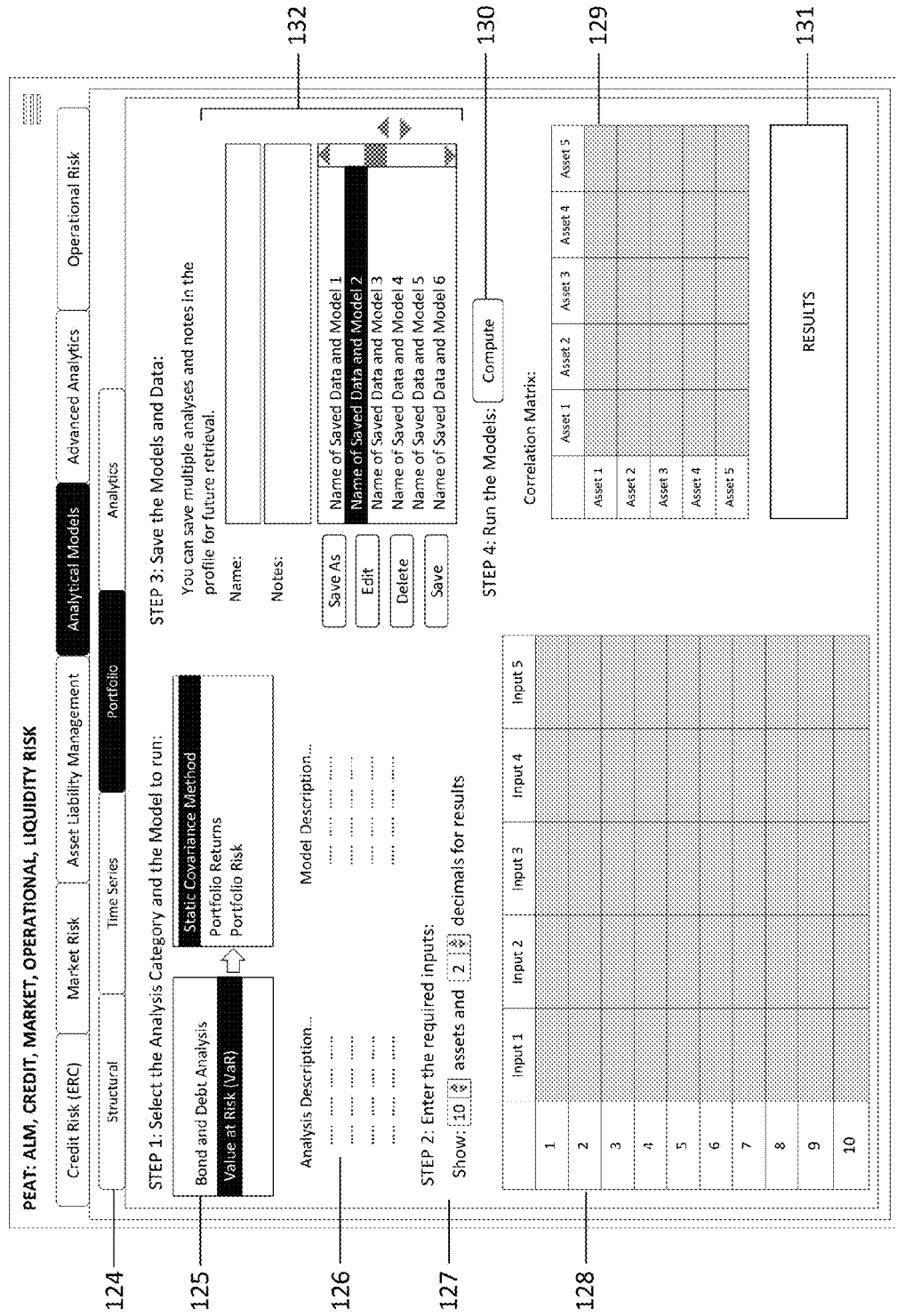
FIG. 25 illustrates the Portfolio Analytical Models tab with input assumptions and results.

In an exemplary embodiment according to the present invention, FIG. 25 illustrates the Portfolio 124 Analytical Models tab with input assumptions and results. The analysis category and model type is first chosen 125 where a short description 126 explains what the selected model does, and users can then select the number of models to replicate as well as decimal precision settings 127. Input data and assumptions are entered in the data grid 128 provided (additional inputs such as a correlation matrix 129 can also be entered if required) and the results are Computed 130 and shown 131. As usual, selected models, inputs, and settings can be saved 132 for future retrieval and analysis.

Figure 26:
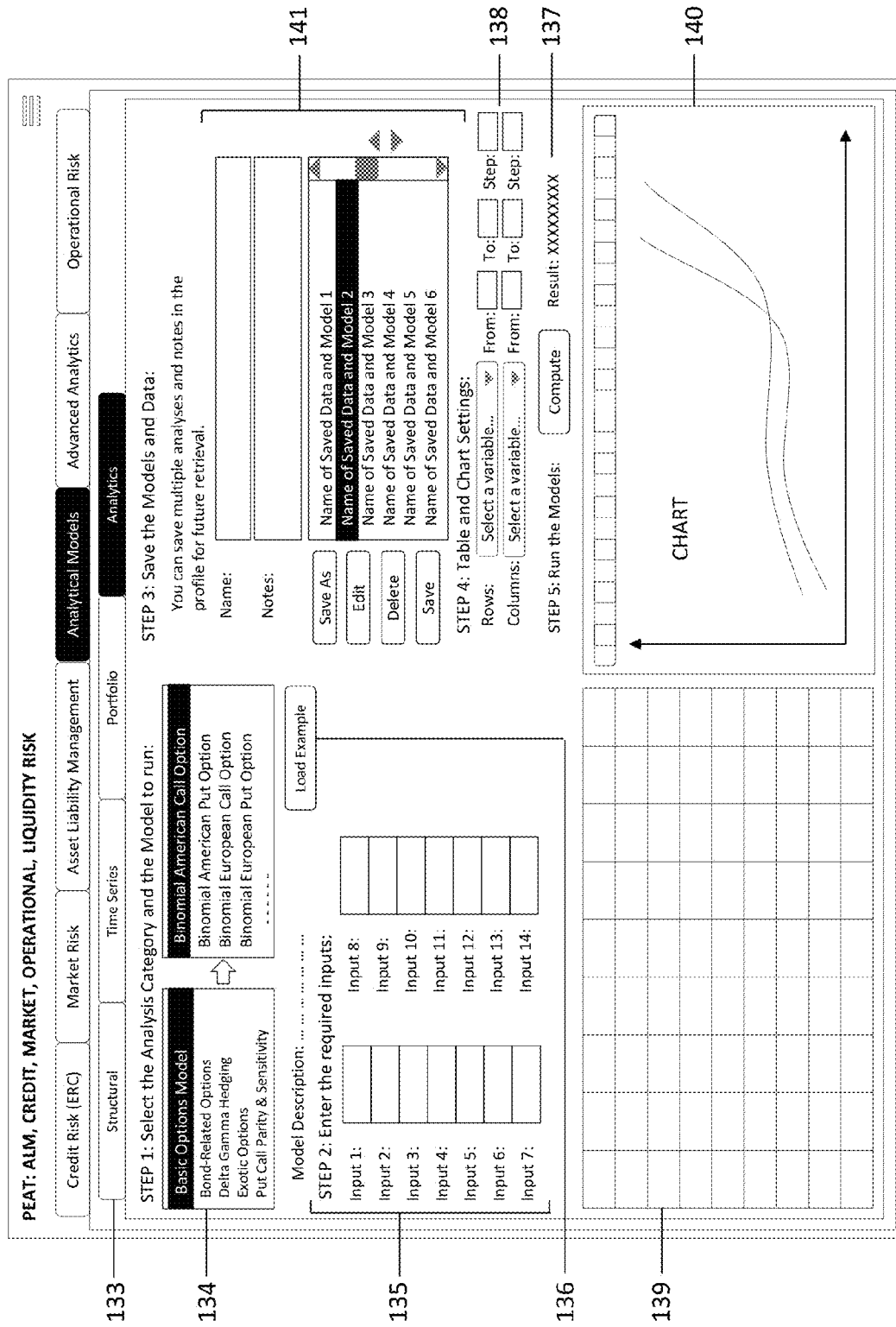
FIG. 26 illustrates the Analytics Analytical Models tab with input assumptions and results.

In an exemplary embodiment according to the present invention, FIG. 26 illustrates the Analytics 133 Analytical Models tab with input assumptions and results. The analysis category and model type is first chosen 134 and input data and assumptions 135 are entered in the required inputs area (if required, users can Load Example 136 inputs and use these as a basis for building their models) and the results are Computed and shown 137. Scenario tables and charts can be created by entering the From, To, and Step Size 138 parameters, where the computed scenarios will be returned as a data grid 139 and visual chart 140. As usual, selected models, inputs, and settings can be saved 141 for future retrieval and analysis.

Figure 27:
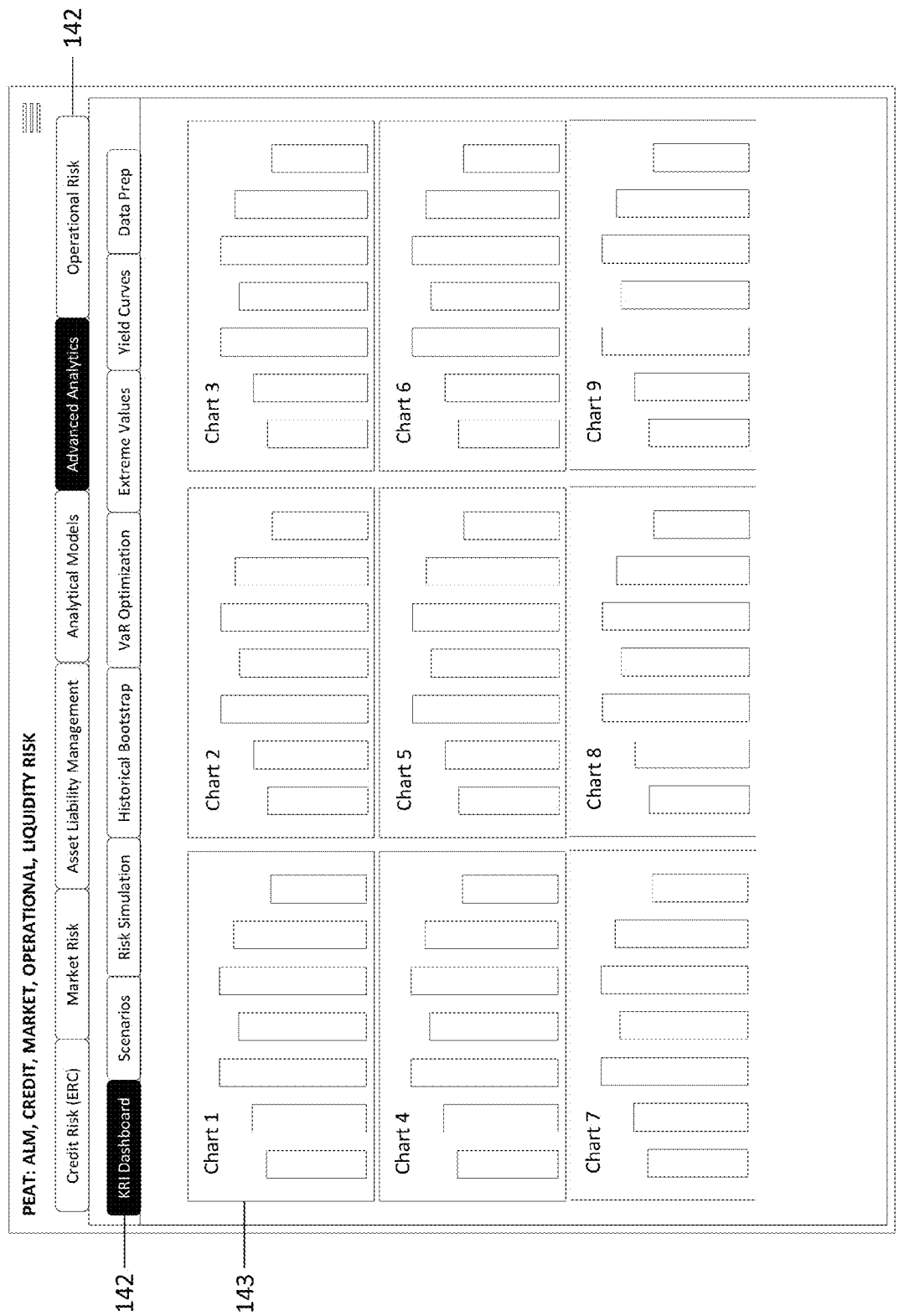
FIG. 27 illustrates the KRI Dashboard showcasing the time-series charts of all computed risks in previous tabs.

In an exemplary embodiment according to the present invention, FIG. 27 illustrates the KRI Dashboard 142 where all previously computed Key Risk Indicators (KRI) are charted over time as time-series charts, bar charts, Pareto charts, line charts, and Control charts 143. These plotted values show past performance leading up to the current period's KRI. Such a multitude of charts can be selected by the user inside each chart and collective allows users and Central Banks or other regulatory bodies to quickly and visually identify any peaks and valleys in said KRIs over time.

Figure 28:
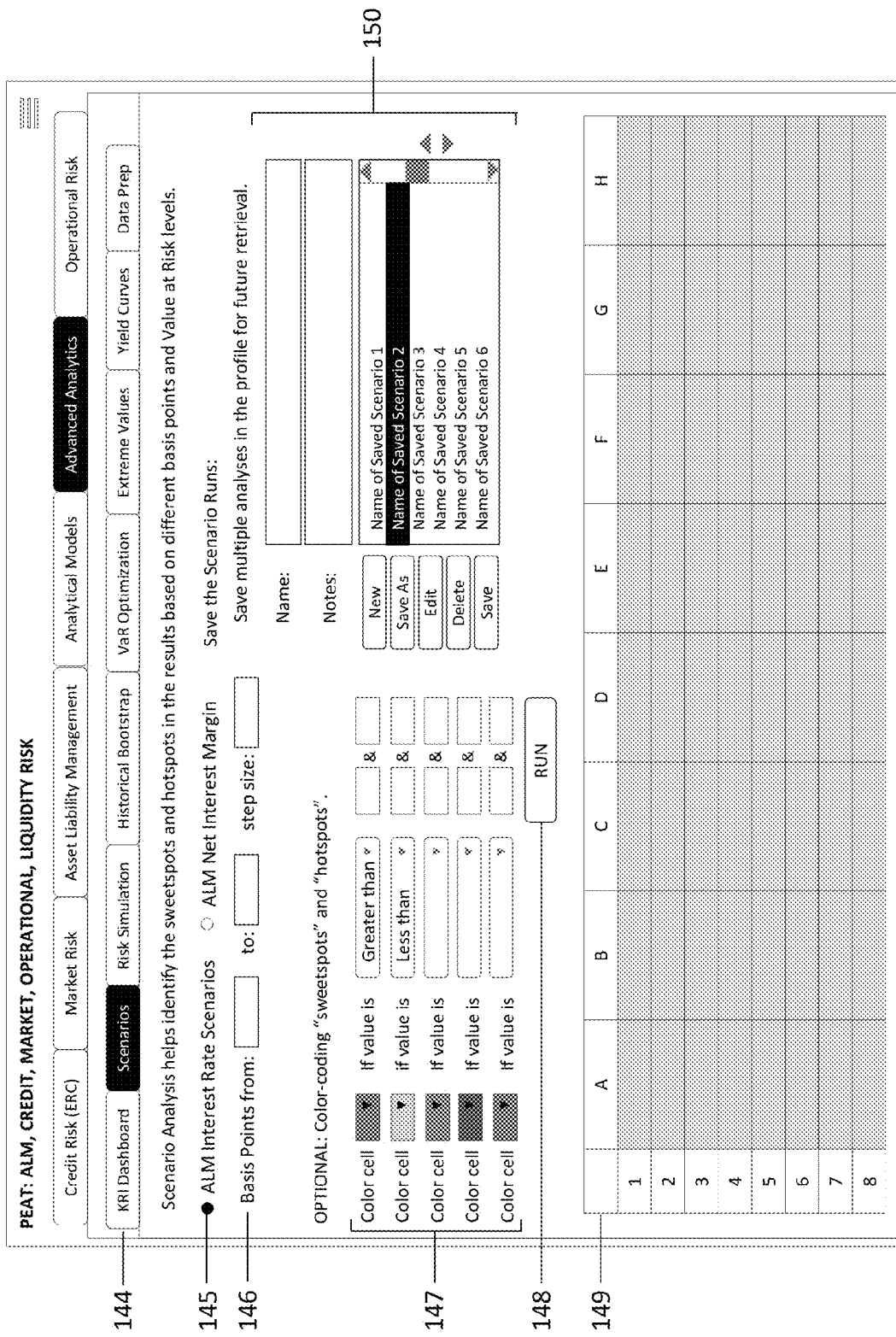
FIG. 28 illustrates the Scenario Analysis input settings and results for ALM Interest Rate analysis and Net Interest Margin analysis.

In an exemplary embodiment according to the present invention, FIG. 28 illustrates the Scenario Analysis 144 of Asset Liability Management (ALM) risk computations, including ALM Interest Rate Scenarios and Net Interest Margin models 145. Depending on which analysis 145 is selected, the Basis Points' From, To, and Step Size values 146 are required inputs. These form the basis of the range of scenarios to test. Users can also optionally set up color coding to quickly and visually identify hotspots and sweet-spots 147 before the analysis is run 148, and results of the scenario analysis are shown in the table 149. If ALM Interest Rate Scenarios 145 is selected, the results computed will be based on FIG. 14's results (the columns are basis points and rows are the various local and foreign currencies). If ALM Net Interest Margin 145 is selected instead, the results will be based on FIG. 16's computations (the columns are basis points and rows are the various net income impacts, financial margins, and the 1-, 3-, 6-, 12-month net income impacts). As usual, the input settings can also be saved for future retrieval 150.

Figure 29:
FIG. 29 illustrates the Monte Carlo Risk Simulation settings and results on Market Risks.

In an exemplary embodiment according to the present invention, FIG. 29 illustrates the Monte Carlo Risk Simulation 151 of invested Market Portfolios. Users begin by entering the starting portfolio investment amount in monetary value and the portfolio holding period (Term) in years 152. The individual invested asset's information is also entered 153, such as the name of the asset, the historical returns and volatilities (both in percent), and the initial or current allocation weights in percent for each asset (the total portfolio weights must sum to 100% by definition), as well as the allowable minimum and maximum limits of each asset's weights. The pairwise correlations between pairs of assets are entered as a correlation matrix 154. Simulations settings can be set, such as the number of trials and whether simulation seed values are required 155, and the analysis is run 156. The analysis is run twice in memory: once on the original portfolio with initial or current allocation weights where the simulated portfolio returns is displayed 157 as a probabilistic distribution, and a second time where the portfolio is first optimized and the optimized allocation weights are displayed back in the grid's last column 153 and another simulation is run after the optimization analysis completes. The optimized portfolio's returns are shown 157 as a probabilistic distribution overlaid on top of the original portfolio as overlay charts and the two distributions' simulated statistics are displayed 158. Users can also compute the one-tail (left tail and right tail) or two-tail confidence intervals 159 of the simulated portfolio returns results. This computation is based on the portfolio level of returns and risks given the percent allocated on various assets, the expected returns and risks on individual assets, and the correlation matrix of the asset mix (users can use a variance-covariance matrix if required or be quickly converted to a correlation matrix). The portfolio risk (computed as volatility) is $$\sigma_P = \sqrt{\sum_{k=1}^{N} w_k^2 \sigma_k^2 + \sum_{i=1}^{m} \sum_{j=1}^{n} 2w_i w_j \rho_{i,j} \sigma_i \sigma_j},$$

where the volatility of each asset k is squared and multiplied by its weight squared, summed, and added to the summation of all pairwise correlations among the assets ($\rho$), by their respective weights (w) and volatilities ($\sigma$).

Figure 30:
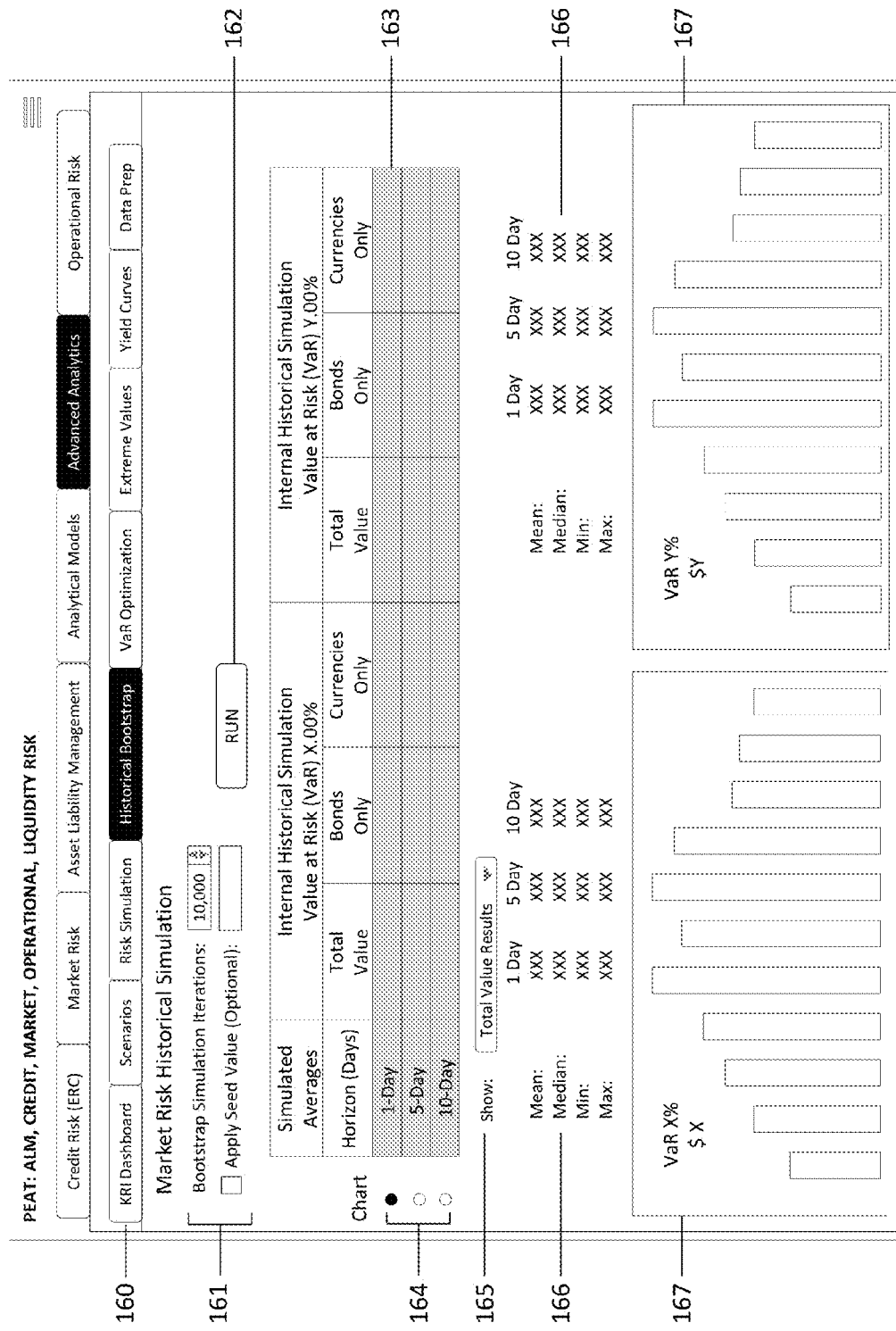
FIG. 30 illustrates the Historical Simulation using Bootstrap Simulation methodologies on Market Risks.

In an exemplary embodiment according to the present invention, FIG. 30 illustrates the Historical Bootstrap Simulation 160 approach. Users start by setting up the number of bootstrap simulation iterations to run and if seed values are required 161 prior to running the model 162. The results of the bootstrap simulations are shown 163 and users can select which horizon period to display on the chart 164 and which Value at Risk (VaR) 165 results to display 166 and chart 167. The historical simulation calculations were previously disclosed in FIGS. 6 and 7, with the difference here being in the current tab that said historical simulation is run multiple times (iterations) instead of a single run. By taking the historical returns, these returns are randomly selected using Monte Carlo Risk Simulation with equal probability using a discrete uniform distribution, and said simulated series of outcome returns is applied as a new historical simulation result, and the process is repeated for N times based on the user-desired number of simulation iterations 161.

Figure 31:
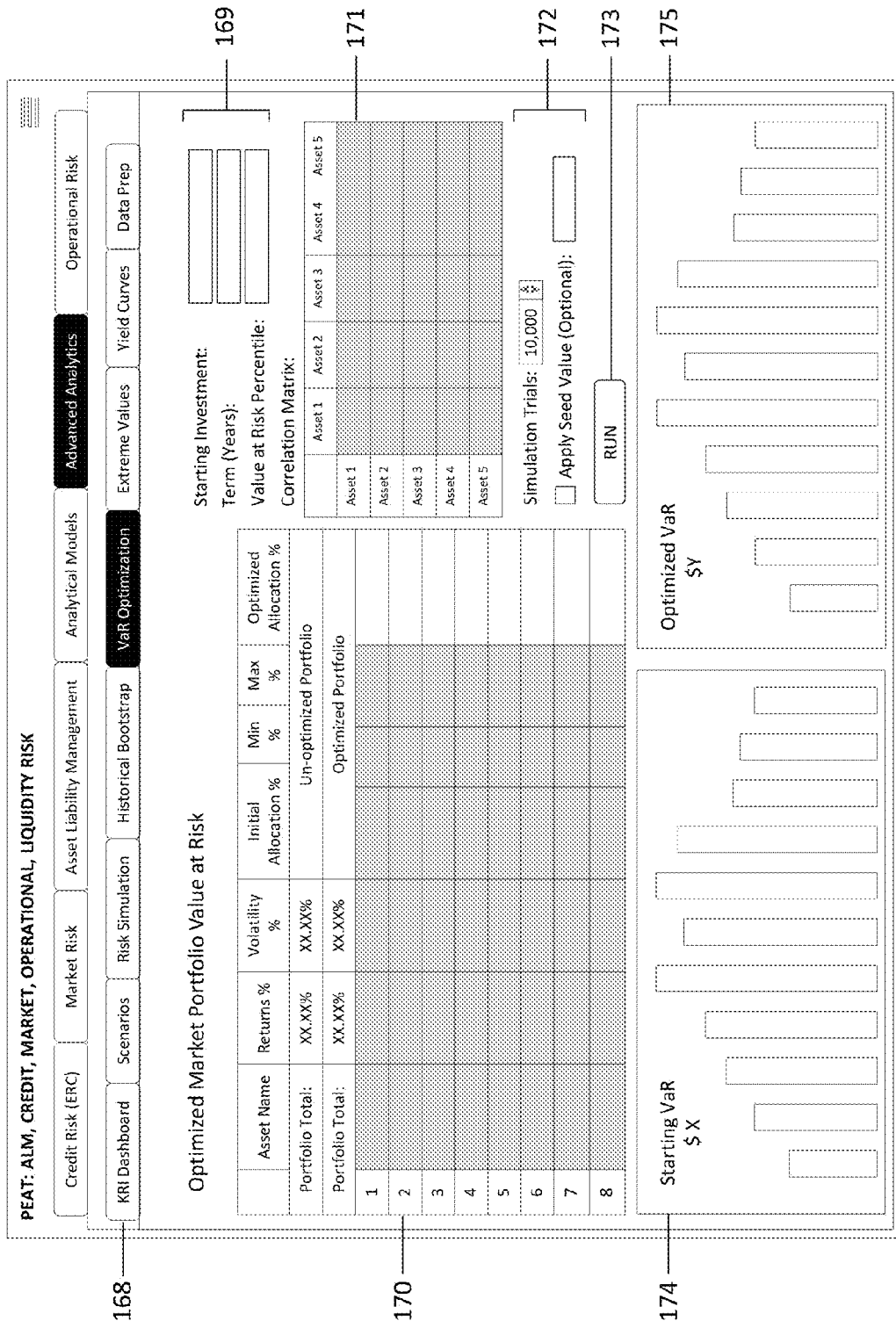
FIG. 31 illustrates the Optimized Market Portfolio Value at Risk analysis where portfolio optimization and Monte Carlo risk simulations are applied.

In an exemplary embodiment according to the present invention, FIG. 31 illustrates the Value at Risk (VaR) Portfolio Optimization 168 computations. An optimized portfolio means the percent investment allocation across multiple assets or investment vehicles is subject to a mathematical algorithm to find the best or optimal weights such that the total portfolio's return is maximized while the total portfolio's risks are minimized, which means, by construction, the Value at Risk (VaR) of the portfolio will be minimized. This means that for the same portfolio of investment holdings, the regulatory capital and economic capital required to hedge the downside risks (as measured using VaR, Economic Capital, Regulatory Capital, and other KRIs as previously described) will be minimized, while the portfolio of investment returns is kept the same or maximized while subject to these constraints. Users begin by entering the starting portfolio investment amount in monetary value, the portfolio holding period (Term) in years, and the desired Value at Risk (VaR) Percentile to use 169 such as 99.00% or 99.90%, and so forth. The individual invested asset's information is also entered 170 such as the name of the asset, the historical returns and volatilities (both in percent), the initial or current allocation weights in percent for each asset (the total portfolio weights must sum to 100% by definition), as well as the allowable minimum and maximum limits of each asset's weights. The pairwise correlations between pairs of assets are entered as a correlation matrix 171. Simulations settings can be set, such as the number of trials and whether simulation seed values are required 172, and the analysis is run 173. The analysis is run twice in memory: once on the original portfolio with initial or current allocation weights where the simulated VaR is displayed 174 as a probabilistic distribution and textual results ($X), and a second time where the portfolio is first optimized and the optimized allocation weights are displayed back in the grid's last column 170, and another simulation is run after the optimization analysis completes. The optimized VaR is shown 175 as a probabilistic distribution as well as in the textual results ($Y) in the chart.

In an exemplary embodiment according to the present invention, FIG. 32 illustrates the Extreme Values 176 analysis tab. Users start by selecting the appropriate extreme value distribution 177 (see the appendix on extreme value theory for more technical details), entering the required input parameters 178 depending on the distribution selected, and running 179 the analysis. The computed Value at Risk (VaR) 180 is shown where users can change the VaR percentages to obtain the simulated VaR values 180, and the distributional statistics 181 of the simulated distribution as well as the visual representation of the probability histogram are shown 182. Users can also use the Data Fitting 183 button to load existing or historical asset or investment performance data to find the best-fitting extreme value distribution, where the fitted results are shown 184 including the distribution's name, the p-value for the fitting, and the distribution's input parameters X, Y, Z, as appropriate (the appendix on extreme value theory lists these distributions and their parameters; the appendix on forecasting, econometric, and statistical models lists the computations required to obtain the p-values; and the appendix on risk simulation mathematics also shows the computational details of distributional parameters). As usual, the inputs and settings can be saved for future retrieval 185.

Figure 33:
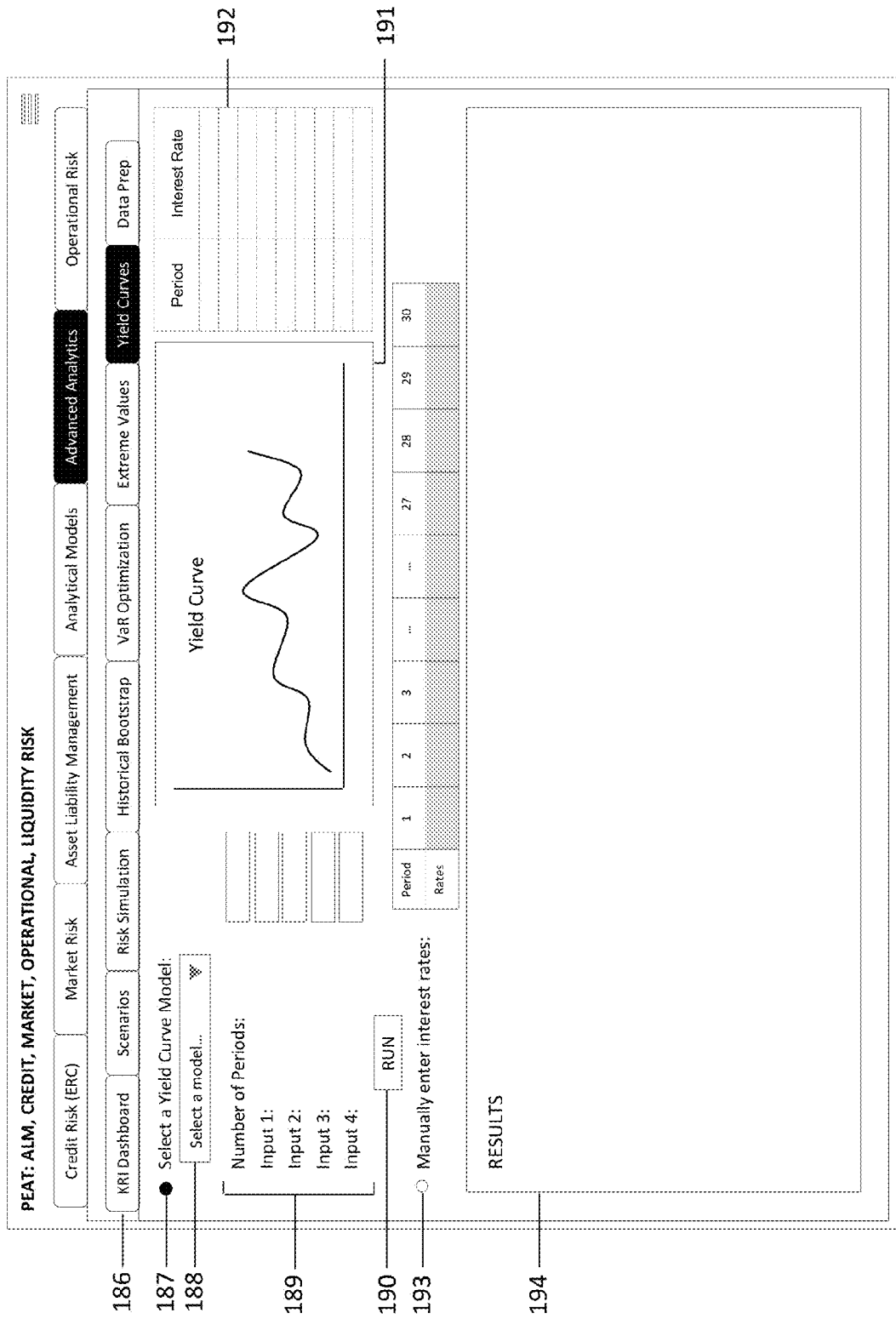
FIG. 33 illustrates the Yield Curves analysis tab.

In an exemplary embodiment according to the present invention, FIG. 33 illustrates the Yield Curves 186 tab. Users start by deciding if a yield curve model 187 should be used by first selecting a yield curve model 188, or users may opt to manually enter their own time-series interest rates 193 allowing users the freedom to enter any sequence of rates including twists and turns as well as other weird shapes and fluctuations of the yield curve to test their effects. If a standard yield curve model is selected, users would then enter the required input parameters 189 based on the model selected and run 190 the computations. The computed yield curve 191 and its numerical interest rates 192 are shown, and the effects of said interest rate fluctuations on the Asset Liability Management (ALM) Interest Rate model and Net Interest Margin (NIM) models are shown in the results area 194. The details of said interest rate models and NIM models have been disclosed in prior sections, and the results 194 shown are merely a recalculation of said models using these updated interest rates.

Figure 34:
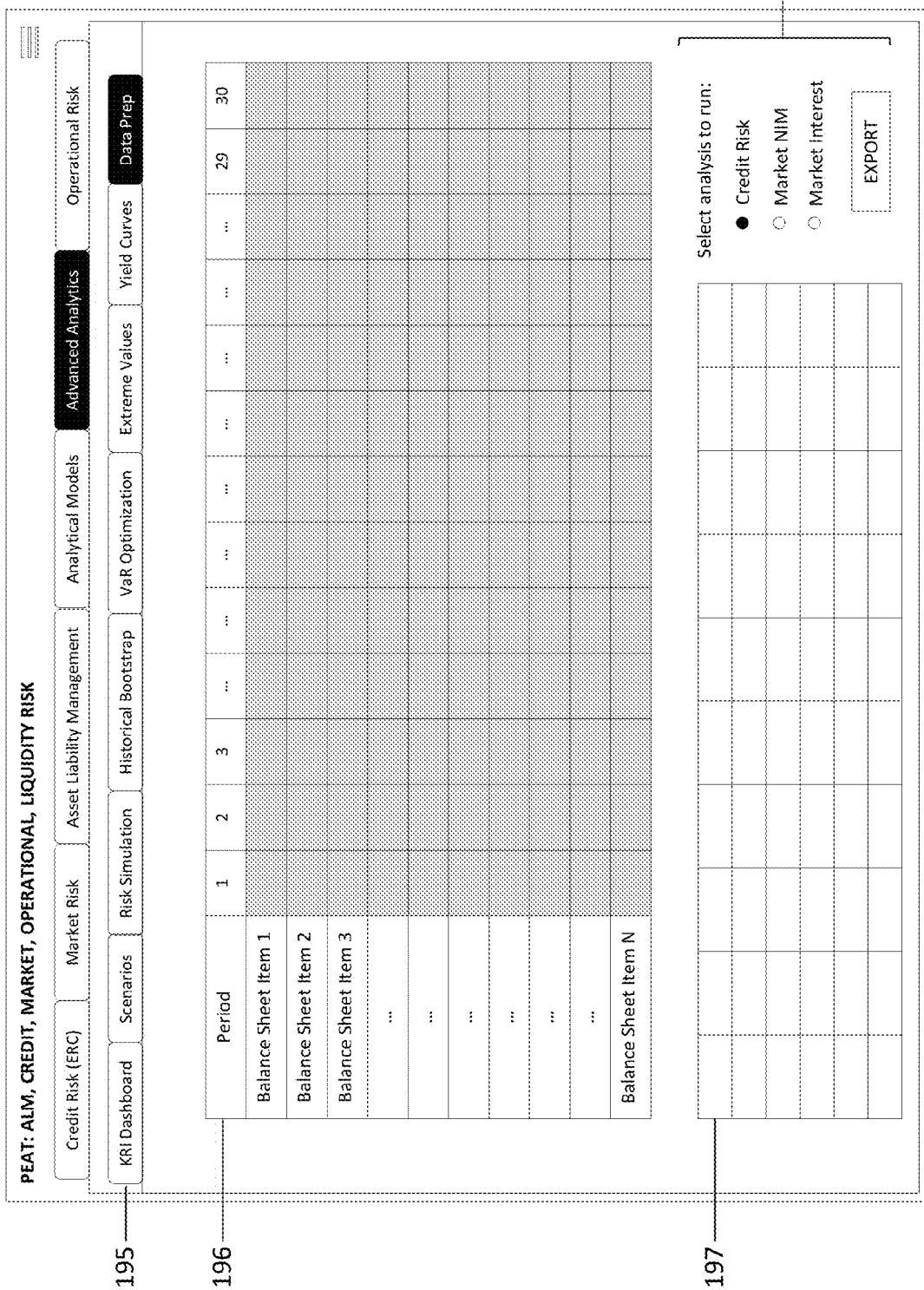
FIG. 34 illustrates the Data Preparation analysis tab.

In an exemplary embodiment according to the present invention, FIG. 34 illustrates the Data Preparation 195 tab. As previously disclosed, the credit risk, market risk, and asset liability management tabs require specific input assumptions for the computations to work. In most cases, banks and financial institutions have said required inputs ready in their computer and database systems. However, in some cases, institutions may require additional assistance in the form of data input preprocessing, where standard financial statements such as balance sheets, income statements, and statement of cash flows can be used and entered into the standard template 196, and the required input parameters in these previously disclosed models are obtained 197 depending on the specific model users require 198. Such data preprocessing and preparation can help users by simply requiring basic and standard financial statements, which, in theory, all financial institutions should be required to maintain, to convert said financial statements into a usable format as inputs into the risk models.

Figure 35:
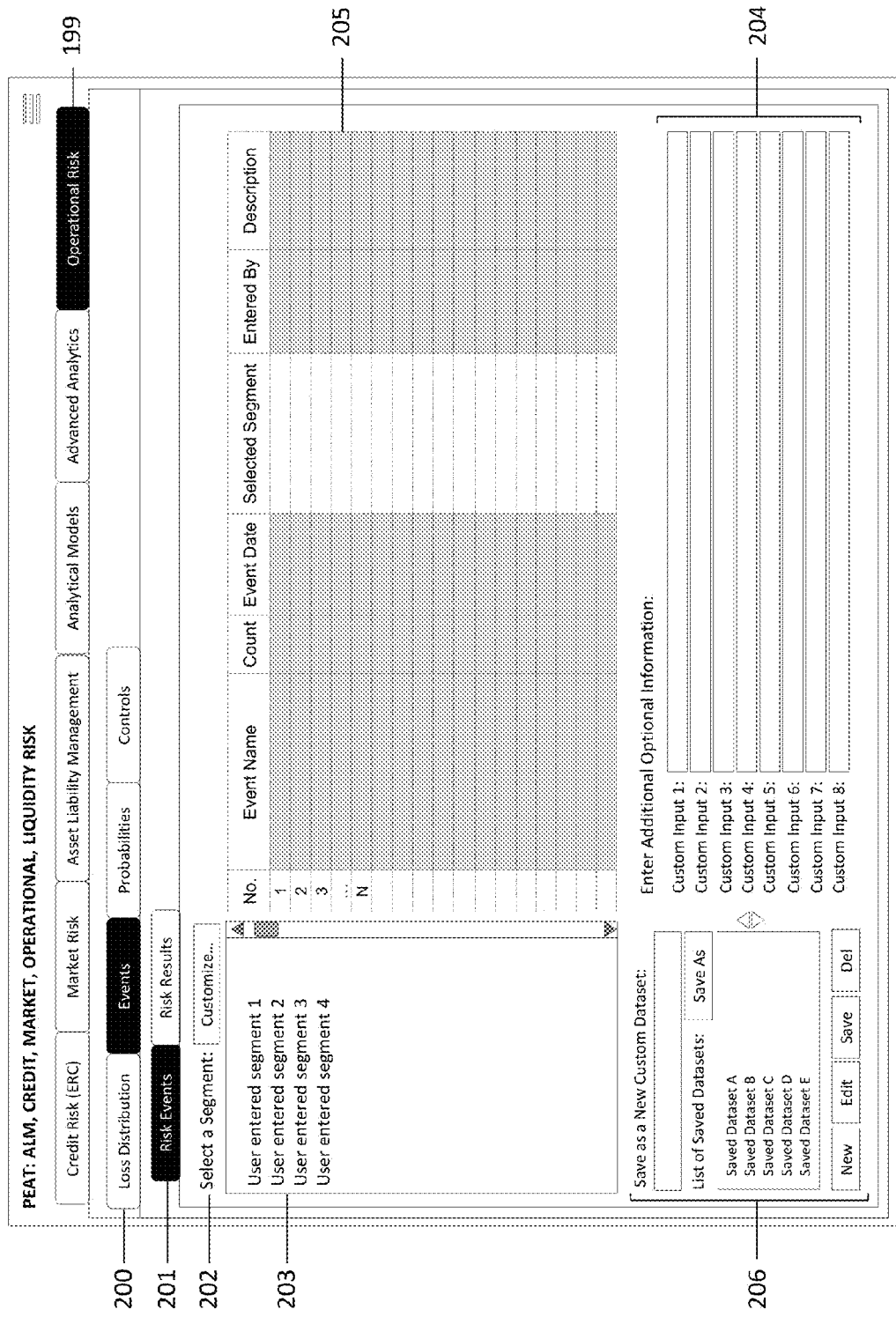
FIG. 35 illustrates the Operational Risk Events analysis tab.

In an exemplary embodiment according to the present invention, FIG. 35 illustrates the Operational Risk 199 Events 200 and Risk Events 201 subtabs where users would enter historical and current risk event occurrences and their respective details. To begin, users would customize 202 the risk events analysis by entering specific risk segments 203. Risk segments can be customized in whatever ways users may wish to have their organization's risks segmented (e.g., segments can include Fraud, Safety, IT, Staffing, and so forth, and within each segment, subsegments can be included, such as IT: Hacking, IT: Server Downtime, or IT: Viruses). Additional customized input categories 204 can also be incorporated (e.g., reported by, details of the reports, causes of the incident, consequences, risk mitigation to be implemented, supervisors' approval, etc.). Users would then enter the risk event information and data 205 (names of events, the count or number of occurrences to report, report date or event date, risk segment selected, entered by, and a short description) and save them for future retrieval, editing, and analysis 206.

Figure 36:
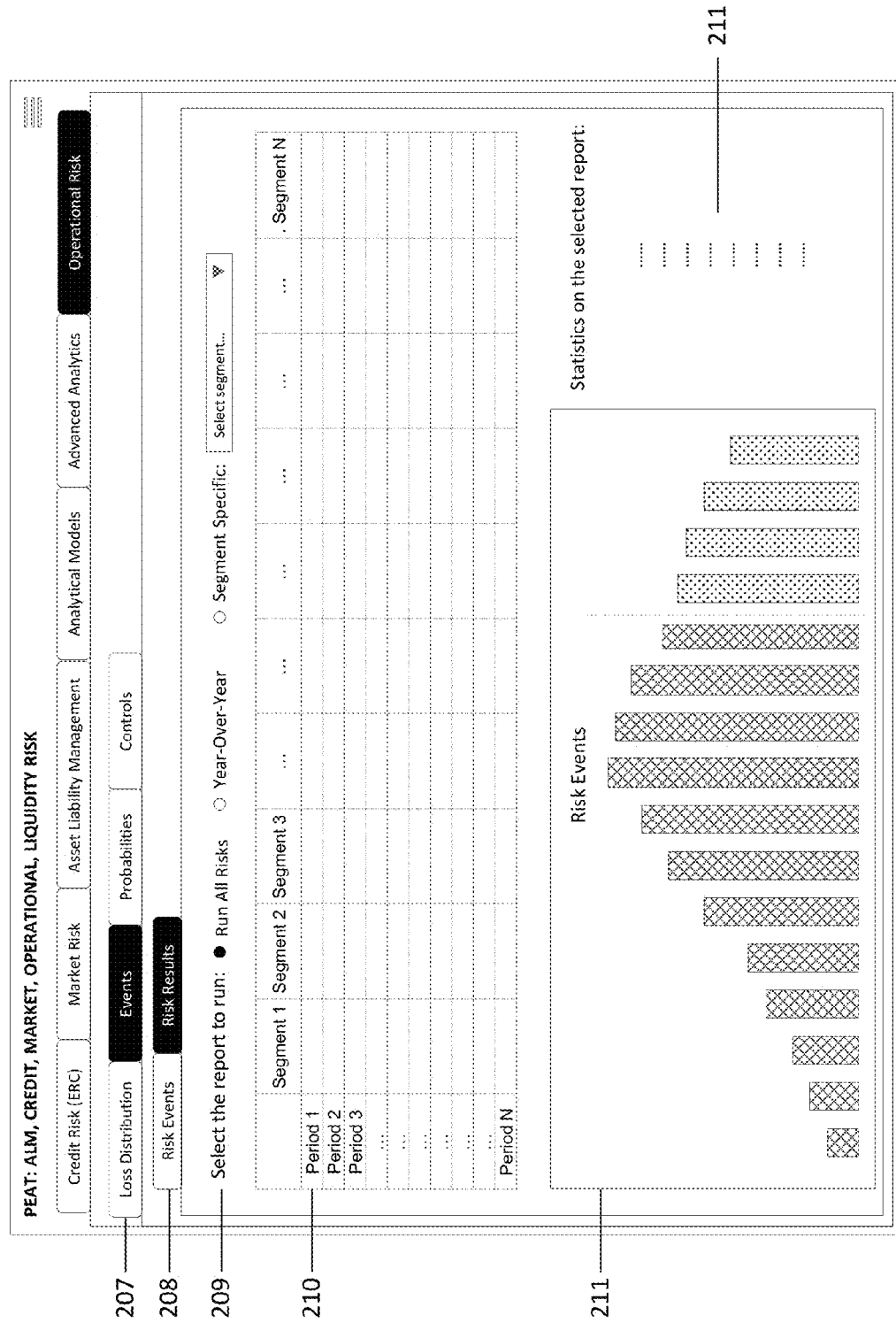
FIG. 36 illustrates the Operational Risk's Risk Results tab.

In an exemplary embodiment according to the present invention, FIG. 36 illustrates the Operational Risk Events' 207 Risk Results 208 subtab. Users start by selecting the relevant report to run 209. Running all risks means all the risk events entered in the previous figure will be summarized and displayed by monthly periods, aggregated by risk segments and counts. Year over Year means the risk events will be aggregated by year and risk segments, compared across multiple years. Segment-specific risk requires users to select the risk segment, and all risk elements entered within this risk segment will be compiled. Depending on the selected settings, a report 210 will be displayed and charted 211 together with a summary of the statistics of the selected report (count, average, earliest and latest dates entered, etc.).

Figure 37:
FIG. 37 illustrates the Operational Risk's Risk Probabilities tab.

In an exemplary embodiment according to the present invention, FIG. 37 illustrates the Operational Risk's Probabilities 212 tab. Sometimes, users may need to determine the probabilities of certain risk events occurring using objective probabilities. For instance, users can assume that the risk of making a mistake in a specific financial transaction (e.g., entering incorrect information on a check deposit at a bank by a teller every day using a Poisson distribution) is, say, on average 1.35 errors across multiple bank branches and locations, then the current tab can compute the exact probability of having zero errors per day, one error per day, two errors per day, and so forth, as well as compute the cumulative probabilities such as to be 90% sure, how many errors exist per day (e.g., we can be 90% sure there will be fewer than 5 errors per day, etc.). Users can select a probability distribution 213 where the selected distribution's description is provided 214 and required input parameters of the selected distribution 215 are provided for entry, and the analysis can be run 216 and results are shown 217 as a cumulative probabilities of occurrence and a visual histogram chart 218. Alternatively, users can enter historical risk events data and perform a data fitting 219 routine to determine the best-fitting distribution and their optimized parameters 220 as well as p-values of fit. Users can then decide whether to use these fitted distributional results or create their own customized settings to use. As usual, the input settings and data can be saved for future retrieval 221.

Figure 38:
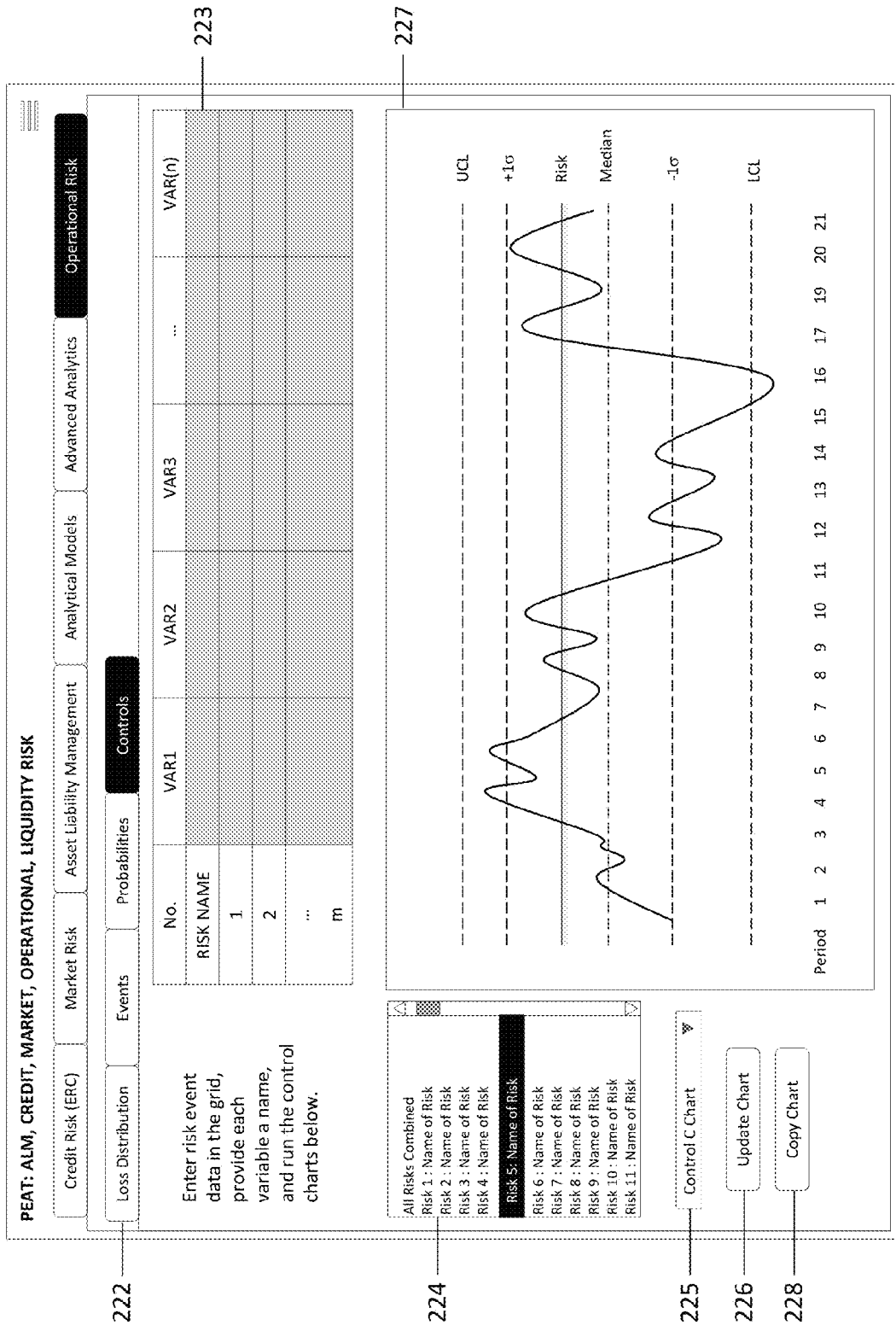
FIG. 38 illustrates the Operational Risk's Controls tab.

In an exemplary embodiment according to the present invention, FIG. 38 illustrates the Operational Risk Controls 222 tab. In this tab, users can enter historical or current data 223 where each column is a specific variable or risk type or segment, and the individual rows are the number of risk events that happened in the past. The risk variables' names entered in the grid will then be listed in the pick-list 224 and users can select one of these saved data variables and the required control chart 225 to update 226 and view 227 or to copy 228 the chart to another software such as Microsoft PowerPoint or Word. In control charts, statistical control limits are automatically computed based on the actual data collected (e.g., the number of frauds or errors). The upper control limit (UCL) and lower control limit (LCL) are computed, as are the central line (CL) and other standard deviation or sigma levels. The resulting chart is called a control chart, and if the process is out of control, the actual defect line will be outside of the UCL and LCL lines. In the interpretation of a control chart, by adding in the ±1 and 2 sigma lines, we can divide the control charts into several areas or zones. See the appendix for more technical details on control charts.

Figure 39:
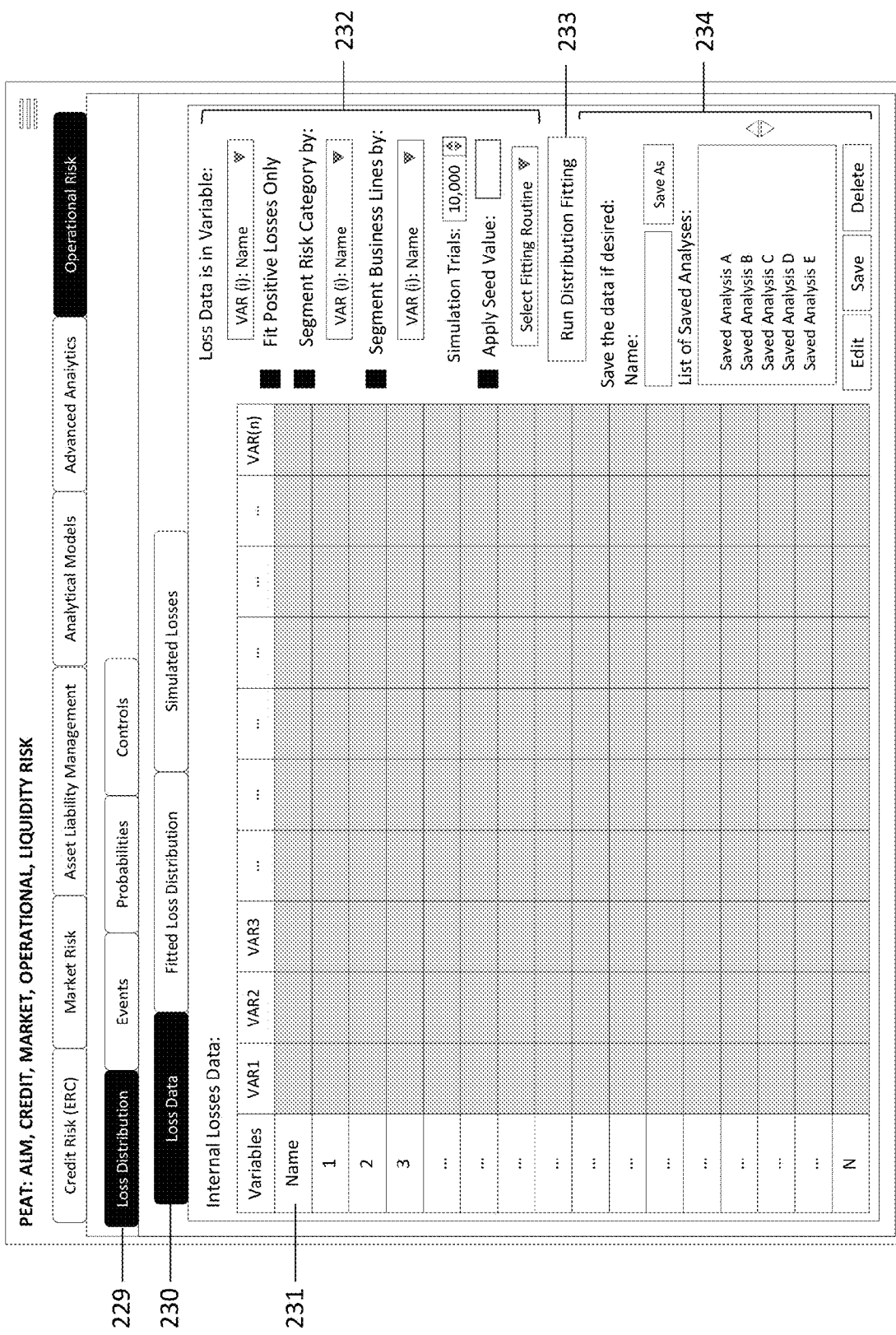
FIG. 39 illustrates the Operational Risk's Loss Data tab.

In an exemplary embodiment according to the present invention, FIG. 39 illustrates the Operational Risk Loss Distribution 229 subtab. Users start at the Loss Data 230 tab where historical loss data can be entered or pasted into the data grid 231. Variables include losses in the past pertaining to operational risks, segmentation by divisions and departments, business lines, dates of losses, risk categories, etc. Users then activate the controls 232 to select how the loss data variables are to be segmented (e.g., by risk categories and risk types and business lines), the number of simulation trials to run, seed values to apply in the simulation if required, all by selecting the relevant variable columns. The distributional fitting routines can also be selected as required (see the appendix for details on distributions and fitting of distributions). Then the analysis can be run 233 and distributions fitted to the data. As usual, the model settings and data can be saved 234 for future retrieval.

Figure 40:
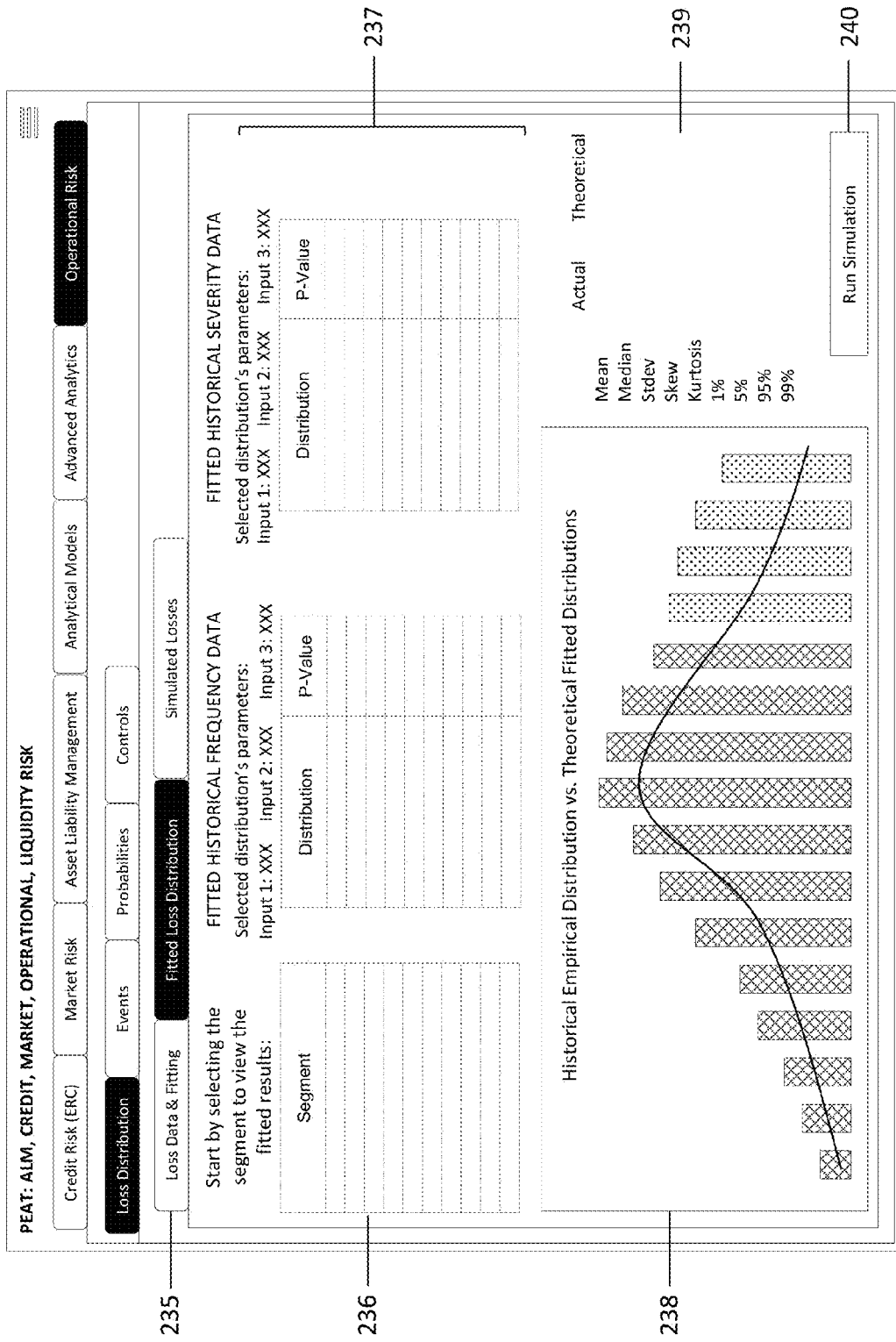
FIG. 40 illustrates the Operational Risk's Fitted Loss Distributions tab.

In an exemplary embodiment according to the present invention, FIG. 40 illustrates the Operational Risk Fitted Loss Distribution 235 subtab. Users start by selecting the fitting segments 236 (see FIG. 39's controls for setting the various risk category and business line segments), and based on the selected segment, the fitted distributions and their p-values are listed 237 and ranked according to the highest p-value to the lowest p-value, indicating the best to the worst statistical fit to the various probability distributions. The empirical data and fitted theoretical distributions are shown graphically 238 and the statistical moments are shown for the actual data versus the theoretically fitted distribution's moments 239. After deciding on which distributions to use, users can then run the simulations 240.

Figure 41:
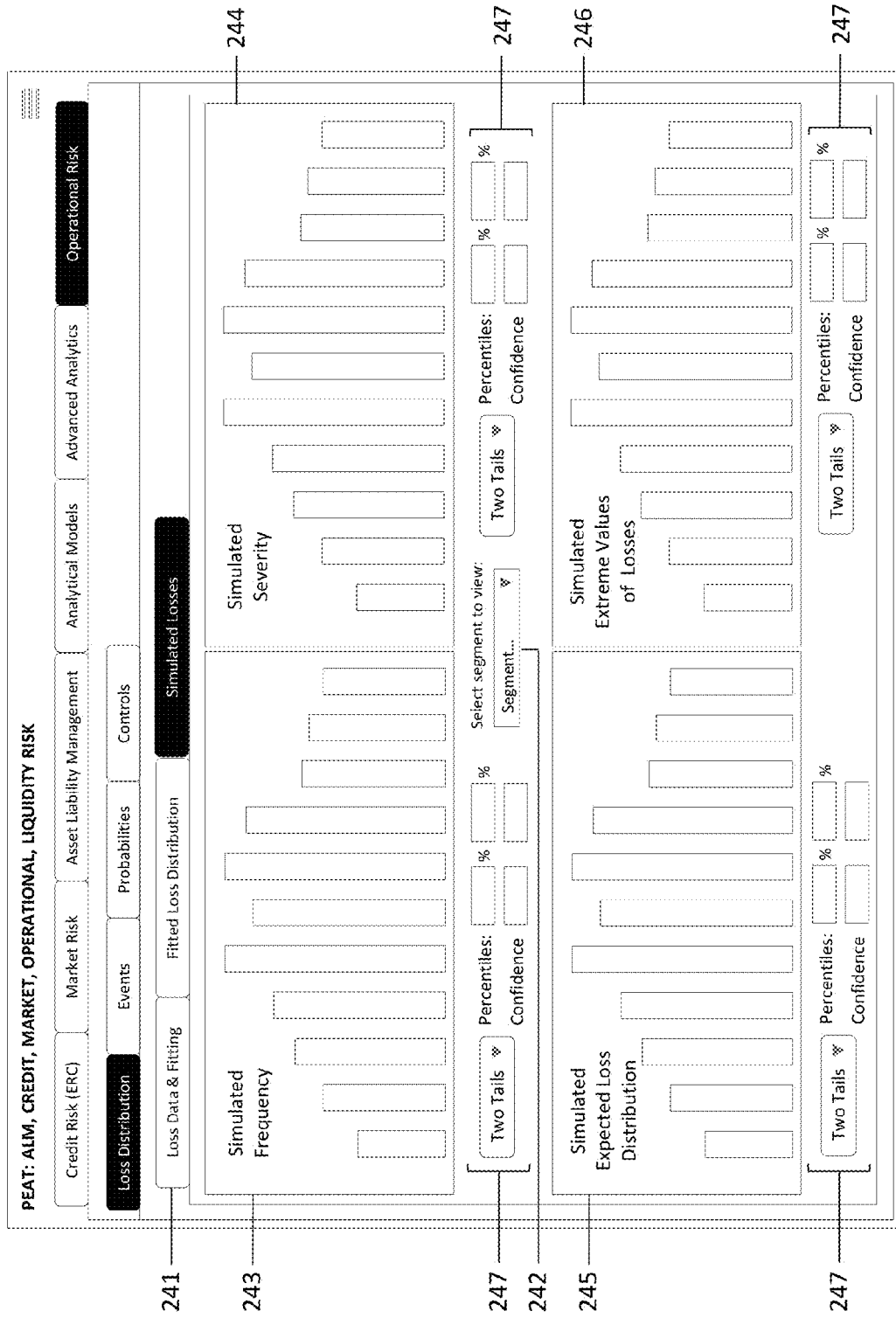
FIG. 41 illustrates the Operational Risk's Simulated Losses tab.

In an exemplary embodiment according to the present invention, FIG. 41 illustrates the Operational Risk Simulated Losses 241 subtab. Where depending on which risk segment and business line that was selected 242, the relevant probability distribution results from the Monte Carlo risk simulations are displayed, including the simulated results on Frequency 243, Severity 244, and the multiplication between frequency and severity, termed Expected Loss Distribution 245, as well as the Extreme Value Distribution of Losses 246 (this is where the extreme losses in the dataset are fitted to the extreme value distributions—see the appendix for details on extreme value distributions and their mathematical models). Each of the distributional charts has its own confidence and percentile inputs 247 where users can select one-tail (right-tail or left-tail) or two-tail confidence intervals, enter the percentiles to obtain the confidence values (e.g., user can enter right-tail 99.90% percentile to receive the Value at Risk confidence value of the worst case losses on the left tail's 0.10%).

APPENDIX

Risk Simulation Mathematics

According to an embodiment of the present invention, this appendix demonstrates the mathematical models and computations used in creating the Monte Carlo simulations. In order to get started with simulation, one first needs to understand the concept of probability distributions. To begin to understand probability, consider this illustrative example: Users want to look at the distribution of nonexempt wages within one department of a large company. First, users gather raw data—in this case, the wages of each nonexempt employee in the department. Second, users organize the data into a meaningful format and plot the data as a frequency distribution on a chart. To create a frequency distribution, users divide the wages into group intervals and list these intervals on the chart's horizontal axis. Then users list the number or frequency of employees in each interval on the chart's vertical axis. Now users can easily see the distribution of nonexempt wages within the department. Users can chart this data as a probability distribution. A probability distribution shows the number of employees in each interval as a fraction of the total number of employees. To create a probability distribution, users divide the number of employees in each interval by the total number of employees and list the results on the chart's vertical axis.

Probability distributions are either discrete or continuous. Discrete probability distributions describe distinct values, usually integers, with no intermediate values and are shown as a series of vertical bars. A discrete distribution, for example, might describe the number of heads in four flips of a coin as 0, 1, 2, 3, or 4. Continuous probability distributions are actually mathematical abstractions because they assume the existence of every possible intermediate value between two numbers; that is, a continuous distribution assumes there are an infinite number of values between any two points in the distribution. However, in many situations, users can effectively use a continuous distribution to approximate a discrete distribution even though the continuous model does not necessarily describe the situation exactly.

Probability Density Functions, Cumulative Distribution Functions, and Probability Mass Functions In mathematics and Monte Carlo simulation, a probability density function (PDF) represents a continuous probability distribution in terms of integrals. If a probability distribution has a density of $f(x)$, then intuitively the infinitesimal interval of $[x, x+dx]$ has a probability of $f(x)dx$. The PDF, therefore, can be seen as a smoothed version of a probability histogram; that is, by providing an empirically large sample of a continuous random variable repeatedly, the histogram using very narrow ranges will resemble the random variable's PDF. The probability of the interval between [a, b] is given by $$\int_a^b f(x)\,dx,$$

which means that the total integral of the function $f$ must be 1.0. It is a common mistake to think of $f(a)$ as the probability of a. This is incorrect. In fact, $f(a)$ can sometimes be larger than 1—consider a uniform distribution between 0.0 and 0.5. The random variable x within this distribution will have $f(x)$ greater than 1. In reality, the probability is the function $f(x)dx$ discussed previously, where dx is an infinitesimal amount.

The cumulative distribution function (CDF) is denoted as $F(x)=P(X\leq x)$, indicating the probability of X taking on a less than or equal value to x. Every CDF is monotonically increasing, is continuous from the right, and, at the limits, has the following properties:

$$\lim_{x\to-\infty} F(x) = 0 \text{ and } \lim_{x\to+\infty} F(x) = 1.$$

Further, the CDF is related to the PDF by $$F(b) - F(a) = P(a \leq X \leq b) = \int_a^b f(x)\,dx,$$

where the PDF function $f$ is the derivative of the CDF function F. In probability theory, a probability mass function (PMF) gives the probability that a discrete random variable is exactly equal to some value. The PMF differs from the PDF in that the values of the latter, defined only for continuous random variables, are not probabilities; rather, its integral over a set of possible values of the random variable is a probability. A random variable is discrete if its probability distribution is discrete and can be characterized by a PMF. Therefore, X is a discrete random variable if $$\sum_u P(X = u) = 1$$

as u runs through all possible values of the random variable X.

Discrete Distributions

Bernoulli or Yes/No Distribution

The Bernoulli distribution is a discrete distribution with two outcomes (e.g., heads or tails, success or failure, 0 or 1). The Bernoulli distribution is the binomial distribution with one trial and can be used to simulate Yes/No or Success/Failure conditions. This distribution is the fundamental building block of other more complex distributions. For instance:

Binomial distribution: Bernoulli distribution with higher number of n total trials and computes the probability of x successes within this total number of trials.

Geometric distribution: Bernoulli distribution with higher number of trials and computes the number of failures required before the first success occurs.

Negative binomial distribution: Bernoulli distribution with higher number of trials and computes the number of failures before the xth success occurs.

The mathematical constructs for the Bernoulli distribution are as follows:

$$P(x) = \begin{cases} 1-p & \text{for } x = 0 \\ p & \text{for } x = 1 \end{cases}$$

or $$P(x) = p^x(1-p)^{1-x}$$

$$\text{mean} = p$$

$$stdev = \sqrt{p(1-p)}$$

$$\text{skewness} = \frac{1-2p}{\sqrt{p(1-p)}}$$

$$\text{excess kurtosis} = \frac{6p^2 - 6p + 1}{p(1-p)}$$

The probability of success (p) is the only distributional parameter. Also, it is important to note that there is only one trial in the Bernoulli distribution, and the resulting simulated value is either 0 or 1. The input requirements are such that: Probability of Success >0 and <1 (i.e., 0.0001≤p≤0.9999).

Binomial Distribution

The binomial distribution describes the number of times a particular event occurs in a fixed number of trials, such as the number of heads in 10 flips of a coin or the number of defective items out of 50 items chosen.

The three conditions underlying the binomial distribution are:

For each trial, only two outcomes are possible that are mutually exclusive.

The trials are independent—what happens in the first trial does not affect the next trial.

The probability of an event occurring remains the same from trial to trial.

The mathematical constructs for the binomial distribution are as follows:

$$P(x) = \frac{n!}{x!(n-x)!} p^x (1-p)^{(n-x)}$$

for $n > 0; x = 0, 1, 2, \ldots n;$ and $0 < p < 1$ $$\text{mean} = np$$

$$stdev = \sqrt{np(1-p)}$$

$$\text{skewness} = \frac{1-2p}{\sqrt{np(1-p)}}$$

$$\text{excess kurtosis} = \frac{6p^2 - 6p + 1}{np(1-p)}$$

The probability of success (p) and the integer number of total trials (n) are the distributional parameters. The number of successful trials is denoted x. It is important to note that probability of success (p) of 0 or 1 are trivial conditions and do not require any simulations, and, hence, are not allowed in the software. The input requirements are such that Probability of Success >0 and <1 (i.e., 0.0001≤p≤0.9999), the Number of Trials ≥1 or positive integers and ≤1,000 (for larger trials, use the normal distribution with the relevant computed binomial mean and standard deviation as the normal distribution's parameters).

Discrete Uniform

The discrete uniform distribution is also known as the equally likely outcomes distribution, where the distribution has a set of N elements, and each element has the same probability. This distribution is related to the uniform distribution but its elements are discrete and not continuous. The mathematical constructs for the discrete uniform distribution are as follows:

$$P(x) = \frac{1}{N}$$

$$\text{mean} = \frac{N+1}{2} \text{ ranked value}$$

$$\text{standard deviation} = \sqrt{\frac{(N-1)(N+1)}{12}} \text{ ranked value}$$

skewness = 0 (i.e., the distribution is perfectly symmetrical)

$$\text{excess kurtosis} = \frac{-6(N^2 + 1)}{5(N-1)(N+1)} \text{ ranked value}$$

The input requirements are such that Minimum<Maximum and both must be integers (negative integers and zero are allowed).

Geometric Distribution

The geometric distribution describes the number of trials until the first successful occurrence, such as the number of times one would need to spin a roulette wheel before winning.

The three conditions underlying the geometric distribution are:

The number of trials is not fixed.

The trials continue until the first success.

The probability of success is the same from trial to trial.

The mathematical constructs for the geometric distribution are as follows:

$$P(x) = p(1-p)^{x-1} \text{ for } 0 < p < 1 \text{ and } x = 1, 2, \ldots, n$$

$$\text{mean} = \frac{1}{p} - 1$$

$$\text{standard deviation} = \sqrt{\frac{1-p}{p^2}}$$

$$\text{skewness} = \frac{2-p}{\sqrt{1-p}}$$

$$\text{excess kurtosis} = \frac{p^2 - 6p + 6}{1-p}$$

The probability of success (p) is the only distributional parameter. The number of successful trials simulated is denoted x, which can only take on positive integers. The input requirements are such that Probability of Success >0 and <1 (i.e., 0.0001≤p≤0.9999). It is important to note that probability of success (p) of 0 or 1 are trivial conditions and do not require any simulations, and, hence, are not allowed in the software.

Hypergeometric Distribution

The hypergeometric distribution is similar to the binomial distribution in that both describe the number of times a particular event occurs in a fixed number of trials. The difference is that binomial distribution trials are independent, whereas hypergeometric distribution trials change the probability for each subsequent trial and are called trials without replacement. As an illustrative example, suppose a box of manufactured parts is known to contain some defective parts. Users choose a part from the box, find it is defective, and remove the part from the box. If users choose another part from the box, the probability that it is defective is somewhat lower than for the first part because users have removed a defective part. If users had replaced the defective part, the probabilities would have remained the same, and the process would have satisfied the conditions for a binomial distribution.

The three conditions underlying the hypergeometric distribution are as follows:
  The total number of items or elements (the population size) is a fixed number, a finite population. The population size must be less than or equal to 1,750.
  The sample size (the number of trials) represents a portion of the population.
  The known initial probability of success in the population changes after each trial.

The mathematical constructs for the hypergeometric distribution are as follows:

$$P(x) = \frac{\frac{(N_x)!}{x!(N_x-x)!} \frac{(N-N_x)!}{(n-x)!(N-N_x-n+x)!}}{\frac{N!}{n!(N-n)!}}$$

for $x = \text{Max}(n - (N - N_x), 0), \ldots, \text{Min}(n, N_x)$ $$\text{mean} = \frac{M_x n}{N}$$

$$\text{standard deviation} = \sqrt{\frac{(N-N_x)N_x n(N-n)}{N^2(N-1)}}$$

$$\text{skewness} = \frac{(N-2N_x)(N-2n)}{N-2} \sqrt{\frac{N-1}{(N-N_x)N_x n(N-n)}}$$

$$\text{excess kurtosis} = \frac{V(N, N_x, n)}{(N-N_x)N_x n(-3+N)(-2+N)(-N+n)} \text{ where}$$

$V(N, N_x, n) = (N-N_x)^3 - (N-N_x)^5 + 3(N-N_x)^2 N_x - 6(N-N_x)^3 N_x +$
$(N-N_x)^4 N_x + 3(N-N_x)N_x^2 - 12(N-N_x)^2 N_x^2 + 8(N-N_x)^3 N_x^2 +$
$N_x^3 - 6(N-N_x)N_x^3 + 8(N-N_x)^2 N_n^3 + (N-N_x)N_x^4 - N_x^5 -$
$6(N-N_x)^3 N_x + 6(N-N_x)^4 N_x + 18(N-N_x)^2 N_x n - 6(N-N_x)^3 N_x n +$
$18(N-N_x)N_x^2 n - 24(N-N_x)^2 N_x^2 n - 6(N-N_x)^3 n - 6(N-N_x)N_x^3 n +$
$6N_x^4 n + 6(N-N_x)^2 n^2 - 6(N-N_x)^3 n^2 - 24(N-N_x)N_x n^2 +$
$12(N-N_x)^2 N_x n^2 + 6N_x^2 n^2 + 12(N-N_x)N_x^2 n^2 - 6N_x^3 n^2$

The number of items in the population (N), number of trials sampled (n), and number of items in the population that have the successful trait ($N_x$) are the distributional parameters. The number of successful trials is denoted x. The input requirements are such that Population $\geq 2$ and integer, Trials >0 and integer, Successes >0 and integer, Population>Successes Trials<Population, and Population <1750.

Negative Binomial Distribution

The negative binomial distribution is useful for modeling the distribution of the number of trials until the rth successful occurrence, such as the number of historical calls that need to be made to close a total of 10 orders. It is essentially a superdistribution of the geometric distribution. This distribution shows the probabilities of each number of trials in excess of r to produce the required success r.

The three conditions underlying the negative binomial distribution are as follows:
  The number of trials is not fixed.
  The trials continue until the rth success.
  The probability of success is the same from trial to trial.

The mathematical constructs for the negative binomial distribution are as follows:

$$P(x) = \frac{(x+r-1)!}{(r-1)!x!} p^r (1-p)^x$$

for $x = r, r+1, \ldots$; and $0 < p < 1$ $$\text{mean} = \frac{r(1-p)}{p}$$

$$\text{standard deviation} = \sqrt{\frac{r(1-p)}{p^2}}$$

$$\text{skewness} = \frac{2-p}{\sqrt{r(1-p)}}$$

$$\text{excess kurtosis} = \frac{p^2 - 6p + 6}{r(1-p)}$$

Probability of success (p) and required successes (r) are the distributional parameters. Where the input requirements are such that Successes required must be positive integers >0 and <8000, and Probability of Success >0 and <1 (i.e., $0.0001 \leq p \leq 0.9999$). It is important to note that probability of success (p) of 0 or 1 are trivial conditions and do not require any simulations, and, hence, are not allowed in the software.

Poisson Distribution

The Poisson distribution describes the number of times an event occurs in a given interval, such as the number of telephone calls per minute or the number of errors per page in a document.

The three conditions underlying the Poisson distribution are as follows:
  The number of possible occurrences in any interval is unlimited.
  The occurrences are independent. The number of occurrences in one interval does not affect the number of occurrences in other intervals.
  The average number of occurrences must remain the same from interval to interval.

The mathematical constructs for the Poisson are as follows:

$$P(x) = \frac{e^{-\lambda} \lambda^x}{x!} \text{ for } x \text{ and } \lambda > 0$$

$$\text{mean} = \lambda$$

$$\text{standard deviation} = \sqrt{\lambda}$$

$$\text{skewness} = \frac{1}{\sqrt{\lambda}}$$

$$\text{excess kurtosis} = \frac{1}{\lambda}$$

Rate ($\lambda$) is the only distributional parameter, and the input requirements are such that Rate >0 and $\leq 1,000$ (i.e., $0.0001 \leq \text{rate} \leq 1,000$).

Continuous Distributions

Beta Distribution

The beta distribution is very flexible and is commonly used to represent variability over a fixed range. One of the more important applications of the beta distribution is its use as a conjugate distribution for the parameter of a Bernoulli distribution. In this application, the beta distribution is used to represent the uncertainty in the probability of occurrence of an event. It is also used to describe empirical data and predict the random behavior of percentages and fractions, as the range of outcomes is typically between 0 and 1. The value of the beta distribution lies in the wide variety of shapes it can assume when users vary the two parameters, alpha and beta. If the parameters are equal, the distribution is symmetrical. If either parameter is 1 and the other parameter is greater than 1, the distribution is J shaped. If alpha is less than beta, the distribution is said to be positively skewed (most of the values are near the minimum value). If alpha is greater than beta, the distribution is negatively skewed (most of the values are near the maximum value). The mathematical constructs for the beta distribution are as follows:

$$f(x) = \frac{(x)^{(\alpha-1)}(1-x)^{(\beta-1)}}{\left[\frac{\Gamma(\alpha)\Gamma(\beta)}{\Gamma(\alpha+\beta)}\right]} \text{ for } \alpha > 0; \beta > 0; x > 0$$

$$\text{mean} = \frac{\alpha}{\alpha+\beta}$$

$$\text{standard deviation} = \sqrt{\frac{\alpha\beta}{(\alpha+\beta)^2(1+\alpha+\beta)}}$$

$$\text{skewness} = \frac{2(\beta-\alpha)\sqrt{1+\alpha+\beta}}{(2+\alpha+\beta)\sqrt{\alpha\beta}}$$

$$\text{excess kurtosis} = \frac{3(\alpha+\beta+1)[\alpha\beta(\alpha+\beta-6)+2(\alpha+\beta)^2]}{\alpha\beta(\alpha+\beta+2)(\alpha+\beta+3)} - 3$$

Alpha ($\alpha$) and beta ($\beta$) are the two distributional shape parameters, and $\Gamma$ is the gamma function. The two conditions underlying the beta distribution are as follows:
  The uncertain variable is a random value between 0 and a positive value.
  The shape of the distribution can be specified using two positive values.
Input Requirements:
  Alpha and beta >0 and can be any positive value.
Cauchy Distribution or Lorentzian Distribution or Breit-Wigner Distribution The Cauchy distribution, also called the Lorentzian distribution or Breit-Wigner distribution, is a continuous distribution describing resonance behavior. It also describes the distribution of horizontal distances at which a line segment tilted at a random angle cuts the x-axis.

The mathematical construct for the Cauchy distribution is as follows:

$$f(x) = \frac{1}{\pi} \frac{\gamma/2}{(x-m)^2 + \gamma^2/4}$$

The Cauchy distribution is a special case where it does not have any theoretical moments (mean, standard deviation, skewness, and kurtosis) as they are all undefined. Mode location (m) and scale ($\gamma$) are the only two parameters in this distribution. The location parameter specifies the peak or mode of the distribution, while the scale parameter specifies the half-width at half-maximum of the distribution. In addition, the mean and variance of a Cauchy distribution are undefined. In addition, the Cauchy distribution is the Student's t distribution with only 1 degree of freedom. This distribution is also constructed by taking the ratio of two standard normal distributions (normal distributions with a mean of zero and a variance of one) that are independent of one another. The input requirements are such that Location can be any value, whereas Scale >0 and can be any positive value.

Chi-Square Distribution

The chi-square distribution is a probability distribution used predominantly in hypothesis testing and is related to the gamma distribution and the standard normal distribution. For instance, the sums of independent normal distributions are distributed as a chi-square ($\chi^2$) with k degrees of freedom:

$$Z_1^2 + Z_2^2 + \ldots + Z_k^2 \sim \chi_k^2$$

The mathematical constructs for the chi-square distribution are as follows:

$$f(x) = \frac{2^{k/2-1}}{\Gamma(k/2)} x^{k/2-1} e^{-x/2} \text{ for all } x > 0$$

$$\text{mean} = k$$

$$\text{standard deviation} = \sqrt{2k}$$

$$\text{skewness} = 2\sqrt{\frac{2}{k}}$$

$$\text{excess kurtosis} = \frac{12}{k}$$

$\Gamma$ is the gamma function. Degrees of freedom k is the only distributional parameter.

The chi-square distribution can also be modeled using a gamma distribution by setting the shape parameter=k/2 and scale=$2S^2$ where S is the scale. The input requirements are such that Degrees of Freedom >1 and must be an integer <1,000.

Exponential Distribution

The exponential distribution is widely used to describe events recurring at random points in time, such as the time between failures of electronic equipment or the time between arrivals at a service booth. It is related to the Poisson distribution, which describes the number of occurrences of an event in a given interval of time. An important characteristic of the exponential distribution is the "memoryless" property, which means that the future lifetime of a given object has the same distribution, regardless of the time it existed. In other words, time has no effect on future outcomes. The mathematical constructs for the exponential distribution are as follows:

$$f(x) = xe^{-\lambda x} \text{ for } x \geq 0; \lambda > 0$$

$$\text{mean} = \frac{1}{\lambda}$$

$$\text{standard deviation} = \frac{1}{\lambda}$$

skewness = 2(this value applies to all success rate $\lambda$ inputs)

excess kurtosis = 6(this value applies to all success rate $\lambda$ inputs)

Success rate ($\lambda$) is the only distributional parameter. The number of successful trials is x.

The condition underlying the exponential distribution is
The exponential distribution describes the amount of time between occurrences.
Input requirements: Rate $>0$ and $\leq 300$.

Extreme Value Distribution or Gumbel Distribution

The extreme value distribution (Type 1) is commonly used to describe the largest value of a response over a period of time, for example, in flood flows, rainfall, and earthquakes. Other applications include the breaking strengths of materials, construction design, and aircraft loads and tolerances. The extreme value distribution is also known as the Gumbel distribution.

The mathematical constructs for the extreme value distribution are as follows:

$$f(x) = \frac{1}{\beta} z e^{-z} \text{ where } z = e^{\frac{x-m}{\beta}}$$

for $\beta > 0$; and any value of $x$ and $m$ mean $= m + 0.577215\beta$ standard deviation $= \sqrt{\frac{1}{6}\pi^2 \beta^2}$ skewness $= \frac{12\sqrt{6}\,(1.2020569)}{\pi^3} =$ 1.13955 (this applies for all values of mode and scale)

excess kurtosis $= 5.4$ (this applies for all values of mode and scale)

Mode (m) and scale (β) are the distributional parameters. There are two standard parameters for the extreme value distribution: mode and scale. The mode parameter is the most likely value for the variable (the highest point on the probability distribution). The scale parameter is a number greater than 0. The larger the scale parameter, the greater the variance. The input requirements are such that Mode can be any value and Scale $>0$.

F Distribution or Fisher-Snedecor Distribution

The F distribution, also known as the Fisher-Snedecor distribution, is another continuous distribution used most frequently for hypothesis testing. Specifically, it is used to test the statistical difference between two variances in analysis of variance tests and likelihood ratio tests. The F distribution with the numerator degree of freedom n and denominator degree of freedom m is related to the chi-square distribution in that:

$$\frac{\chi_n^2/n}{\chi_m^2/m} \stackrel{d}{\sim} F_{n,m}$$

$$f(x) = \frac{\Gamma\left(\frac{n+m}{2}\right)\left(\frac{n}{m}\right)^{n/2} x^{n/2-1}}{\Gamma\left(\frac{n}{2}\right)\Gamma\left(\frac{m}{2}\right)\left[x\left(\frac{n}{m}\right)+1\right]^{(n+m)/2}}$$

or mean $= \dfrac{m}{m-2}$ standard deviation $= \dfrac{2m^2(m+n-2)}{n(m-2)^2(m-4)}$ for all $m > 4$ skewness $= \dfrac{2(m+2n-2)}{m-6}\sqrt{\dfrac{2(m-4)}{n(m+n-2)}}$ excess kurtosis $= \dfrac{12(-16 + 20m - 8m^2 + m^3 + 44n - 32mn + 5m^2n - 22n^2 + 5mn^2)}{n(m-6)(m-8)(n+m-2)}$ The numerator degree of freedom n and denominator degree of freedom m are the only distributional parameters. The input requirements are such that degrees of freedom numerator and degrees of freedom denominator are both $>0$ integers.

Gamma Distribution (Erlang Distribution)

The gamma distribution applies to a wide range of physical quantities and is related to other distributions: lognormal, exponential, Pascal, Erlang, Poisson, and chi-square. It is used in meteorological processes to represent pollutant concentrations and precipitation quantities. The gamma distribution is also used to measure the time between the occurrences of events when the event process is not completely random. Other applications of the gamma distribution include inventory control, economic theory, and insurance risk theory.

The gamma distribution is most often used as the distribution of the amount of time until the rth occurrence of an event in a Poisson process. When used in this fashion, the three conditions underlying the gamma distribution are as follows:

The number of possible occurrences in any unit of measurement is not limited to a fixed number.

The occurrences are independent. The number of occurrences in one unit of measurement does not affect the number of occurrences in other units.

The average number of occurrences must remain the same from unit to unit.

The mathematical constructs for the gamma distribution are as follows:

$$f(x) = \frac{\left(\frac{x}{\beta}\right)^{\alpha-1} e^{-\frac{x}{\beta}}}{\Gamma(\alpha)\beta} \text{ with any value of } \alpha > 0 \text{ and } \beta > 0$$

mean $= \alpha\beta$ standard deviation $= \sqrt{\alpha\beta^2}$ skewness $= \dfrac{2}{\sqrt{\alpha}}$ excess kurtosis $= \dfrac{6}{\alpha}$ Shape parameter alpha (α) and scale parameter beta (β) are the distributional parameters, and Γ is the gamma function. When the alpha parameter is a positive integer, the gamma distribution is called the Erlang distribution, used to predict waiting times in queuing systems, where the Erlang distribution is the sum of independent and identically distributed random variables each having a memoryless exponential distribution. With Setting n as the number of these random variables, the mathematical construct of the Erlang distribution is:

$$f(x) = \frac{x^{n-1} e^{-x}}{(n-1)!} \text{ for all } x > 0$$

and all positive integers of n, where the input requirements are such that Scale Beta >0 and can be any positive value, Shape Alpha ≥0.05 and can be any positive value, and Location can be any value.

Logistic Distribution

The logistic distribution is commonly used to describe growth, that is, the size of a population expressed as a function of a time variable. It also can be used to describe chemical reactions and the course of growth for a population or individual.

The mathematical constructs for the logistic distribution are as follows:

$$f(x) = \frac{e^{\frac{\mu-x}{\alpha}}}{\alpha\left[1+e^{\frac{\mu-x}{\alpha}}\right]^{-2}} \text{ for any value of } \alpha \text{ and } \beta$$

$$\text{mean} = \mu$$

$$\text{standard deviation} = \sqrt{\frac{1}{3}\pi^2\alpha^2}$$

skewness = 0(this applies to all mean and scale inputs)

excess kurtosis = 1.2(this applies to all mean and scale inputs)

Mean ($\mu$) and scale ($\alpha$) are the distributional parameters. There are two standard parameters for the logistic distribution: mean and scale. The mean parameter is the average value, which for this distribution is the same as the mode because this distribution is symmetrical. The scale parameter is a number greater than 0. The larger the scale parameter, the greater the variance.

Input Requirements:

Scale >0 and can be any positive value.

Mean can be any value.

Lognormal Distribution

The lognormal distribution is widely used in situations where values are positively skewed, for example, in financial analysis for security valuation or in real estate for property valuation, and where values cannot fall below zero. Stock prices are usually positively skewed rather than normally (symmetrically) distributed. Stock prices exhibit this trend because they cannot fall below the lower limit of zero but might increase to any price without limit. Similarly, real estate prices illustrate positive skewness and are lognormally distributed as property values cannot become negative.

The three conditions underlying the lognormal distribution are as follows:

The uncertain variable can increase without limits but cannot fall below zero.

The uncertain variable is positively skewed, with most of the values near the lower limit.

The natural logarithm of the uncertain variable yields a normal distribution.

Generally, if the coefficient of variability is greater than 30%, use a lognormal distribution. Otherwise, use the normal distribution.

The mathematical constructs for the lognormal distribution are as follows:

$$f(x) = \frac{1}{x\sqrt{2\pi}\ln(\sigma)} e^{-\frac{[\ln(x)-\ln(\mu)]^2}{2[\ln(\sigma)]^2}}$$

for $x > 0; \mu > 0$ and $\sigma > 0$ $$\text{mean} = \exp\left(\mu + \frac{\sigma^2}{2}\right)$$

$$\text{standard deviation} = \sqrt{\exp(\sigma^2 + 2\mu)[\exp(\sigma^2) - 1]}$$

$$\text{skewness} = \lfloor\sqrt{\exp(\sigma^2) - 1}\rfloor(2 + \exp(\sigma^2))$$

$$\text{excess kurtosis} = \exp(4\sigma^2) + 2\exp(3\sigma^2) + 3\exp(2\sigma^2) - 6$$

Mean ($\mu$) and standard deviation ($\sigma$) are the distributional parameters. The input requirements are such that Mean and Standard deviation are both >0 and can be any positive value. By default, the lognormal distribution uses the arithmetic mean and standard deviation. For applications for which historical data are available, it is more appropriate to use either the logarithmic mean and standard deviation, or the geometric mean and standard deviation.

Normal Distribution

The normal distribution is the most important distribution in probability theory because it describes many natural phenomena, such as people's IQs or heights. Decision makers can use the normal distribution to describe uncertain variables such as the inflation rate or the future price of gasoline.

The three conditions underlying the normal distribution are as follows:

Some value of the uncertain variable is the most likely (the mean of the distribution).

The uncertain variable could as likely be above the mean as it could be below the mean (symmetrical about the mean).

The uncertain variable is more likely to be in the vicinity of the mean than further away.

The mathematical constructs for the normal distribution are as follows:

$$f(x) = \frac{1}{\sqrt{2\pi}\,\sigma} e^{-\frac{(x-\mu)^2}{2\sigma^2}} \text{ for all values of } x$$

while $\sigma > 0$ $$\text{mean} = \mu$$

$$\text{standard deviation} = \sigma$$

skewness =

0(this applies to all inputs of mean and standard deviation)

excess kurtosis =

0(this applies to all inputs of mean and standard deviation)

Mean ($\mu$) and standard deviation ($\sigma$) are the distributional parameters. The input requirements are such that Standard Deviation >0 and can be any positive value and Mean can be any value.

Pareto Distribution

The Pareto distribution is widely used for the investigation of distributions associated with such empirical phenomena as city population sizes, the occurrence of natural resources, the size of companies, personal incomes, stock price fluctuations, and error clustering in communication circuits.

The mathematical constructs for the Pareto are as follows:

$$f(x) = \frac{\beta L^\beta}{x^{(1+\beta)}} \text{ for } x > L$$

$$\text{mean} = \frac{\beta L}{\beta - 1}$$

$$\text{standard deviation} = \sqrt{\frac{\beta L^2}{(\beta-1)^2(\beta-2)}}$$

$$\text{skewness} = \sqrt{\frac{\beta-2}{\beta}}\left[\frac{2(\beta+1)}{\beta-3}\right]$$

$$\text{excess kurtosis} = \frac{6(\beta^3 + \beta^2 - 6\beta - 2)}{\beta(\beta-3)(\beta-4)}$$

Location($L$) and shape($\beta$) are the distributional parameters.

There are two standard parameters for the Pareto distribution: location and shape. The location parameter is the lower bound for the variable. After users select the location parameter, they can estimate the shape parameter. The shape parameter is a number greater than 0, usually greater than 1. The larger the shape parameter, the smaller the variance and the thicker the right tail of the distribution. The input requirements are such that Location >0 and can be any positive value while Shape ≥0.05.

Student's t Distribution

The Student's t distribution is the most widely used distribution in hypothesis testing. This distribution is used to estimate the mean of a normally distributed population when the sample size is small and to test the statistical significance of the difference between two sample means or confidence intervals for small sample sizes.

The mathematical constructs for the t distribution are as follows:

$$f(t) = \frac{\Gamma[(r+1)/2]}{\sqrt{r\pi}\,\Gamma[r/2]}(1+t^2/r)^{-(r+1)/2}$$

mean = 0(this applies to all degrees of freedom $r$ except if the distribution is shifted to another nonzero central location)

$$\text{standard deviation} = \sqrt{\frac{r}{r-2}}$$

skewness = 0

$$\text{excess kurtosis} = \frac{6}{r-4} \text{ for all } r > 4$$

where $$t = \frac{x - \bar{x}}{s} \text{ and } \Gamma \text{ is the gamma function}$$

Degree of freedom r is the only distributional parameter. The t distribution is related to the F distribution as follows: the square of a value of t with r degrees of freedom is distributed as F with 1 and r degrees of freedom. The overall shape of the probability density function of the t distribution also resembles the bell shape of a normally distributed variable with mean 0 and variance 1, except that it is a bit lower and wider or is leptokurtic (fat tails at the ends and peaked center). As the number of degrees of freedom grows (say, above 30), the t distribution approaches the normal distribution with mean 0 and variance 1. The input requirements are such that Degrees of Freedom ≥1 and must be an integer.

Triangular Distribution

The triangular distribution describes a situation where users know the minimum, maximum, and most likely values to occur. For example, users could describe the number of cars sold per week when past historical show the minimum, maximum, and usual number of cars sold.

The three conditions underlying the triangular distribution are as follows:
  The minimum number of items is fixed.
  The maximum number of items is fixed.
  The most likely number of items falls between the minimum and maximum values, forming a triangular-shaped distribution, which shows that values near the minimum and maximum are less likely to occur than those near the most-likely value.

The mathematical constructs for the triangular distribution are as follows:

$$f(x) = \begin{cases} \frac{2(x - \text{Min})}{(\text{Max} - \text{Min})(\text{Likely} - \text{min})} & \text{for Min} < x < \text{Likely} \\ \frac{2(\text{Max} - x)}{(\text{Max} - \text{Min})(\text{Max} - \text{Likely})} & \text{for Likely} < x < \text{Max} \end{cases}$$

$$\text{mean} = \frac{1}{3}(\text{Min} + \text{Likely} + \text{Max})$$

standard deviation =

$$\sqrt{\frac{1}{18}\left(\begin{array}{c} \text{Min}^2 + \text{Likely}^2 + \text{Max}^2 - \\ \text{Min Max} - \text{Min Likely} - \text{Max Likely} \end{array}\right)}$$

$$\text{skewness} = \frac{\sqrt{2}\,(\text{Min} + \text{Max} - 2\text{Likely})(2\text{Min} - \text{Max} - \text{Likely})(\text{Min} - 2\text{Max} + \text{Likely})}{5\left(\begin{array}{c}\text{Min}^2 + \text{Max}^2 + \text{Likely}^2 - \\ \text{MinMax} - \text{MinLikely} - \text{MaxLikely}\end{array}\right)^{3/2}}$$

excess kurtosis = −0.6

Minimum (Min), most likely (Likely), and maximum (Max) are the distributional parameters, and the input requirements are such that Min≤Most Likely≤Max and can take any value, and Min<Max and can take any value.

Uniform Distribution

With the uniform distribution, all values fall between the minimum and maximum and occur with equal likelihood.

The three conditions underlying the uniform distribution are as follows:
  The minimum value is fixed.
  The maximum value is fixed.
  All values between the minimum and maximum occur with equal likelihood.

The mathematical constructs for the uniform distribution are as follows:

$$f(x) = \frac{1}{\text{Max} - \text{Min}}$$

for all values such that Min < Max $$\text{mean} = \frac{\text{Min} + \text{Max}}{2}$$

$$\text{standard deviation} = \sqrt{\frac{(\text{Max} - \text{Min})^2}{12}}$$

skewness = 0 excess kurtosis = −1.2(this applies to all inputs of Min and Max)

Maximum value (Max) and minimum value (Min) are the distributional parameters. The input requirements are such that Min<Max and can take any value.

Weibull Distribution (Rayleigh Distribution)

The Weibull distribution describes data resulting from life and fatigue tests. It is commonly used to describe failure time in reliability studies as well as the breaking strengths of materials in reliability and quality control tests. Weibull distributions are also used to represent various physical quantities, such as wind speed. The Weibull distribution is a family of distributions that can assume the properties of several other distributions. For example, depending on the shape parameter users define, the Weibull distribution can be used to model the exponential and Rayleigh distributions, among others. The Weibull distribution is very flexible. When the Weibull shape parameter is equal to 1.0, the Weibull distribution is identical to the exponential distribution. The Weibull location parameter lets users set up an exponential distribution to start at a location other than 0.0. When the shape parameter is less than 1.0, the Weibull distribution becomes a steeply declining curve. A manufacturer might find this effect useful in describing part failures during a burn-in period.

The mathematical constructs for the Weibull distribution are as follows:

$$f(x) = \frac{\alpha}{\beta}\left[\frac{x}{\beta}\right]^{\alpha-1} e^{-\left(\frac{x}{\beta}\right)^{\alpha}}$$

$$\text{mean} = \beta\Gamma(1 + \alpha^{-1})$$

$$\text{standard deviation} = \beta^2[\Gamma(1 + 2^{-1}) - \Gamma^2(1 + \alpha^{-1})]$$

$$\text{skewness} = \frac{2\Gamma^3(1 + \beta^{-1}) - 3\Gamma(1 + \beta^{-1})\Gamma(1 + 2\beta^{-1}) + \Gamma(1 + 3\beta^{-1})}{[\Gamma(1 + 2\beta^{-1}) - \Gamma^2(1 + \beta^{-1})]^{3/2}}$$

$$\text{excess kurtosis} = \frac{-6\Gamma^4(1 + \beta^{-1}) + 12\Gamma^2(1 + \beta^{-1})\Gamma(1 + 2\beta^{-1}) - 3\Gamma^2(1 + 2\beta^{-1}) - 4\Gamma(1 + \beta^{-1})\Gamma(1 + 3\beta^{-1}) + \Gamma(1 + 4\beta^{-1})}{[\Gamma(1 + 2\beta^{-1}) - \Gamma^2(1 + \beta^{-1})]^2}$$

Location (L), shape ($\alpha$), and scale ($\beta$) are the distributional parameters, and $\Gamma$ is the Gamma function. The input requirements are such that Scale >0 and can be any positive value, Shape ≥0.05, and Location can take on any value.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and descriptions set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more substeps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application-specific integrated circuits, or the like, that can be suitably employed or configured to process computer program instructions, execute computer logic, store computer data, and so on. Throughout this disclosure and elsewhere, a computer can include any and all suitable combinations of at least one general-purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as stand-alone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer-executable code. A variety of languages for expressing computer program instructions are possible, including without limitation C, C++, C#.NET, Visual Basic, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of Web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

APPENDIX

Additional Analytical and Mathematical Models in the Present Invention

Summary of Mathematical Characteristics of Geometric Brownian Motions

Assume a process X, where $X=[X_t: t \geq 0]$ if and only if $X_t$ is continuous, where the starting point is $X_0=0$, where X is normally distributed with mean zero and variance one or $X \in N(0, 1)$, and where each increment in time is independent of each other previous increment and is itself normally distributed with mean zero and variance t, such that $X_{t+a} - X_t \in N(0, t)$. Then, the process $dX = \alpha X \, dt + \sigma X \, dZ$ follows a Geometric Brownian Motion, where $\alpha$ is a drift parameter, $\sigma$ the volatility measure, $dZ = \epsilon_t \sqrt{\Delta t}$ such that ln $$\left[\frac{dX}{X}\right] \in N(\mu, \sigma),$$

or X and dX are lognormally distributed. If at time zero, $X(0)=0$, then the expected value of the process X at any time t is such that $E[X(t)]=X_0 e^{rt}$, and the variance of the process X at time t is $V[X(t)]=X_0^2 e^{2\alpha t}(e^{\sigma^2 t}-1)$. In the continuous case where there is a drift parameter $\alpha$, the expected value then becomes $$E\left[\int_0^\infty X(t)e^{-rt}\,dt\right] = \int_0^\infty X_0 e^{-(r-\alpha)t}\,dt = X_0/(r-\alpha).$$

Summary of Mathematical Characteristics of Mean-Reversion Processes

If a stochastic process has a long-run attractor such as a long-run production cost or long-run steady state inflationary price level, then a mean-reversion process is more likely. The process reverts to a long-run average such that the expected value is $E[X_t]=\overline{X}+(X_0-\overline{X})e^{-\eta t}$ and the variance is $$V[X_t - \overline{X}] = \frac{\sigma^2}{2\eta(1-e^{-2\eta t})}.$$

The special circumstance that becomes useful is that in the limiting case when the time change becomes instantaneous or when $dt \to 0$, we have the condition where $X_t - X_{t-1} = \overline{X}(1-e^{-\eta})+X_{t-1}(e^{-\eta}-1)+\in_t$, which is the first order autoregressive process, and $\eta$ can be tested econometrically in a unit root context.

Summary of Mathematical Characteristics of Barrier Long-Run Processes

This process is used when there are natural barriers to prices—for example, floors or caps—or when there are physical constraints like the maximum capacity of a manufacturing plant. If barriers exist in the process, where we define $\overline{X}$ as the upper barrier and $\underline{X}$ as the lower barrier, we have a process where $$X(t) = \frac{2\alpha}{\sigma^2} \frac{e^{\frac{2\alpha X}{\sigma^2}}}{e^{\frac{2\alpha \overline{X}}{\sigma^2}} - e^{\frac{2\alpha \underline{X}}{\sigma^2}}}.$$

Summary of Mathematical Characteristics of Jump-Diffusion Processes

Start-up ventures and research and development initiatives usually follow a jump-diffusion process. Business operations may be status quo for a few months or years, and then a product or initiative becomes highly successful and takes off. An initial public offering of equities, oil price jumps, and price of electricity are textbook examples of this circumstance. Assuming that the probability of the jumps follows a Poisson distribution, we have a process $dX=f(X,t)dt+g(X,t)dq$, where the functions $f$ and $g$ are known and where the probability process is $$dq = \begin{cases} 0 & \text{with } P(X) = 1-\lambda dt \\ \mu & \text{with } P(X) = X dt \end{cases}.$$

APPENDIX

Forecasting, Econometric, and Statistical Models

This appendix demonstrates the mathematical models and computations used in creating the general regression equations, which take the form of $Y=\beta_0+\beta_1 X_1+\beta_2 X_2+\ldots+\beta_n X_n+\varepsilon$ where $\beta_0$ is the intercept, $\beta_i$ are the slope coefficients, and $\varepsilon$ is the error term. The Y term is the dependent variable and the X terms are the independent variables, where these X variables are also known as the regressors. The dependent variable is named as such as it depends on the independent variable; for example, sales revenue depends on the amount of marketing costs expended on a product's advertising and promotion, making the dependent variable sales and the independent variable marketing costs. An example of a bivariate regression where there is only a single Y and a single X variable is seen as simply inserting the best-fitting line through a set of data points in a two-dimensional plane. In other cases, a multivariate regression can be performed, where there are multiple or k number of independent X variables or regressors where in this case the best-fitting line will be within a k+1 dimensional plane.

Fitting a line through a set of data points in a multidimensional scatter plot may result in numerous possible lines. The best-fitting line is defined as the single unique line that minimizes the total vertical errors, that is, the sum of the absolute distances between the actual data points ($Y_i$) and the estimated line ($\hat{Y}$). To find the best-fitting unique line that minimizes the errors, a more sophisticated approach is applied, using multivariate regression analysis. Regression analysis therefore finds the unique best-fitting line by requiring that the total errors be minimized, or by calculating:

$$\text{Min} \sum_{i=1}^{n} (Y_i - \hat{Y}_i)^2$$

Only one unique line will minimize this sum of squared errors as shown in the equation above. The errors (vertical distances between the actual data and the predicted line) are squared to avoid the negative errors from canceling out the positive errors. Solving this minimization problem with respect to the slope and intercept requires calculating first derivatives and setting them equal to zero:

$$\frac{d}{d\beta_0} \sum_{i=1}^{n} (Y_i - \hat{Y}_i)^2 = 0 \text{ and } \frac{d}{d\beta_1} \sum_{i=1}^{n} (Y_i - \hat{Y}_i)^2 = 0$$

which yields the simple bivariate regression's set of least squares equations:

$$\beta_1 = \frac{\sum_{i=1}^{n}(X_i-\overline{X})(Y_i-\overline{Y})}{\sum_{i=1}^{n}(X_i-\overline{X})^2} = \frac{\sum_{i=1}^{n} X_i Y_i - \frac{\sum_{i=1}^{n} X_i \sum_{i=1}^{n} Y_i}{n}}{\sum_{i=1}^{n} X_i^2 - \frac{\left(\sum_{i=1}^{n} X_i\right)^2}{n}}$$

$$\beta_0 = \overline{Y} - \beta_1 \overline{X}$$

For multivariate regression, the analogy is expanded to account for multiple independent variables, where $Y_i=\beta_1+\beta\beta_2 X_{2,i}+\beta_3 X_{3,i}+\varepsilon_i$, and the estimated slopes can be calculated by:

$$\hat{\beta}_2 = \frac{\sum Y_i X_{2,i} \sum X_{3,i}^2 - \sum Y_i X_{3,i} \sum X_{2,i} X_{3,i}}{\sum X_{2,i}^2 \sum X_{3,i}^2 - (\sum X_{2,i} X_{3,i})^2}$$

$$\hat{\beta}_3 = \frac{\sum Y_i X_{3,i} \sum X_{2,i}^2 - \sum Y_i X_{2,i} \sum X_{2,i} X_{3,i}}{\sum X_{2,i}^2 \sum X_{3,i}^2 - (\sum X_{2,i} X_{3,i})^2}$$

This set of results can be summarized using matrix notations: $[X'\,X]^{-1}[X'\,Y]$.

In running multivariate regressions, great care must be taken to set up and interpret the results. For instance, a good understanding of econometric modeling is required (e.g., identifying regression pitfalls such as structural breaks, multicollinearity, heteroskedasticity, autocorrelation, specification tests, nonlinearities, etc.) before a proper model can be constructed. Therefore the present invention includes some advanced econometrics approaches that are based on the principles of multiple regression outlined above.

One approach used is that of an Auto-ARIMA, which is based on the fundamental concepts of ARIMA theory or Autoregressive Integrated Moving Average models. ARIMA (p,d,q) models are the extension of the AR model that uses three components for modeling the serial correlation in the time-series data. The first component is the autoregressive (AR) term. The AR(p) model uses the p lags of the time series in the equation. An AR(p) model has the form: $y(t)=a(1)\,y(t-1)+\ldots+a(p)\,y(t-p)+e(t)$. The second component is the integration (d) order term. Each integration order corresponds to differencing the time series. I(1) means differencing the data once. I(d) means differencing the data d times. The third component is the moving average (MA) term. The MA(q) model uses the q lags of the forecast errors to improve the forecast. An MA(q) model has the form: $y(t)=e(t)+b(1)\,e(t-1)+\ldots+b(q)\,e(t-q)$. Finally, an ARMA (p,q) model has the combined form: $y(t)=a(1)\,y(t-1)+\ldots+a(p)\,y(t-p)+e(t)+b(1)\,e(t-1)+\ldots+b(q)\,e(t-q)\ldots$. Using this ARIMA concept, various combinations of p, d, q integers are tested in an automated and systematic fashion to determine the best-fitting model for the user's data.

In order to determine the best fitting model, we apply several goodness-of-fit statistics to provide a glimpse into the accuracy and reliability of the estimated regression model. They usually take the form of a t-statistic, F-statistic, R-squared statistic, adjusted R-squared statistic, Durbin-Watson statistic, Akaike Criterion, Schwarz Criterion, and their respective probabilities.

The R-squared ($R^2$), or coefficient of determination, is an error measurement that looks at the percent variation of the dependent variable that can be explained by the variation in the independent variable for a regression analysis. The coefficient of determination can be calculated by:

$$R^2 = 1 - \frac{\sum_{i=1}^{n}(Y_i - \hat{Y}_i)^2}{\sum_{i=1}^{n}(Y_i - \overline{Y})^2} = 1 - \frac{SSE}{TSS}$$

where the coefficient of determination is one less the ratio of the sums of squares of the errors (SSE) to the total sums of squares (TSS). In other words, the ratio of SSE to TSS is the unexplained portion of the analysis; thus, one less the ratio of SSE to TSS is the explained portion of the regression analysis.

The estimated regression line is characterized by a series of predicted values ($\hat{Y}$) the average value of the dependent variable's data points is denoted $\overline{Y}$; and the individual data points are characterized by $Y_i$. Therefore, the total sum of squares, that is, the total variation in the data or the total variation about the average dependent value, is the total of the difference between the individual dependent values and its average (the total squared distance of $Y_i - \overline{Y}$). The explained sum of squares, the portion that is captured by the regression analysis, is the total of the difference between the regression's predicted value and the average dependent variable's dataset (seen as the total squared distance of $\hat{Y} - \overline{Y}$). The difference between the total variation (TSS) and the explained variation (ESS) is the unexplained sums of squares, also known as the sums of squares of the errors (SSE).

Another related statistic, the adjusted coefficient of determination, or the adjusted R-squared ($\overline{R}^2$), corrects for the number of independent variables (k) in a multivariate regression through a degrees of freedom correction to provide a more conservative estimate:

$$\overline{R}^2 = 1 - \frac{\sum_{i=1}^{n}(Y_i - \hat{Y}_i)^2/(k-2)}{\sum_{i=1}^{n}(Y_i - \overline{Y})^2/(k-1)} = 1 - \frac{SSE/(k-2)}{TSS/(k-1)}$$

The adjusted R-squared should be used instead of the regular R-squared in multivariate regressions because every time an independent variable is added into the regression analysis, the R-squared will increase, indicating that the percent variation explained has increased. This increase occurs even when nonsensical regressors are added. The adjusted R-squared takes the added regressors into account and penalizes the regression accordingly, providing a much better estimate of a regression model's goodness-of-fit.

Other goodness-of-fit statistics include the t-statistic and the F-statistic. The former is used to test if each of the estimated slope and intercept(s) is statistically significant, that is, if it is statistically significantly different from zero (therefore making sure that the intercept and slope estimates are statistically valid). The latter applies the same concepts but simultaneously for the entire regression equation including the intercept and slopes. Using the previous example, the following illustrates how the t-statistic and F-statistic can be used in a regression analysis.

When running the Autoeconometrics methodology, multiple regression issues and errors are first tested for. These include items such as heteroskedasticity, multicollinearity, micronumerosity, lags, leads, autocorrelation, and others. For instance, several tests exist to test for the presence of heteroskedasticity. These tests also are applicable for testing misspecifications and nonlinearities. The simplest approach is to graphically represent each independent variable against the dependent variable as illustrated earlier. Another approach is to apply one of the most widely used models, the White's test, where the test is based on the null hypothesis of no heteroskedasticity against an alternate hypothesis of heteroskedasticity of some unknown general form. The test statistic is computed by an auxiliary or secondary regression, where the squared residuals or errors from the first regression are regressed on all possible (and nonredundant) cross products of the regressors. For example, suppose the following regression is estimated:

$Y = \beta_0 \beta_1 X + \beta_2 Z + \varepsilon_t$

The test statistic is then based on the auxiliary regression of the errors (E):

$\varepsilon_t^2 = \alpha_0 + \alpha_1 X + \alpha_2 Z + \alpha_3 X^2 + \alpha_4 Z^2 + \alpha_5 XZ + v_t$ The $nR^2$ statistic is the White's test statistic, computed as the number of observations (n) times the centered R-squared from the test regression. White's test statistic is asymptotically distributed as a $\chi^2$; with degrees of freedom equal to the number of independent variables (excluding the constant) in the test regression.

The White's test is also a general test for model misspecification, because the null hypothesis underlying the test assumes that the errors are both homoskedastic and independent of the regressors, and that the linear specification of the model is correct. Failure of any one of these conditions could lead to a significant test statistic. Conversely, a non-significant test statistic implies that none of the three conditions is violated. For instance, the resulting F-statistic is an omitted variable test for the joint significance of all cross products, excluding the constant.

One method to fix heteroskedasticity is to make it homoskedastic by using a weighted least squares (WLS) approach. For instance, suppose the following is the original regression equation:

$$Y = \beta_0 + \beta_1 X_1 + \beta_2 X_2 + \beta_3 X_3 + \varepsilon$$

Further suppose that $X_2$ is heteroskedastic. Then transform the data used in the regression into:

$$Y = \frac{\beta_0}{X_2} + \beta_1 \frac{X_1}{X_2} + \beta_2 + \beta_3 \frac{X_3}{X_2} + \frac{\varepsilon}{X_2}$$

The model can be redefined as the following WLS regression:

$$Y_{WLS} = \beta_0^{WLS} + \beta_1^{WLS} X_1 + \beta_2^{WLS} X_2 + \beta_3^{WLS} X_3 + v$$

Alternatively, the Park's test can be applied to test for heteroskedasticity and to fix it. The Park's test model is based on the original regression equation, uses its errors, and creates an auxiliary regression that takes the form of:

$$\ln e_i^2 = \beta_1 + \beta_2 \ln X_{k,i}$$

Suppose $\beta_2$ is found to be statistically significant based on a t-test, then heteroskedasticity is found to be present in the variable $X_{k,i}$. The remedy, therefore, is to use the following regression specification:

$$\frac{Y}{\sqrt{X_k^{\beta_2}}} = \frac{\beta_1}{\sqrt{X_k^{\beta_2}}} + \frac{\beta_2 X_2}{\sqrt{X_k^{\beta_2}}} + \frac{\beta_3 X_3}{\sqrt{X_k^{\beta_2}}} + \varepsilon$$

Multicollinearity exists when there is a linear relationship between the independent variables. When this occurs, the regression equation cannot be estimated at all. In near collinearity situations, the estimated regression equation will be biased and provide inaccurate results. This situation is especially true when a stepwise regression approach is used, where the statistically significant independent variables will be thrown out of the regression mix earlier than expected, resulting in a regression equation that is neither efficient nor accurate.

As an example, suppose the following multiple regression analysis exists, where $$Y_i = \beta_1 + \beta_2 X_{2,i} + \beta_3 X_{3,i} + \varepsilon_i$$

The estimated slopes can be calculated through:

$$\hat{\beta}_2 = \frac{\sum Y_i X_{2,i} \sum X_{3,i}^2 - \sum Y_i X_{3,i} \sum X_{2,i} X_{3,i}}{\sum X_{2,i}^2 \sum X_{3,i}^2 - (\sum X_{2,i} X_{3,i})^2}$$

$$\hat{\beta}_3 = \frac{\sum Y_i X_{3,i} \sum X_{2,i}^2 - \sum Y_i X_{2,i} \sum X_{2,i} X_{3,i}}{\sum X_{2,i}^2 \sum X_{3,i}^2 - (\sum X_{2,i} X_{3,i})^2}$$

Now suppose that there is perfect multicollinearity, that is, there exists a perfect linear relationship between $X_2$ and $X_3$, such that $X_{3,i} = \lambda X_{2,i}$ for all positive values of $\lambda$. Substituting this linear relationship into the slope calculations for $\beta_2$, the result is indeterminate. In other words, we have:

$$\hat{\beta}_2 = \frac{\sum Y_i X_{2,i} \sum \lambda^2 X_{2,i}^2 - \sum Y_i \lambda X_{2,i} \sum \lambda X_{2,i}^2}{\sum X_{2,i}^2 \sum \lambda^2 X_{2,i}^2 - (\sum \lambda X_{2,i}^2)^2} = \frac{0}{0}$$

The same calculation and results apply to $\beta_3$, which means that the multiple regression analysis breaks down and cannot be estimated given a perfect collinearity condition.

One quick test of the presence of multicollinearity in a multiple regression equation is that the R-squared value is relatively high while the t-statistics are relatively low. Another quick test is to create a correlation matrix between the independent variables. A high cross correlation indicates a potential for multicollinearity. The rule of thumb is that a correlation with an absolute value greater than 0.75 is indicative of severe multicollinearity.

Another test for multicollinearity is the use of the variance inflation factor (VIF), obtained by regressing each independent variable to all the other independent variables, obtaining the R-squared value and calculating the VIF of that variable by estimating:

$$VIF_i = \frac{1}{(1 - R_i^2)}$$

A high VIF value indicates a high R-squared near unity. As a rule of thumb, a VIF value greater than 10 is usually indicative of destructive multicollinearity. The Autoeconometrics method computes for multicollinearity and corrects the data before running the next iteration when enumerating through the entire set of possible combinations and permutations of models.

One simple approach to test for autocorrelation is to graph the time series of a regression equation's residuals. If these residuals exhibit some cyclicality, then autocorrelation exists. Another more robust approach to detect autocorrelation is the use of the Durbin-Watson statistic, which estimates the potential for a first-order autocorrelation. The Durbin-Watson test also identifies model misspecification, that is, if a particular time-series variable is correlated to itself one period prior. Many time-series data tend to be autocorrelated to their historical occurrences. This relationship can be due to multiple reasons, including the variables' spatial relationships (similar time and space), prolonged economic shocks and events, psychological inertia, smoothing, seasonal adjustments of the data, and so forth.

The Durbin-Watson statistic is estimated by the ratio of sum of the squares of the regression errors for one period prior to the sum of the current period's errors:

$$DW = \frac{\sum (\varepsilon_t - \varepsilon_{t-1})^2}{\sum \varepsilon_t^2}$$

There is a Durbin-Watson critical statistic table at the end of the book that provides a guide as to whether a statistic implies any autocorrelation.

Another test for autocorrelation is the Breusch-Godfrey test, where for a regression function in the form of:

$$Y = f(X_1, X_2, \ldots, X_k)$$

Estimate this regression equation and obtain its errors $\varepsilon_t$. Then, run the secondary regression function in the form of:

$$Y = f(X_1, X_2, \ldots, X_k, \varepsilon_{t-1}, \varepsilon_{t-2}, \varepsilon_{t-p})$$

Obtain the R-squared value and test it against a null hypothesis of no autocorrelation versus an alternate hypothesis of autocorrelation, where the test statistic follows a Chi-Square distribution of p degrees of freedom:

$$R^2(n-p) \sim \chi^2_{df=p}$$

Fixing autocorrelation requires the application of advanced econometric models including the applications of ARIMA (as described above) or ECM (Error Correction Models). However, one simple fix is to take the lags of the dependent variable for the appropriate periods, add them into the regression function, and test for their significance. For instance:

$$Y_t = f(Y_{t-1}, Y_{t-2}, \ldots, Y_{t-p}, X_1, X_2, \ldots, X_k)$$

In interpreting the results of an Autoeconometrics model, most of the specifications are identical to the multivariate regression analysis. However, there are several additional sets of results specific to the econometric analysis. The first is the addition of Akaike Information Criterion (AIC) and Schwarz Criterion (SC), which are often used in ARIMA model selection and identification. That is, AIC and SC are used to determine if a particular model with a specific set of p, d, and q parameters is a good statistical fit. SC imposes a greater penalty for additional coefficients than the AIC but, generally, the model with the lowest AIC and SC values should be chosen. Finally, an additional set of results called the autocorrelation (AC) and partial autocorrelation (PAC) statistics are provided in the ARIMA report.

As an illustrative example, if autocorrelation AC(1) is nonzero, it means that the series is first-order serially correlated. If AC dies off more or less geometrically with increasing lags, it implies that the series follows a low-order autoregressive process. If AC drops to zero after a small number of lags, it implies that the series follows a low-order moving-average process. In contrast, PAC measures the correlation of values that are k periods apart after removing the correlation from the intervening lags. If the pattern of autocorrelation can be captured by an autoregression of order less than k, then the partial autocorrelation at lag k will be close to zero. The Ljung-Box Q-statistics and their p-values at lag k are also provided, where the null hypothesis being tested is such that there is no autocorrelation up to order k. The dotted lines in the plots of the autocorrelations are the approximate two standard error bounds. If the autocorrelation is within these bounds, it is not significantly different from zero at approximately the 5% significance level. Finding the right ARIMA model takes practice and experience. These AC, PAC, SC, and AIC are highly useful diagnostic tools to help identify the correct model specification. Finally, the ARIMA parameter results are obtained using sophisticated optimization and iterative algorithms, which means that although the functional forms look like those of a multivariate regression, they are not the same. ARIMA is a much more computationally intensive and advanced econometric approach.

Descriptive Statistics

Most distributions can be described within four moments (some distributions require one moment, while others require two moments, etc.). Descriptive statistics quantitatively captures these moments. The first moment describes the location of a distribution (i.e., mean, median, and mode) and is interpreted as the expected value, expected returns, or the average value of occurrences.

The second moment measures a distribution's spread, or width, and is frequently described using measures such as Standard Deviations, Variances, Quartiles, and Inter-Quartile Ranges. Standard deviation is a popular measure indicating the average deviation of all data points from their mean. It is a popular measure as it is frequently associated with risk (higher standard deviations meaning a wider distribution, higher risk, or wider dispersion of data points around the mean value) and its units are identical to the units in the original dataset.

Skewness is the third moment in a distribution. Skewness characterizes the degree of asymmetry of a distribution around its mean. Positive skewness indicates a distribution with an asymmetric tail extending toward more positive values. Negative skewness indicates a distribution with an asymmetric tail extending toward more negative values.

Kurtosis characterizes the relative peakedness or flatness of a distribution compared to the normal distribution. It is the fourth moment in a distribution. A positive kurtosis value indicates a relatively peaked distribution. A negative kurtosis indicates a relatively flat distribution. The kurtosis measured here has been centered to zero (certain other kurtosis measures are centered on 3.0). While both are equally valid, centering across zero makes the interpretation simpler. A high positive kurtosis indicates a peaked distribution around its center and leptokurtic or fat tails. This indicates a higher probability of extreme events (e.g., catastrophic events, terrorist attacks, stock market crashes) than is predicted in a normal distribution.

Correlation Matrix

According to an embodiment of the present invention, the Correlation module lists the Pearson's product moment correlations (commonly referred to as the Pearson's R) between variable pairs. The correlation coefficient ranges between −1.0 and +1.0 inclusive. The sign indicates the direction of association between the variables, while the coefficient indicates the magnitude or strength of association. The Pearson's R only measures a linear relationship and is less effective in measuring nonlinear relationships.

A hypothesis t-test is performed on the Pearson's R and the p-values are reported. If the calculated p-value is less than or equal to the significance level used in the test, then reject the null hypothesis and conclude that there is a significant correlation between the two variables in question. Otherwise, the correlation is not statistically significant.

Finally, a Spearman Rank-Based Correlation is also included. The Spearman's R first ranks the raw data then performs the correlation calculation, which allows it to better capture nonlinear relationships. The Pearson's R is a parametric test and the underlying data is assumed to be normally distributed, hence, the t-test can be applied. However, the Spearman's R is a nonparametric test, where no underlying distributions are assumed, and, hence, the t-test cannot be applied.

Variance-Covariance Matrix

The Covariance measures the average of the products of deviations for each data point pair. Use covariance to determine the relationship between two variables. The covariance is related to the correlation in that the correlation is the covariance divided by the product of the two variables' standard deviation, standardizing the correlation measurement to be unitless and between −1 and +1.

Covariance is used when the units of the variables are similar, allowing for easy comparison of the magnitude of variability about their respective means. The covariance of the same variable is also known as the variance. The variance of a variable is the square of its standard deviation. This is why standardizing the variance through dividing it by the variable's standard deviation (twice) yields a correlation of 1.0, indicating that a variable is perfectly correlated to itself.

It must be stressed that a high covariance does not imply causation. Associations between variables in no way imply that the change of one variable causes another variable to change. Two variables that are moving independently of each other but in a related path may have a high covariance but their relationship might be spurious. In order to capture this relationship, use regression analysis instead.

Basic Statistics

According to an embodiment of the present invention, the following basic statistical functions are also included in PEAT's Forecast Statistics module and their short definitions are listed below:

Absolute Values: Computes the absolute value of a number where it is the number without its sign.

Average: Computes the average or arithmetic mean of the rows of data for the selected variable.

Count: Computes how many numbers there are in the rows of data for the selected variable.

Difference: Computes the difference of the current period from the previous period.

Lag: Returns the value lagged some number of periods (the entire chronological dataset is shifted down the number of lagged periods specified).

Lead: Returns the value leading by some number of periods (the entire chronological dataset is shifted up the number of lead periods specified).

LN: Computes the natural logarithm.

Log: Computes the logarithmic value of some specified base.

Max: Computes the maximum of the rows of data for the selected variable.

Median: Computes the median of the rows of data for the selected variable.

Min: Computes the minimum of the rows of data for the selected variable.

Mode: Computes the mode, or most frequently occurring, of data points for the selected variable.

Power: Computes the result of a number raised to a specified power.

Rank Ascending Ranks the rows of data for the selected variable in ascending order.

Rank Descending Ranks the rows of data for the selected variable in descending order.

Relative LN Returns: Computes the natural logarithm of the relative returns from one period to another, where the relative return is computed as the current value divided by its previous value.

Relative Returns: Computes the relative return where the current value is divided by its previous value.

Semi-Standard Deviation (Lower): Computes the sample standard deviation of data points below a specified value.

Semi-Standard Deviation (Upper): Computes the sample standard deviation of data points above a specified value.

Standard Deviation: Computes the standard deviation of the rows of data for the selected variable.

Variance: Computes the variance of the rows of data for the selected variable.

One of ordinary skill the art would appreciated that more or less basic statistical functions are could be included in PEAT's Forecast Statistics module, and embodiments of the present invention are contemplated for use with such basic statistical function.

Hypothesis Tests: Parametric Models

One-Variable Testing for Means (T-Test)

This one-variable t-test of means is appropriate when the population standard deviation is not known but the sampling distribution is assumed to be approximately normal (the t-test is used when the sample size is less than 30). This t-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

One-Variable Testing for Means (Z-Test)

The one-variable Z-test is appropriate when the population standard deviation is known and the sampling distribution is assumed to be approximately normal (this applies when the number of data points exceeds 30). This Z-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

One-Variable Testing for Proportions (Z-Test)

The one-variable Z-test for proportions is appropriate when the sampling distribution is assumed to be approximately normal (this applies when the number of data points exceeds 30, and when the number of data points, N, multiplied by the hypothesized population proportion mean, P, is greater than or equal to five, or $NP \geq 5$). The data used in the analysis have to be proportions and be between 0 and 1. This Z-test can be applied to three types of hypothesis tests to be examined—a two-tailed test, a right-tailed test, and a left-tailed test—based on the sample dataset if the population mean is equal to, less than, or greater than the hypothesized mean.

If the calculated p-value is less than or equal to the significance level in the test, then reject the null hypothesis and conclude that the true population mean is not equal to (two-tailed test), less than (left-tailed test), or greater than (right-tailed test) the hypothesized mean based on the sample tested. Otherwise, the true population mean is statistically similar to the hypothesized mean.

Two Variables with Dependent Means (T-Test)

The two-variable dependent t-test is appropriate when the population standard deviation is not known but the sampling distribution is assumed to be approximately normal (the t-test is used when the sample size is less than 30). In addition, this test is specifically formulated for testing the same or similar samples before and after an event (e.g., measurements taken before a medical treatment are compared against those measurements taken after the treatment to see if there is a difference). This t-test can be applied to three types of hypothesis tests: a two-tailed test, a right-tailed test, and a left-tailed test.

As an illustrative example, suppose that a new heart medication was administered to 100 patients (N=100) and the heart rates before and after the medication was administered were measured. The two dependent variables t-test can be applied to determine if the new medication is effective by testing to see if there are statistically different "before and after" averages. The dependent variables test is used here because there is only a single sample collected (the same patients' heartbeats were measured before and after the new drug administration).

The two-tailed null hypothesis tests that the true population's mean of the difference between the two variables is zero, versus the alternate hypothesis that the difference is statistically different from zero. The right-tailed null hypothesis test is such that the difference in the population means (first mean less second mean) is statistically less than or equal to zero (which is identical to saying that mean of the first sample is less than or equal to the mean of the second sample). The alternative hypothesis is that the real populations' mean difference is statistically greater than zero when tested using the sample dataset (which is identical to saying that the mean of the first sample is greater than the mean of the second sample). The left-tailed null hypothesis test is such that the difference in the population means (first mean less second mean) is statistically greater than or equal to zero (which is identical to saying that the mean of the first sample is greater than or equal to the mean of the second sample). The alternative hypothesis is that the real populations' mean difference is statistically less than zero when tested using the sample dataset (which is identical to saying that the mean of the first sample is less than the mean of the second sample).

If the calculated p-value is less than or equal to the significance level in the test, then reject the null hypothesis and conclude that the true population difference of the population means is not equal to (two-tailed test), less than (left-tailed test), or greater than (right-tailed test) zero based on the sample tested. Otherwise, the true population mean is statistically similar to the hypothesized mean.

Two (Independent) Variables with Equal Variances (T-Test)

The two-variable t-test with equal variances is appropriate when the population standard deviation is not known but the sampling distribution is assumed to be approximately normal (the t-test is used when the sample size is less than 30). In addition, the two independent samples are assumed to have similar variances.

For illustrative purposes, suppose that a new engine design is tested against an existing engine design to see if there is a statistically significant difference between the two. The t-test on two (independent) variables with equal variances can be applied. This test is used because there are two distinctly different samples collected here (new engine and existing engine) but the variances of both samples are assumed to be similar (the means may or may not be similar, but the fluctuations around the mean are assumed to be similar).

This t-test can be applied to three types of hypothesis tests: a two-tailed test, a right-tailed test, and a left-tailed test. A two-tailed hypothesis tests the null hypothesis, $H_0$, such that the populations' mean difference between the two variables is statistically identical to the hypothesized mean differences (HMD). If HMD is set to zero, this is the same as saying that the first mean equals the second mean. The alternative hypothesis, Ha, is that the difference between the real population means is statistically different from the hypothesized mean differences when tested using the sample dataset. If HMD is set to zero, this is the same as saying that the first mean does not equal the second mean.

A right-tailed hypothesis tests the null hypothesis, $H_0$, such that the population mean differences between the two variables is statistically less than or equal to the hypothesized mean differences. If HMD is set to zero, this is the same as saying that the first mean is less than or equals the second mean. The alternative hypothesis, Ha, is that the real difference between population means is statistically greater than the hypothesized mean differences when tested using the sample dataset. If HMD is set to zero, this is the same as saying that the first mean is greater than the second mean.

A left-tailed hypothesis tests the null hypothesis, $H_0$, such that the differences between the population means of the two variables is statistically greater than or equal to the hypothesized mean differences. If HMD is set to zero, this is the same as saying that the first mean is greater than or equals the second mean. The alternative hypothesis, Ha, is that the real difference between population means is statistically less than the hypothesized mean difference when tested using the sample dataset. If HMD is set to zero, this is the same as saying that the first mean is less than the second mean.

If the calculated p-value is less than or equal to the significance level in the test, then reject the null hypothesis and conclude that the true population difference of the population means is not equal to (two-tailed test), less than (left-tailed test), or greater than (right-tailed test) HMD based on the sample tested. Otherwise, the true difference of the population means is statistically similar to the HMD. For data requirements, see the preceding section, Two Variables with Dependent Means (T-Test).

Two (Independent) Variables with Unequal Variances (T-Test)

The two-variable t-test with unequal variances (the population variance of sample 1 is expected to be different from the population variance of sample 2) is appropriate when the population standard deviation is not known but the sampling distribution is assumed to be approximately normal (the t-test is used when the sample size is less than 30). In addition, the two independent samples are assumed to have similar variances.

For illustrative purposes, suppose that a new customer relationship management (CRM) process is being evaluated for its effectiveness, and the customer satisfaction rankings between two hotels (one with and the other without CRM implemented) are collected. The t-test on two (independent) variables with unequal variances can be applied. This test is used here because there are two distinctly different samples collected (customer survey results of two different hotels) and the variances of both samples are assumed to be dissimilar (due to the difference in geographical location, plus the demographics and psychographics of the customers are different on both properties).

This t-test can be applied to three types of hypothesis tests: a two-tailed test, a right-tailed test, and a left-tailed test. A two-tailed hypothesis tests the null hypothesis, $H_0$, such that the population mean differences between the two variables are statistically identical to the hypothesized mean differences. If HMD is set to zero, this is the same as saying that the first mean equals the second mean. The alternative hypothesis, Ha, is that the real difference between the population means is statistically different from the hypothesized mean differences when tested using the sample dataset. If HMD is set to zero, this is the same as saying that the first mean does not equal the second mean.

A right-tailed hypothesis tests the null hypothesis, $H_0$, such that the difference between the two variables' population means is statistically less than or equal to the hypothesized mean differences. If HMD is set to zero, this is the same as saying that the first mean is less than or equals the second mean. The alternative hypothesis, Ha, is that the real populations' mean difference is statistically greater than the hypothesized mean differences when tested using the sample dataset. If HMD is set to zero, this is the same as saying that the first mean is greater than the second mean.

A left-tailed hypothesis tests the null hypothesis, $H_0$, such that the difference between the two variables' population means is statistically greater than or equal to the hypothesized mean differences. If HMD is set to zero, this is the same as saying that the first mean is greater than or equals the second mean. The alternative hypothesis, Ha, is that the real difference between population means is statistically less than the hypothesized mean difference when tested using the sample dataset. If HMD is set to zero, this is the same as saying that the first mean is less than the second mean.

If the calculated p-value is less than or equal to the significance level in the test, then reject the null hypothesis and conclude that the true population difference of the population means is not equal to (two-tailed test), less than (left-tailed test), or greater than (right-tailed test) the hypothesized mean based on the sample tested. Otherwise, the true difference of the population means is statistically similar to the hypothesized mean.

Two (Independent) Variables Testing for Means (Z-Test)

The two-variable Z-test is appropriate when the population standard deviations are known for the two samples, and the sampling distribution of each variable is assumed to be approximately normal (this applies when the number of data points of each variable exceeds 30).

To illustrate, suppose that a market survey was conducted on two different markets, the sample collected is large (N must exceed 30 for both variables), and the researcher is interested in testing whether there is a statistically significant difference between the two markets. Further suppose that such a market survey has been performed many times in the past and the population standard deviations are known. A two-independent variable Z-test can be applied because the sample size exceeds 30 on each market and the population standard deviations are known.

This Z-test can be applied to three types of hypothesis tests: a two-tailed test, a right-tailed test, and a left-tailed test. A two-tailed hypothesis tests the null hypothesis, $H_0$, such that the difference between the two population means is statistically identical to the hypothesized mean. The alternative hypothesis, Ha, is that the real difference between the two population means is statistically different from the hypothesized mean when tested using the sample dataset.

A right-tailed hypothesis tests the null hypothesis, $H_0$, such that the difference between the two population means is statistically less than or equal to the hypothesized mean. The alternative hypothesis, Ha, is that the real difference between the two population means is statistically greater than the hypothesized mean when tested using the sample dataset.

A left-tailed hypothesis tests the null hypothesis, $H_0$, such that the difference between the two population means is statistically greater than or equal to the hypothesized mean. The alternative hypothesis, Ha, is that the real difference between the two population means is statistically less than the hypothesized mean when tested using the sample dataset.

Two (Independent) Variables Testing for Proportions (Z-Test)

The two-variable Z-test on proportions is appropriate when the sampling distribution is assumed to be approximately normal (this applies when the number of data points of both samples exceeds 30). Further, the data should all be proportions and be between 0 and 1.

For illustrative purposes, suppose that a brand research was conducted on two different headache pills, the sample collected is large (N must exceed 30 for both variables), and the researcher is interested in testing whether there is a statistically significant difference between the proportion of headache sufferers of both samples using the different headache medication. A two-independent variable Z-test for proportions can be applied because the sample size exceeds 30 on each market and the data collected are proportions.

This Z-test can be applied to three types of hypothesis tests: a two-tailed test, a right-tailed test, and a left-tailed test. A two-tailed hypothesis tests the null hypothesis, $H_0$, that the difference in the population proportion is statistically identical to the hypothesized difference (if the hypothesized difference is set to zero, the null hypothesis tests if the population proportions of the two samples are identical). The alternative hypothesis, Ha, is that the real difference in population proportions is statistically different from the hypothesized difference when tested using the sample dataset.

A right-tailed hypothesis tests the null hypothesis, $H_0$, that the difference in the population proportion is statistically less than or equal to the hypothesized difference (if the hypothesized difference is set to zero, the null hypothesis tests if population proportion of sample 1 is equal to or less than the population proportion of sample 2). The alternative hypothesis, Ha, is that the real difference in population proportions is statistically greater than the hypothesized difference when tested using the sample dataset.

A left-tailed hypothesis tests the null hypothesis, $H_0$, that the difference in the population proportion is statistically greater than or equal to the hypothesized difference (if the hypothesized difference is set to zero, the null hypothesis tests if population proportion of sample 1 is equal to or greater than the population proportion of sample 2). The alternative hypothesis, Ha, is that the real difference in population proportions is statistically less than the hypothesized difference when tested using the sample dataset.

Two (Independent) Variables Testing for Variances (F-Test)

The two-variable F-test analyzes the variances from two samples (the population variance of sample 1 is tested with the population variance of sample 2 to see if they are equal) and is appropriate when the population standard deviation is not known but the sampling distribution is assumed to be approximately normal. The measurement of variation is a key issue in Six Sigma and quality control applications. In this illustration, suppose that the variation or variance around the units produced in a manufacturing process is compared to another process to determine which process is more variable and, hence, less predictable in quality.

This F-test can typically be applied to a single hypothesis test: a two-tailed test. A two-tailed hypothesis tests the null hypothesis, $H_0$, such that the population variance of the two variables is statistically identical. The alternative hypothesis, Ha, is that the population variances are statistically different from one another when tested using the sample dataset.

If the calculated p-value is less than or equal to the significance level in the test, then reject the null hypothesis and conclude that the true population variances of the two variables are not statistically equal to one another. Otherwise, the true population variances are statistically similar to each other.

Nonparametric Analysis

Nonparametric techniques make no assumptions about the specific shape or distribution from which the sample is drawn. This lack of assumptions makes it different from the other hypotheses tests such as ANOVA or t-tests (parametric tests) where the sample is assumed to be drawn from a population that is normally or approximately normally distributed. If normality is assumed, the power of the test is higher due to this normality restriction. However, if flexibility on distributional requirements is needed, then nonparametric techniques are superior. In general, nonparametric methodologies provide the following advantages over other parametric tests:

Normality or approximate normality does not have to be assumed.

Fewer assumptions about the population are required; that is, nonparametric tests do not require that the population assume any specific distribution.

Smaller sample sizes can be analyzed.

Samples with nominal and ordinal scales of measurement can be tested.

Sample variances do not have to be equal, whereas equality is required in parametric tests.

However, several caveats are worthy of mention:

Compared to parametric tests, nonparametric tests use data less efficiently.

The power of the test is lower than that of the parametric tests. Therefore, if all the required assumptions are satisfied, it is better to use parametric tests.

In reality, however, it may be difficult to justify these distributional assumptions, or small sample sizes may exist, requiring the need for nonparametric tests. Thus, nonparametric tests should be used when the data are nominal or ordinal, or when the data are interval or ratio but the normality assumption is not met. The following covers each of the nonparametric tests available for use in the software.

Chi-Square Goodness-of-Fit Test

The Chi-Square test for goodness of fit is used to determine whether a sample dataset could have been drawn from a population having a specified probability distribution. The probability distribution tested here is the normal distribution. The null hypothesis ($H_0$) tested is such that the sample is randomly drawn from the normal distribution, versus the alternate hypothesis (Ha) that the sample is not from a normal distribution. If the calculated p-value is less than or equal to the alpha significance value, then reject the null hypothesis and accept the alternate hypothesis. Otherwise, if the p-value is higher than the alpha significance value, do not reject the null hypothesis.

For the Chi-Square goodness-of-fit test, create data tables such as the one below, and select the data in the blue area (e.g., select the data from D6 to E13, or data points 800 to 4). To extend the dataset, just add more observations (rows).

Chi-Square Test of Independence

The Chi-Square test for independence examines two variables to see if there is some statistical relationship between them. This test is not used to find the exact nature of the relationship between the two variables, but to simply test if the variables could be independent of each other. The null hypothesis ($H_0$) tested is such that the variables are independent of each other, versus the alternate hypothesis (Ha) that the variables are not independent of each other.

The Chi-Square test looks at a table of observed frequencies and a table of expected frequencies. The amount of disparity between these two tables is calculated and compared with the Chi-Square test statistic. The observed frequencies reflect the cross-classification for members of a single sample, and the table of expected frequencies is constructed under the assumption that the null hypothesis is true.

Chi-Square Population Variance Test

The Chi-Square test for population variance is used for hypothesis testing and confidence interval estimation for a population variance. The population variance of a sample is typically unknown, and, hence, the need for quantifying this confidence interval. The population is assumed to be normally distributed.

Friedman Test

The Friedman test is a form of nonparametric test that makes no assumptions about the specific shape of the population from which the sample is drawn, allowing for smaller sample datasets to be analyzed. This method is an extension of the Wilcoxon Signed-Rank test for paired samples. The corresponding parametric test is the Randomized Block Multiple Treatment ANOVA, but unlike the ANOVA, the Friedman test does not require that the dataset be randomly sampled from normally distributed populations with equal variances.

The Friedman test uses a two-tailed hypothesis test where the null hypothesis ($H_0$) is such that the population medians of each treatment are statistically identical to the rest of the group. That is, there is no effect among the different treatment groups. The alternative hypothesis (Ha) is such that the real population medians are statistically different from one another when tested using the sample dataset. That is, the medians are statistically different, which means that there is a statistically significant effect among the different treatment groups. If the calculated p-value is less than or equal to the alpha significance value, then reject the null hypothesis and accept the alternate hypothesis. Otherwise, if the p-value is higher than the alpha significance value, do not reject the null hypothesis.

For the Friedman test, create data tables such as the one below, and select the data in the blue area (e.g., select the data from C22 to F32, or data points Treatment 1 to 80).

Kruskal-Wallis Test

The Kruskal-Wallis test is a form of nonparametric test that makes no assumptions about the specific shape of the population from which the sample is drawn, allowing for smaller sample datasets to be analyzed. This method is an extension of the Wilcoxon Signed-Rank test by comparing more than two independent samples. The corresponding parametric test is the One-Way ANOVA, but unlike the ANOVA, the Kruskal-Wallis does not require that the dataset be randomly sampled from normally distributed populations with equal variances. The Kruskal-Wallis test is a two-tailed hypothesis test where the null hypothesis ($H_0$) is such that the population medians of each treatment are statistically identical to the rest of the group. That is, there is no effect among the different treatment groups. The alternative hypothesis (Ha) is such that the real population medians are statistically different from one another when tested using the sample dataset. That is, the medians are statistically different, which means that there is a statistically significant effect among the different treatment groups. If the calculated p-value is less than or equal to the alpha significance value, then reject the null hypothesis and accept the alternate hypothesis. Otherwise, if the p-value is higher than the alpha significance value, do not reject the null hypothesis.

The benefit of the Kruskal-Wallis test is that it can be applied to ordinal, interval, and ratio data while ANOVA is only applicable for interval and ratio data. Also, the Friedman test can be run with fewer data points.

For illustrative purposes, suppose that three different drug indications (T=3) were developed and tested on 100 patients each (N=100). The Kruskal-Wallis test can be applied to test if these three drugs are all equally effective statistically. If the calculated p-value is less than or equal to the significance level used in the test, then reject the null hypothesis and conclude that there is a significant difference among the different treatments. Otherwise, the treatments are all equally effective.

For the Kruskal-Wallis test, create data tables such as the one below, and select the data in the blue area (e.g., select the data from C40 to F50, or data points Treatment 1 to 80). To extend the dataset, just add more observations (rows) or more treatment variables to compare (columns).

Lilliefors Test

The Lilliefors test is a form of nonparametric test that makes no assumptions about the specific shape of the population from which the sample is drawn, allowing for smaller sample datasets to be analyzed. This test evaluates the null hypothesis ($H_0$) of whether the data sample was drawn from a normally distributed population, versus an alternate hypothesis (Ha) that the data sample is not normally distributed. If the calculated p-value is less than or equal to the alpha significance value, then reject the null hypothesis and accept the alternate hypothesis. Otherwise, if the p-value is higher than the alpha significance value, do not reject the null hypothesis. This test relies on two cumulative frequencies: one derived from the sample dataset and one from a theoretical distribution based on the mean and standard deviation of the sample data. An alternative to this test is the Chi-Square test for normality. The Chi-Square test requires more data points to run compared to the Lilliefors test.

Runs Test

The runs test is a form of nonparametric test that makes no assumptions about the specific shape of the population from which the sample is drawn, allowing for smaller sample datasets to be analyzed. This test evaluates the randomness of a series of observations by analyzing the number of runs it contains. A run is a consecutive appearance of one or more observations that are similar. The null hypothesis ($H_0$) tested is whether the data sequence is random, versus the alternate hypothesis (Ha) that the data sequence is not random. If the calculated p-value is less than or equal to the alpha significance value, then reject the null hypothesis and accept the alternate hypothesis. Otherwise, if the p-value is higher than the alpha significance value, do not reject the null hypothesis.

Wilcoxon Signed-Rank Test (One Variable)

The single variable Wilcoxon Signed-Rank test is a form of nonparametric test that makes no assumptions about the specific shape of the population from which the sample is drawn, allowing for smaller sample datasets to be analyzed. This method looks at whether a sample dataset could have been randomly drawn from a particular population whose median is being hypothesized. The corresponding parametric test is the one-sample t-test, which should be used if the underlying population is assumed to be normal, providing a higher power on the test. The Wilcoxon Signed-Rank test can be applied to three types of hypothesis tests: a two-tailed test, a right-tailed test, and a left-tailed test. If the calculated Wilcoxon statistic is outside the critical limits for the specific significance level in the test, reject the null hypothesis and conclude that the true population median is not equal to (two-tailed test), less than (left-tailed test), or greater than (right-tailed test) the hypothesized median based on the sample tested. Otherwise, the true population median is statistically similar to the hypothesized median.

Wilcoxon Signed-Rank Test (Two Variables)

The Wilcoxon Signed-Rank test for paired variables is a form of nonparametric test, which makes no assumptions about the specific shape of the population from which the sample is drawn, allowing for smaller sample datasets to be analyzed. This method looks at whether the median of the differences between the two paired variables are equal. This test is specifically formulated for testing the same or similar samples before and after an event (e.g., measurements taken before a medical treatment are compared against those measurements taken after the treatment to see if there is a difference). The corresponding parametric test is the two-sample t-test with dependent means, which should be used if the underlying population is assumed to be normal, providing a higher power on the test. The Wilcoxon Signed-Rank test can be applied to three types of hypothesis tests: a two-tailed test, a right-tailed test, and a left-tailed test.

For illustrative purposes, suppose that a new engine design is tested against an existing engine design to see if there is a statistically significant difference between the two. The paired variable Wilcoxon Signed-Rank test can be applied. If the calculated Wilcoxon statistic is outside the critical limits for the specific significance level in the test, reject the null hypothesis and conclude that the difference between the true population medians is not equal to (two-tailed test), less than (left-tailed test), or greater than (right-tailed test) the hypothesized median difference based on the sample tested. Otherwise, the true population median is statistically similar to the hypothesized median.

ANOVA (Multivariate Hypothesis Tests)

Single Factor Multiple Treatments ANOVA

The one-way ANOVA for single factor with multiple treatments test is an extension of the two-variable t-test, looking at multiple variables simultaneously. The ANOVA is appropriate when the sampling distribution is assumed to be approximately normal. ANOVA can be applied to only the two-tailed hypothesis test. A two-tailed hypothesis tests the null hypothesis ($H_0$) such that the population means of each treatment is statistically identical to the rest of the group, which means that there is no effect among the different treatment groups. The alternative hypothesis (Ha) is such that the real population means are statistically different from one another when tested using the sample dataset.

For illustrative purposes, suppose that three different drug indications (T=3) were developed and tested on 100 patients each (N=100). The one-way ANOVA can be applied to test if these three drugs are all equally effective statistically. If the calculated p-value is less than or equal to the significance level used in the test, then reject the null hypothesis and conclude that there is a significant difference among the different treatments. Otherwise, the treatments are all equally effective.

Randomized Block Multiple Treatments ANOVA

The one-way randomized block ANOVA is appropriate when the sampling distribution is assumed to be approximately normal and when there is a block variable for which ANOVA will control (block the effects of this variable by controlling it in the experiment). ANOVA can be applied to only the two-tailed hypothesis test. This analysis can test for the effects of both the treatments as well as the effectiveness of the control, or block, variable.

If the calculated p-value for the treatment is less than or equal to the significance level used in the test, then reject the null hypothesis and conclude that there is a significant difference among the different treatments. If the calculated p-value for the block variable is less than or equal to the significance level used in the test, then reject the null hypothesis and conclude that there is a significant difference among the different block variables.

For illustrative purposes, suppose that three different headlamp designs (T=3) were developed and tested on four groups of volunteer drivers grouped by their age (B=4). The one-way randomized block ANOVA can be applied to test if these three headlamps are all equally effective statistically when tested using the volunteers' driving test grades. Otherwise, the treatments are all equally effective. This test can determine if the differences occur because of the treatment (that the type of headlamp will determine differences in driving test scores) or from the block, or controlled, variable (that age may yield different driving abilities).

Two-Way ANOVA

The two-way ANOVA is an extension of the single factor and randomized block ANOVA by simultaneously examining the effects of two factors on the dependent variable, along with the effects of interactions between the different levels of these two factors. Unlike the randomized block design, this model examines the interactions between different levels of the factors, or independent variables. In a two-factor experiment, interaction exists when the effect of a level for one factor depends on which level of the other factor is present.

There are three sets of null ($H_0$) and alternate (Ha) hypotheses to be tested in the two-way analysis of variance.

The first test is on the first independent variable, where the null hypothesis is that no level of the first factor has an effect on the dependent variable. The alternate hypothesis is that there is at least one level of the first factor having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

The second test is on the second independent variable, where the null hypothesis is that no level of the second factor has an effect on the dependent variable. The alternate hypothesis is that there is at least one level of the second factor having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

The third test is on the interaction of both the first and second independent variables, where the null hypothesis is that there are no interacting effects between levels of the first and second factors. The alternate hypothesis is that there is at least one combination of levels of the first and second factors having an effect on the dependent variable. If the calculated p-value is less than or equal to the alpha significance value, then reject the null hypothesis and accept the alternate hypothesis. Otherwise, if the p-value is higher than the alpha significance value, do not reject the null hypothesis.

According to an embodiment of the present invention the Two-Way ANOVA module, creates tables such as the one below, and select the data in the blue area (804 to 835). Users can extend the data by adding rows of factors and columns of treatments. Note that the number of replications in the table above is 2 (i.e., two rows of observations per Factor A type). Of course, users can increase the number of replications as required. The number of replications has to be consistent if users wish to extend the dataset.

Forecasting, Multiple Regression, and Econometrics

ARIMA (Autoregressive Integrated Moving Average)

One powerful advanced times-series forecasting tool is the ARIMA or Auto Regressive Integrated Moving Average approach. ARIMA forecasting assembles three separate tools into a comprehensive model. The first tool segment is the autoregressive or "AR" term, which corresponds to the number of lagged value of the residual in the unconditional forecast model. In essence, the model captures the historical variation of actual data to a forecasting model and uses this variation, or residual, to create a better predicting model. The second tool segment is the integration order or the "I" term. This integration term corresponds to the number of differencing the time series to be forecasted goes through. This element accounts for any nonlinear growth rates existing in the data. The third tool segment is the moving average or "MA" term, which is essentially the moving average of lagged forecast errors. By incorporating this average of lagged forecast errors, the model, in essence, learns from its forecast errors or mistakes and corrects for them through a moving-average calculation.

Auto ARIMA (Automatic Autoregressive Integrated Moving Average)

ARIMA is an advanced modeling technique used to model and forecast time-series data (data that have a time component to them, e.g., interest rates, inflation, sales revenues, gross domestic product).

The ARIMA Auto Model selection will analyze all combinations of ARIMA (p,d,q) for the most common values of 0, 1, and 2, and reports the relevant Akaike Information Criterion (AIC) and Schwarz Criterion (SC). The lowest AIC and SC model is then chosen and run. Users can also add in exogenous variables into the model selection.

In addition, in order to forecast ARIMA models with exogenous variables, it is necessary that the exogenous variables have enough data points to cover the additional number of periods to forecast. Finally, due to the complexity of the models, this module may take several minutes to run.

Autoregressive Integrated Moving Average, or ARIMA (p,d,q), models are the extension of the AR model that uses three components for modeling the serial correlation in the time-series data. The first component is the autoregressive (AR) term. The AR(p) model uses the p lags of the time series in the equation. An AR(p) model has the form: $y(t)=a(1) y(t-1)+ \ldots +a(p) y(t-p)+e(t)$. The second component is the integration (d) order term. Each integration order corresponds to differencing the time series. I(1) means differencing the data once; I(d) means differencing the data d times. The third component is the moving average (MA) term. The MA(q) model uses the q lags of the forecast errors to improve the forecast. An MA(q) model has the form: $y(t)=e(t)+b(1) e(t-1)+ \ldots +b(q) e(t-q)$. Finally, an ARMA (p,q) model has the combined form: $y(t)=a(1) y(t-1)+ \ldots +a(p) y(t-p)+e(t)+b(1) e(t-1)+ \ldots +b(q) e(t-q)$.

Basic Multiple Regression

It is assumed that the user is familiar with regression analysis. Multiple Regression analysis is used to find a statistical and mathematical relationship between a single dependent variable and multiple independent variables. Regression is useful for determining the relationship as well as for forecasting.

For illustrative purposes, suppose users want to determine if sales of a product can be attributed to an advertisement in a local paper. In this case, sales revenue is the dependent variable, Y (it is dependent on size of the advertisement and how frequently is appears a week), while advertisement size and frequency are the independent variables X1 and X2 (they are independent of sales). Interpreting the regression analysis is more complex (this may include hypothesis t-tests, F-tests, ANOVA, correlations, autocorrelations, etc.).

Basic Econometrics and Autoeconometrics

Econometrics refers to a branch of business analytics, modeling, and forecasting techniques for modeling the behavior or forecasting certain business, financial, economic, physical science, and other variables. Running the Basic Econometrics models is similar to regular regression analysis except that the dependent and independent variables are allowed to be modified before a regression is run. The report generated is the same as shown in the Multiple Regression section previously and the interpretations are identical to those described previously Combinatorial Fuzzy Logic In contrast, the term fuzzy logic is derived from fuzzy set theory to deal with reasoning that is approximate rather than accurate. As opposed to crisp logic, where binary sets have binary logic, fuzzy logic variables may have a truth value that ranges between 0 and 1 and is not constrained to the two truth values of classic propositional logic. This fuzzy weighting schema is used together with a combinatorial method to yield time-series forecast results. Note that neither neural networks nor fuzzy logic techniques have yet been established as valid and reliable methods in the business forecasting domain, on either a strategic, tactical, or operational level. Much research is still required in these advanced forecasting fields. Nonetheless, PEAT's Forecast Statistics module provides the fundamentals of these two techniques for the purposes of running time-series forecasts.

GARCH Volatility Forecasts

The Generalized Autoregressive Conditional Heteroskedasticity (GARCH) Model is used to model historical and forecast future volatility levels of a marketable security (e.g., stock prices, commodity prices, oil prices, etc.). The dataset has to be a time series of raw price levels. GARCH will first convert the prices into relative returns and then run an internal optimization to fit the historical data to a mean-reverting volatility term structure, while assuming that the volatility is heteroskedastic in nature (changes over time according to some econometric characteristics).

The typical volatility forecast situation requires P=1, Q=1; Periodicity=number of periods per year (12 for monthly data, 52 for weekly data, 252 or 365 for daily data); Base=minimum of 1 and up to the periodicity value; and Forecast Periods=number of annualized volatility forecasts users wish to obtain. There are several GARCH models available in PEAT's Forecast Statistics module, including EGARCH, EGARCH-T, GARCH-M, GJR-GARCH, GJR-GARCH-T, IGARCH, and T-GARCH.

GARCH models are used mainly in analyzing financial time-series data to ascertain their conditional variances and volatilities. These volatilities are then used to value the options as usual, but the amount of historical data necessary for a good volatility estimate remains significant. Usually, several dozen—and even up to hundreds—of data points are required to obtain good GARCH estimates.

GARCH is a term that incorporates a family of models that can take on a variety of forms, known as GARCH(p,q), where p and q are positive integers that define the resulting GARCH model and its forecasts. In most cases for financial instruments, a GARCH(1,1) is sufficient and is most generally used. For instance, a GARCH (1,1) model takes the form of:

$$y_t = x_t\varepsilon + \varepsilon_t$$

$$\sigma_t^2 = \omega + \alpha\varepsilon_{t-1}^2 + \beta\sigma_{t-1}^2$$

where the first equation's dependent variable ($y_t$) is a function of exogenous variables ($x_t$) with an error term ($\varepsilon_t$). The second equation estimates the variance (squared volatility $\sigma_t^2$) at time t, which depends on a historical mean ($\omega$); on news about volatility from the previous period, measured as a lag of the squared residual from the mean equation ($\varepsilon_{t-1}^2$); and on volatility from the previous period ($\sigma_{t-1}^2$). Suffice it to say that detailed knowledge of econometric modeling (model specification tests, structural breaks, and error estimation) is required to run a GARCH model, making it less accessible to the general analyst. Another problem with GARCH models is that the model usually does not provide a good statistical fit. That is, it is impossible to predict the stock market and, of course, equally if not harder to predict a stock's volatility over time.

J-Curve and S-Curve Forecasts

The J curve, or exponential growth curve, is one where the growth of the next period depends on the current period's level and the increase is exponential. This phenomenon means that over time, the values will increase significantly, from one period to another. This model is typically used in forecasting biological growth and chemical reactions over time.

The S curve, or logistic growth curve, starts off like a J curve, with exponential growth rates. Over time, the environment becomes saturated (e.g., market saturation, competition, overcrowding), the growth slows, and the forecast value eventually ends up at a saturation or maximum level. The S-curve model is typically used in forecasting market share or sales growth of a new product from market introduction until maturity and decline, population dynamics, growth of bacterial cultures, and other naturally occurring variables.

Markov Chains

A Markov chain exists when the probability of a future state depends on a previous state and when linked together forms a chain that reverts to a long-run steady state level. This Markov approach is typically used to forecast the market share of two competitors. The required inputs are the starting probability of a customer in the first store (the first state) returning to the same store in the next period versus the probability of switching to a competitor's store in the next state.

Neural Network Forecasting

The term Neural Network is often used to refer to a network or circuit of biological neurons, while modern usage of the term often refers to artificial neural networks comprising artificial neurons, or nodes, recreated in a software environment. Such networks attempt to mimic the neurons in the human brain in ways of thinking and identifying patterns and, in our situation, identifying patterns for the purposes of forecasting time-series data. Note that the number of hidden layers in the network is an input parameter and will need to be calibrated with user data. Typically, the more complicated the data pattern, the higher the number of hidden layers users would need and the longer it would take to compute. It is recommended that users start at 3 layers. The testing period is simply the number of data points used in the final calibration of the Neural Network model, and it is recommended that at least the same number of periods users wish to forecast as the testing period be used.

Nonlinear Extrapolation

Extrapolation involves making statistical forecasts by using historical trends that are projected for a specified period of time into the future. It is only used for time-series forecasts. For cross-sectional or mixed panel data (time-series with cross-sectional data), multivariate regression is more appropriate. This methodology is useful when major changes are not expected; that is, causal factors are expected to remain constant or when the causal factors of a situation are not clearly understood. It also helps discourage the introduction of personal biases into the process. Extrapolation is fairly reliable, relatively simple, and inexpensive. However, extrapolation, which assumes that recent and historical trends will continue, produces large forecast errors if discontinuities occur within the projected time period; that is, pure extrapolation of time series assumes that all we need to know is contained in the historical values of the series being forecasted. If we assume that past behavior is a good predictor of future behavior, extrapolation is appealing. This makes it a useful approach when all that is needed are many short-term forecasts.

This methodology estimates the $f(x)$ function for any arbitrary x value, by interpolating a smooth nonlinear curve through all the x values and, using this smooth curve, extrapolates future x values beyond the historical dataset. The methodology employs either the polynomial functional form or the rational functional form (a ratio of two polynomials). Typically, a polynomial functional form is sufficient for well-behaved data; however, rational functional forms are sometimes more accurate (especially with polar functions, i.e., functions with denominators approaching zero).

Principal Components Analysis

Principal Components Analysis is a way of identifying patterns in data and recasting the data in such a way as to highlight their similarities and differences. Patterns of data are very difficult to find in high dimensions when multiple variables exist, and higher dimensional graphs are very difficult to represent and interpret. Once the patterns in the data are found, they can be compressed, resulting in a reduction of the number of dimensions. This reduction of data dimensions does not mean much loss of information. Instead, similar levels of information can now be obtained by fewer variables.

The analysis provides the Eigenvalues and Eigenvectors of the dataset. The Eigenvector with the highest Eigenvalue is the principle component of the dataset. Ranking the Eigenvalues from highest to lowest provides the components in order of statistical significance. If the Eigenvalues are small, users do not lose much information. It is up to users to decide how many components to ignore based on their Eigenvalues. The proportions and cumulative proportions tell users how much of the variation in the dataset can be explained by incorporating that component. Finally, the data is then transformed to account for only the number of components users decide to keep.

Spline (Cubic Spline Interpolation and Extrapolation)

Sometimes there are missing values in a time-series dataset. As an example, interest rates for years 1 to 3 may exist, followed by years 5 to 8, and then year 10. Spline curves can be used to interpolate the missing years' interest rate values based on the data that exist. Spline curves can also be used to forecast or extrapolate values of future time periods beyond the time period of available data. The data can be linear or nonlinear. The Known X values represent the values on the x-axis of a chart (as an example, this is Years of the known interest rates, and, usually, the x-axis are the values that are known in advance such as time or years) and the Known Y values represent the values on the y-axis (in our case, the known Interest Rates). The y-axis variable is typically the variable users wish to interpolate missing values from or extrapolate the values into the future.

Stepwise Regression

One powerful automated approach to regression analysis is Stepwise Regression. Based on its namesake, the regression process proceeds in multiple steps. There are several ways to set up these stepwise algorithms, including the correlation approach, forward method, backward method, and the forward and backward method.

In the correlation method, the dependent variable (Y) is correlated to all the independent variables (X), and a regression is run, starting with the X variable with the highest absolute correlation value. Then subsequent X variables are added until the p-values indicate that the new X variable is no longer statistically significant. This approach is quick and simple but does not account for interactions among variables, and an X variable, when added, will statistically overshadow other variables.

In the forward method, first Y is correlated with all X variables, a regression for Y is run on the highest absolute value correlation of X, and the fitting errors are obtained. Then, these errors are correlated with the remaining X variables and the highest absolute value correlation among this remaining set is chosen and another regression is run. The process is repeated until the p-value for the latest X variable coefficient is no longer statistically significant then the process is stopped.

In the backward method, a regression with Y is run on all X variables and, reviewing each variable's p-value, the variable with the largest p-value is systematically eliminated. Then a regression is run again, repeating each time until all p-values are statistically significant.

In the forward and backward method, the forward method is applied to obtain three X variables, and then the backward approach is applied to see if one of them needs to be eliminated because it is statistically insignificant. The forward method is repeated, and then the backward method until all remaining X variables are considered.

The Stepwise Regression is an automatic search process iterating through all the independent variables, and it models the variables that are statistically significant in explaining the variations in the dependent variable. Stepwise Regression is powerful when there are many independent variables and a large combination of models can be built. To illustrate, suppose users want to determine if sales of a product can be attributed to an advertisement in a local paper. In this case, sales revenue is the dependent variable Y, while the independent variables X1 to X5 are the size of the advertisement, cost of the ad, number of readers, day of the week, and how frequently it appears a week. Stepwise Regression will automatically iterate through these X variables to find those that are statistically significant in the regression model. Interpreting the regression analysis is more complex (this may include hypothesis t-tests, F-tests, ANOVA, correlations, autocorrelations, etc.).

Forecasting with Time-Series Decomposition

Forecasting is the act of predicting the future whether it is based on historical data or speculation about the future when no history exists. When historical data exists, a quantitative or statistical approach is best, but if no historical data exist, then a qualitative or judgmental approach is usually the only recourse. There are eight common time-series models, segregated by seasonality and trend. For instance, if the data variable has no trend or seasonality, then a single moving-average model or a single exponential-smoothing model would suffice. However, if seasonality exists but no discernible trend is present, either a seasonal additive or seasonal multiplicative model would be better, and so forth.

The best-fitting test for the moving average forecast uses the Root Mean Squared Errors (RMSE). The RMSE calculates the square root of the average squared deviations of the fitted values versus the actual data points.

Mean Squared Error (MSE) is an absolute error measure that squares the errors (the difference between the actual historical data and the forecast-fitted data predicted by the model) to keep the positive and negative errors from canceling each other out. This measure also tends to exaggerate large errors by weighting the large errors more heavily than smaller errors by squaring them, which can help when comparing different time-series models. Root Mean Square Error (RMSE) is the square root of MSE and is the most popular error measure, also known as the quadratic loss function. RMSE can be defined as the average of the absolute values of the forecast errors and is highly appropriate when the cost of the forecast errors is proportional to the absolute size of the forecast error. The RMSE is used as the selection criteria for the best-fitting time-series model. Mean Absolute Deviation (MAD) is an error statistic that averages the distance (absolute value of the difference between the actual historical data and the forecast-fitted data predicted by the model) between each pair of actual and fitted forecast data points and is most appropriate when the cost of forecast errors is proportional to the absolute size of the forecast errors.

Mean Absolute Percentage Error (MAPE) is a relative error statistic measured as an average percent error of the historical data points and is most appropriate when the cost of the forecast error is more closely related to the percentage error than the numerical size of the error.

Finally, an associated measure is the Theil's U statistic, which measures the naivety of the model's forecast. That is, if the Theil's U statistic is less than 1.0, then the forecast method used provides an estimate that is statistically better than guessing.

Single Moving Average

The single moving average is applicable when time-series data with no trend and seasonality exist. This model is not appropriate when used to predict cross-sectional data. The single moving average simply uses an average of the actual historical data to project future outcomes. This average is applied consistently moving forward, hence the term moving average. The value of the moving average for a specific length is simply the summation of actual historical data arranged and indexed in a time sequence. The software finds the optimal moving average lag automatically through an optimization process that minimizes the forecast errors.

Single Exponential Smoothing

The single exponential smoothing approach is used when no discernible trend or seasonality exists in the time-series data. This model is not appropriate when used to predict cross-sectional data. This method weights past data with exponentially decreasing weights going into the past; that is, the more recent the data value, the greater its weight. This weighting largely overcomes the limitations of moving averages or percentage-change models. The weight used is termed the alpha measure. The software finds the optimal alpha parameter automatically through an optimization process that minimizes the forecast errors.

Double Moving Average

The double moving average method will smooth out past data by performing a moving average on a subset of data that represents a moving average of an original set of data. That is, a second moving average is performed on the first moving average. The second moving average application captures the trending effect of the data. The results are then weighted and forecasts are created. The software finds the optimal moving average lag automatically through an optimization process that minimizes the forecast errors.

Double Exponential Smoothing

The double exponential smoothing method is used when the data exhibit a trend but no seasonality. This model is not appropriate when used to predict cross-sectional data. Double exponential smoothing applies single exponential smoothing twice, once to the original data and then to the resulting single exponential smoothing data. An alpha weighting parameter is used on the first or single exponential smoothing (SES), while a beta weighting parameter is used on the second or double exponential smoothing (DES). This approach is useful when the historical data series is not stationary. The software finds the optimal alpha and beta parameters automatically through an optimization process that minimizes the forecast errors.

Seasonal Additive

If the time-series data has no appreciable trend but exhibits seasonality, then the additive seasonality and multiplicative seasonality methods apply. The additive seasonality model breaks the historical data into a level (L), or base-case, component as measured by the alpha parameter, and a seasonality (S) component measured by the gamma parameter. The resulting forecast value is simply the addition of this base-case level to the seasonality value. The software finds the optimal alpha and gamma parameters automatically through an optimization process that minimizes the forecast errors.

Seasonal Multiplicative

If the time-series data has no appreciable trend but exhibits seasonality, then the additive seasonality and multiplicative seasonality methods apply. The multiplicative seasonality model breaks the historical data into a level (L), or base-case, component as measured by the alpha parameter, and a seasonality (S) component measured by the gamma parameter. The resulting forecast value is simply the multiplication of this base-case level by the seasonality value. The software finds the optimal alpha and gamma parameters automatically through an optimization process that minimizes the forecast errors.

Holt-Winter's Seasonal Additive

When both seasonality and trend exist, more advanced models are required to decompose the data into their base elements: a base-case level (L) weighted by the alpha parameter; a trend component (b) weighted by the beta parameter; and a seasonality component (S) weighted by the gamma parameter. Several methods exist, but the two most common are the Holt-Winter's additive seasonality and Holt-Winter's multiplicative seasonality methods. In the Holt-Winter's additive model, the base-case level, seasonality, and trend are added together to obtain the forecast fit.

Holt-Winter's Seasonal Multiplicative

When both seasonality and trend exist, more advanced models are required to decompose the data into their base elements: a base-case level (L) weighted by the alpha parameter; a trend component (b) weighted by the beta parameter; and a seasonality component (S) weighted by the gamma parameter. Several methods exist, but the two most common are the Holt-Winter's additive seasonality and Holt-Winter's multiplicative seasonality methods. In the Holt-Winter's multiplicative model, the base-case level and trend are added together and multiplied by the seasonality factor to obtain the forecast fit.

Trendlines

Trendlines can be used to determine if a set of time-series data follows any appreciable trend. Trends can be linear or nonlinear (such as exponential, logarithmic, moving average, polynomial, or power). In forecasting models, the process usually includes removing the effects of accumulating datasets from seasonality and trend to show only the absolute changes in values and to allow potential cyclical patterns to be identified after removing the general drift, tendency, twists, bends, and effects of seasonal cycles of a set of time-series data. For example, a detrended dataset may be necessary to see a more accurate account of a company's sales in a given year by shifting the entire dataset from a slope to a flat surface to better expose the underlying cycles and fluctuations.

Volatility: Log Returns Approach

There are several ways to estimate the volatility used in forecasting and option valuation models. The most common approach is the Logarithmic Returns Approach. This method is used mainly for computing the volatility on liquid and tradable assets, such as stocks in financial options. However, sometimes it is used for other traded assets, such as the price of oil or electricity. This method cannot be used when negative cash flows or prices occur, which means it is used only on positive data, making it most appropriate for computing the volatility of traded assets. The approach is simply to take the annualized standard deviation of the logarithmic relative returns of the time-series data as the proxy for volatility.

Yield Curve—CIR Model

The Cox-Ingersoll-Ross (CIR) model yield curve is the time-series relationship between interest rates and the time to maturity of some underlying debt, credit, or bond. The more formal mathematical description of this relationship is called the term structure of interest rates. The yield curve can take on various shapes. In the normal yield curve, yields rise as maturity lengthens and the yield curve is positively sloped, reflecting investor expectations for the economy to grow in the future (and hence an expectation that inflation rates will rise in the future). An inverted yield curve occurs when long-term yields fall below short-term yields, and long-term investors will settle for lower yields now if they think the economy will slow or even decline in the future. This situation is indicative of a worsening economy in the future (and hence an expectation that inflation will remain low in the future). Another potential situation is a flat yield curve, signaling uncertainty in the economy. The yield curve also can be humped or show a smile or a frown. The yield curve over time can change in shape through a twist or bend, a parallel shift, or a movement on one end versus another. As the yield curve is related to inflation rates, and central banks in most countries have the ability to control monetary policy to target inflation rates, inflation rates are mean-reverting in nature. This also implies that interest rates are mean-reverting as well as stochastically changing over time. This section describes the Cox-Ingersoll-Ross (CIR) model, which is used to compute the term structure of interest rates and yield curve. The CIR model assumes a mean-reverting stochastic interest rate. The rate of reversion and long-run mean rates can be determined. If the long-run rate is higher than the current short rate, the yield curve is upward sloping, and vice versa.

Curve Interpolation BIM Model

A number of alternative methods exist for estimating the term structure of interest rates and the yield curve. Some are fully specified stochastic term structure models while others are simply interpolation models. The former include the CIR and Vasicek models, while the latter are interpolation models such as the Bliss or Nelson approach. This section looks at the Bliss interpolation model (BIM) for generating the term structure of interest rates and yield curve estimation. Some econometric modeling techniques are required to calibrate the values of several input parameters in this model. The Bliss approach modifies the Nelson-Siegel method by adding an additional generalized parameter. Virtually any yield curve shape can be interpolated using these models, which are widely used at banks around the world.

Yield Curve—Curve Interpolation NS Model

The Nelson-Siegel (NS) interpolation model for generating the term structure of interest rates and yield curve estimation. Some econometric modeling techniques are required to calibrate the values of several input parameters in this model. Just like the Bliss model, the NS model is purely an interpolation model, with four estimated parameters. If properly modeled, it can be made to fit almost any yield curve shape. Calibrating the inputs in the NS model requires facility with econometric modeling and error optimization techniques. Typically, if some interest rates exist, a better approach is to use the spline interpolation method.

Yield Curve—Forward Rates from Spot Rates

Given two spot rates (from Year 0 to some future time periods), you can determine the implied forward rate between these two time periods. For instance, if the spot rate from Year 0 to Year 1 is 8%, and the spot rate from Year 0 to Year 2 is 7% (both yields are known currently), the implied forward rate from Year 1 to Year 2 (that will occur based on current expectations) is 6%.

Cubic Spline Curves

The cubic spline polynomial interpolation and extrapolation model is used to "fill in the gaps" of missing values in a time-series dataset. In this chapter, we will illustrate the model application on spot yields and term structure of interest rates whereby the model can be used to both interpolate missing data points within a time series of interest rates (as well as other macroeconomic variables such as inflation rates and commodity prices or market returns) and also used to extrapolate outside of the given or known range, useful for forecasting purposes. To illustrate, the U.S. Department of Treasury publishes zero-coupon government bonds (risk-free rates). The values provided are 1-month, 3-month, 6-month, 1-3 years, and then skips to years 5, 7, 10, 20 and 30. We can apply the cubic spline methodology to interpolate the missing values from 1 month to 30 years, and extrapolate beyond 30 years. The Known X Values input are the values on the x-axis (in the example, we are interpolating interest rates, a time-series of values, making the x-axis time). The Known Y Values are the published interest rates. With this information, we can determine the required Y values (missing interest rates) by providing the required X values (the time periods where we want to predict the interest rates). The results from a cubic spline forecast will return, for example, the entire term structure of interest rates for every six months is obtained, from the period of 6 months to 50 years. The interest rates obtained up to year 30 are interpolated. Interest rates beyond year 30 are extrapolated from the original known dataset.

Notice that the time-series chart shows a nonlinear polynomial function that is obtained using spline curve methodology.

Yield Curve—Vasicek Model

The Vasicek model is used to compute the term structure of interest rates and yield curve. The Vasicek model assumes a mean-reverting stochastic interest rate. If the long-run rate is higher than the current short rate, the yield curve is upward sloping, and vice versa. The yield curve is the time-series relationship between interest rates and the time to maturity of some underlying debt. The more formal mathematical description of this relationship is called the term structure of interest rates. The yield curve can take on various shapes. In the normal yield curve, yields rise as maturity lengthens and the yield curve is positively sloped, reflecting investor expectations for the economy to grow in the future (and hence an expectation that inflation rates will rise in the future). An inverted yield curve occurs when the long-term yields fall below short-term yields, and long-term investors settle for lower yields now if they think the economy will slow or even decline in the future, indicative of a worsening economic situation in the future (and hence an expectation that inflation will remain low in the future). Another potential situation is a flat yield curve, signaling uncertainty in the economy. The yield curve also can be humped or show a smile or a frown. The yield curve over time can change in shape through a twist or bend, a parallel shift, or a movement on one end versus another. As the yield curve is related to inflation rates, and as central banks in most countries have the ability in order to control monetary policy to target inflation rates, inflation rates are mean-reverting in nature. This also implies that interest rates are mean-reverting as well as stochastically changing over time. In a 1977 paper, a Czech mathematician, Oldrich Vasicek, proved that bond prices on a yield curve over time and various maturities are driven by the short end of the yield curve, or the short-term interest rates, using a risk-neutral martingale measure. In his work the mean-reverting Ornstein-Uhlenbeck process was assumed, hence the resulting Vasicek model requires that a mean-reverting interest rate process be modeled (rate of mean reversion and long-run mean rates are both inputs in the Vasicek model).

Forecasting with Stochastic Processes

The Basics of Forecasting with Stochastic Processes

A stochastic process is nothing but a mathematically defined equation that can create a series of outcomes over time, outcomes that are not deterministic in nature. That is, it does not follow any simple discernible rule such as price will increase X percent every year or revenues will increase by this factor of X plus Y percent. A stochastic process is, by definition, nondeterministic, and one can plug numbers into a stochastic process equation and obtain different results every time. For instance, the path of a stock price is stochastic in nature, and one cannot reliably predict the stock price path with any certainty. However, the price evolution over time is enveloped in a process that generates these prices. The process is fixed and predetermined, but the outcomes are not. Hence, by stochastic simulation, we create multiple pathways of prices, obtain a statistical sampling of these simulations, and make inferences on the potential pathways that the actual price may undertake given the nature and parameters of the stochastic process used to generate the time series.

Autocorrelation

Autocorrelation can be defined as the correlation of a dataset to itself in the past. It is the correlation between observations of a time series separated by specified time units. Certain time-series data follow an autocorrelated series as future outcomes rely heavily on past outcomes (e.g., revenues or sales that follow a weekly, monthly, quarterly, or annual seasonal cycle; inflation and interest rates that follow some economic or business cycle, etc.). The term autocorrelation describes a relationship or correlation between values of the same data series at different time periods. The term lag defines the offset when comparing a data series with itself. For autocorrelation, lag refers to the offset of data that users choose when correlating a data series with itself. In PEAT's Forecast Statistics module, the autocorrelation function is calculated, together with the Q-statistic and relevant p-values. If the p-values are below the tested significance level, then the null hypothesis ($H_0$) of no autocorrelation is rejected, and it is concluded that there is autocorrelation with that particular lag.

Control Charts

Sometimes the specification limits are not set; instead, statistical control limits are computed based on the actual data collected (e.g., the number of defects in a manufacturing line). The upper control limit (UCL) and lower control limit (LCL) are computed, as are the central line (CL) and other sigma levels. The resulting chart is called a control chart, and if the process is out of control, the actual defect line will be outside of the UCL and LCL lines. Typically, when the LCL is a negative value, we set the floor as zero. In the interpretation of a control chart, by adding in the ±1 and 2 sigma lines, we can divide the control charts into several areas or zones. The following are rules of thumb that typically apply to control charts to determine if the process is out of control:

- If one point is beyond Area A
- If two out of three consecutive points are in Area A or beyond
- If four out of five consecutive points are in Area B or beyond
- If eight consecutive points are in Area C or beyond Additionally, a potential structural shift can be detected if any one of the following occurs:

- At least 10 out of 11 sequential points are on one side of the CL
- At least 12 out of 14 sequential points are on one side of the CL
- At least 14 out of 17 sequential points are on one side of the CL
- At least 16 out of 20 sequential points are on one side of the CL X-Bar Control Chart An X-Bar Chart is used when the variable has raw data values and there are multiple measurements in a sample experiment, multiple experiments are run, and the average of the collected data is of interest.

R-Bar Control Chart

An R-Bar Chart is used when the variable has raw data values and there are multiple measurements in a sample experiment, multiple experiments are run, and the range of the collected data is of interest.

XMR Control Chart

An XMR Chart is used when the variable has raw data values and is a single measurement taken in each sample experiment, multiple experiments are run, and the actual value of the collected data is of interest.

P Control Chart

A P Chart is used when the variable of interest is an attribute (e.g., defective or nondefective) and the data collected are in proportions of defects (or number of defects in a specific sample), there are multiple measurements in a sample experiment, multiple experiments are run with differing numbers of samples collected in each, and the average proportion of defects of the collected data is of interest.

NP Control Chart

An NP Chart is used when the variable of interest is an attribute (e.g., defective or nondefective) and the data collected are in proportions of defects (or number of defects in a specific sample), there are multiple measurements in a sample experiment, multiple experiments are run with a constant number of samples in each, and the average proportion of defects of the collected data is of interest.

C Control Chart

A C Chart is used when the variable of interest is an attribute (e.g., defective or nondefective) and the data collected are in total number of defects (actual count in units), there are multiple measurements in a sample experiment, multiple experiments are run with the same number of samples collected in each, and the average number of defects of the collected data is of interest.

U Control Chart

A U Chart is used when the variable of interest is an attribute (e.g., defective or nondefective) and the data collected are in total number of defects (actual count in units), there are multiple measurements in a sample experiment, multiple experiments are run with differing numbers of samples collected in each, and the average number of defects of the collected data is of interest.

Deseasonalization

The data deseasonalization method removes any seasonal components in the original data. In forecasting models, the process usually includes removing the effects of accumulating datasets from seasonality and trend to show only the absolute changes in values and to allow potential cyclical patterns to be identified after removing the general drift, tendency, twists, bends, and effects of seasonal cycles of a set of time-series data. Many time-series data exhibit seasonality where certain events repeat themselves after some time period or seasonality period (e.g., ski resorts' revenues are higher in winter than in summer, and this predictable cycle will repeat itself every winter). Seasonality periods represent how many periods would have to pass before the cycle repeats itself (e.g., 24 hours in a day, 12 months in a year, 4 quarters in a year, 60 minutes in an hour, etc.). For deseasonalized and detrended data, a seasonal index greater than 1 indicates a high period or peak within the seasonal cycle, and a value below 1 indicates a dip in the cycle.

Distributional Fitting

Another powerful simulation tool is distributional fitting or determining which distribution to use for a particular input variable in a model and what the relevant distributional parameters are. If no historical data exist, then the analyst must make assumptions about the variables in question. One approach is to use the Delphi method where a group of experts is tasked with estimating the behavior of each variable. For instance, a group of mechanical engineers can be tasked with evaluating the extreme possibilities of a spring coil's diameter through rigorous experimentation or guesstimates. These values can be used as the variable's input parameters (e.g., uniform distribution with extreme values between 0.5 and 1.2). When testing is not possible (e.g., market share and revenue growth rate), management can still make estimates of potential outcomes and provide the best-case, most-likely case, and worst-case scenarios. However, if reliable historical data are available, distributional fitting can be accomplished. Assuming that historical patterns hold and that history tends to repeat itself, then historical data can be used to find the best-fitting distribution with their relevant parameters to better define the variables to be simulated.

Heteroskedasticity

A common violation in regression, econometric modeling, and some time-series forecast methods is heteroskedasticity. Heteroskedasticity is defined as the variance of the forecast errors increasing over time. If pictured graphically, the width of the vertical data fluctuations increases or fans out over time. As an example, the data points have been changed to exaggerate the effect. However, in most time-series analysis, checking for heteroskedasticity is a much more difficult task. The coefficient of determination, or R-squared, in a multiple regression analysis drops significantly when heteroskedasticity exists. As is, the current regression model is insufficient and incomplete.

If the variance of the dependent variable is not constant, then the error's variance will not be constant. The most common form of such heteroskedasticity in the dependent variable is that the variance of the dependent variable may increase as the mean of the dependent variable increases for data with positive independent and dependent variables.

Unless the heteroskedasticity of the dependent variable is pronounced, its effect will not be severe: the least-squares estimates will still be unbiased, and the estimates of the slope and intercept will either be normally distributed if the errors are normally distributed, or at least normally distributed asymptotically (as the number of data points becomes large) if the errors are not normally distributed. The estimate for the variance of the slope and overall variance will be inaccurate, but the inaccuracy is not likely to be substantial if the independent-variable values are symmetric about their mean.

Heteroskedasticity of the dependent variable is usually detected informally by examining the X-Y scatter plot of the data before performing the regression. If both nonlinearity and unequal variances are present, employing a transformation of the dependent variable may have the effect of simultaneously improving the linearity and promoting equality of the variances. Otherwise, a weighted least-squares linear regression may be the preferred method of dealing with nonconstant variance of the dependent variable.

Maximum Likelihood Models on Logit, Probit, and Tobit

Limited Dependent Variables describe the situation where the dependent variable contains data that are limited in scope and range, such as binary responses (0 or 1) and truncated, ordered, or censored data. For instance, given a set of independent variables (e.g., age, income, education level of credit card debt, or mortgage loan holders), we can model the probability of default using maximum likelihood estimation (MLE). The response or dependent variable Y is binary, that is, it can have only two possible outcomes that we denote as 1 and 0 (e.g., Y may represent presence/absence of a certain condition, defaulted/not defaulted on previous loans, success/failure of some device, answer yes/no on a survey, etc.), and we also have a vector of independent variable regressors X, which are assumed to influence the outcome Y. A typical ordinary least squares regression approach is invalid because the regression errors are heteroskedastic and non-normal, and the resulting estimated probability estimates will return nonsensical values of above 1 or below 0. MLE analysis handles these problems using an iterative optimization routine to maximize a log likelihood function when the dependent variables are limited.

A Logit or Logistic regression is used for predicting the probability of occurrence of an event by fitting data to a logistic curve. It is a generalized linear model used for binomial regression, and like many forms of regression analysis, it makes use of several predictor variables that may be either numerical or categorical. MLE applied in a binary multivariate logistic analysis is used to model dependent variables to determine the expected probability of success of belonging to a certain group. The estimated coefficients for the Logit model are the logarithmic odds ratios and cannot be interpreted directly as probabilities. A quick computation is first required and the approach is simple.

Specifically, the Logit model is specified as Estimated $Y=LN[P_i/(1-P_i)]$ or, conversely, $P_i=EXP(Estimated\ Y)/(1+EXP(Estimated\ Y))$, and the coefficients $\beta_i$ are the log odds ratios. So, taking the antilog, or $EXP(\beta_i)$, we obtain the odds ratio of $P_i/(1-P_i)$. This means that with an increase in a unit of $\beta_i$, the log odds ratio increases by this amount. Finally, the rate of change in the probability is $dP/dX=\beta_i P_i(1-P_i)$. The Standard Error measures how accurate the predicted Coefficients are, and the t-Statistics are the ratios of each predicted Coefficient to its Standard Error and are used in the typical regression hypothesis test of the significance of each estimated parameter. To estimate the probability of success of belonging to a certain group (e.g., predicting if a smoker will develop chest complications given the amount smoked per year), simply compute the Estimated Y value using the MLE coefficients. For example, if the model is Y=1.1+0.005 (Cigarettes), then someone smoking 100 packs per year has an Estimated Y of 1.1+0.005(100)=1.6. Next, compute the inverse antilog of the odds ratio: EXP(Estimated Y)/[1+EXP (Estimated Y)]=EXP(1.6)/(1+EXP(1.6))=0.8320. So, such a person has an 83.20% chance of developing some chest complications in his or her lifetime.

A Probit model (sometimes also known as a Normit model) is a popular alternative specification for a binary response model, which employs a Probit function estimated using maximum likelihood estimation and called Probit regression. The Probit and Logistic regression models tend to produce very similar predictions where the parameter estimates in a logistic regression tend to be 1.6 to 1.8 times higher than they are in a corresponding Probit model. The choice of using a Probit or Logit is entirely up to convenience, and the main distinction is that the logistic distribution has a higher kurtosis (fatter tails) to account for extreme values. For example, suppose that house ownership is the decision to be modeled, and this response variable is binary (home purchase or no home purchase) and depends on a series of independent variables $X_i$ such as income, age, and so forth, such that $I_i=\beta_0+\beta_1 X_1+\ldots+\beta_n X_n$, where the larger the value of $I_i$, the higher the probability of home ownership. For each family, a critical I* threshold exists, where if exceeded, the house is purchased—otherwise, no home is purchased—and the outcome probability (P) is assumed to be normally distributed such that $P_i=CDF(I)$ using a standard normal cumulative distribution function (CDF). Therefore, use the estimated coefficients exactly like those of a regression model and using the Estimated Y value, apply a standard normal distribution (users can use Microsoft Excel's NORMSDIST function or PEAT's Distributional Analysis tool by selecting Normal distribution and setting the mean to be 0 and standard deviation to be 1). Finally, to obtain a Probit or probability unit measure, set $I_i+5$ (this is because whenever the probability $P_i<0.5$, the estimated $I_i$ is negative, due to the fact that the normal distribution is symmetrical around a mean of zero).

The Tobit model (Censored Tobit) is an econometric and biometric modeling method used to describe the relationship between a non-negative dependent variable $Y_i$ and one or more independent variables $X_i$. In a Tobit model, is the dependent variable is censored; that is, the dependent variable is censored because values below zero are not observed. The Tobit model assumes that there is a latent unobservable variable Y*. This variable is linearly dependent on the $X_i$ variables via a vector of $\beta_i$ coefficients that determine their interrelationships. In addition, there is a normally distributed error term, $U_i$, to capture random influences on this relationship. The observable variable $Y_i$ is defined to be equal to the latent variables whenever the latent variables are above zero, and $Y_i$ is assumed to be zero otherwise. That is, $Y_i=Y^*$ if $Y^*>0$ and $Y_i=0$ if $Y^*=0$. If the relationship parameter $\beta_i$ is estimated by using ordinary least squares regression of the observed $Y_i$ on $X_i$, the resulting regression estimators are inconsistent and yield downward-biased slope coefficients and an upward-biased intercept. Only MLE would be consistent for a Tobit model. In the Tobit model, there is an ancillary statistic called sigma, which is equivalent to the standard error of estimate in a standard ordinary least squares regression, and the estimated coefficients are used the same way as in a regression analysis.

Multicollinearity

Multicollinearity exists when there is a linear relationship between the independent variables in a regression analysis. When this occurs, the regression equation cannot be estimated at all. In near-collinearity situations, the estimated regression equation will be biased and provide inaccurate results. This situation is especially true when a stepwise regression approach is used, where the statistically significant independent variables will be thrown out of the regression mix earlier than expected, resulting in a regression equation that is neither efficient nor accurate.

Partial Autocorrelation

Autocorrelation can be defined as the correlation of a dataset to itself in the past. It is the correlation between observations of a time series separated by specified time units. Certain time-series data follow an autocorrelated series as future outcomes rely heavily on past outcomes (e.g., revenues or sales that follow a weekly, monthly, quarterly, or annual seasonal cycle; inflation and interest rates that follow some economic or business cycle, etc.). Partial Autocorrelations (PAC), in contrast, are used to measure the degree of association between each data point at a particular time $Y_t$ and a time lag $Y_{t-k}$ when the cumulative effects of all other time lags (1, 2, 3, . . . , k−1) have been removed. The term lag defines the offset when comparing a data series with itself. In this module, the Partial Autocorrelation function is calculated, together with the Q-statistic and relevant p-values. If the p-values are below the tested significance level, then the null hypothesis ($H_0$) of no autocorrelation is rejected and it is concluded that there is autocorrelation that that particular lag.

Segmentation Clustering

Segmentation clustering takes the original dataset and runs some internal algorithms (a combination or k-means hierarchical clustering and other method of moments in order to find the best-fitting groups or natural statistical clusters) to statistically divide, or segment, the original dataset into multiple groups. This technique is valuable in a variety of settings including marketing (such as market segmentation of customers into various customer relationship management groups), physical sciences, engineering, and others.

Seasonality Test

Many time-series data exhibit seasonality where certain events repeat themselves after some time period or seasonality period (e.g., ski resorts' revenues are higher in winter than in summer, and this predictable cycle will repeat itself every winter). Seasonality periods represent how many periods would have to pass before the cycle repeats itself (e.g., 24 hours in a day, 12 months in a year, 4 quarters in a year, 60 minutes in an hour, etc.). For deseasonalized and detrended data, a seasonal index greater than 1 indicates a high period or peak within the seasonal cycle, and a value below 1 indicates a dip in the cycle. Users enter in the maximum seasonality period to test. That is, if users enter 6, the tool will test the following seasonality periods: 1, 2, 3, 4, 5, and 6. Period 1, of course, implies no seasonality in the data. Users can review the report generated for more details on the methodology, application, and resulting charts and seasonality test results. The best seasonality periodicity is listed first (ranked by the lowest RMSE error measure), and all the relevant error measurements are included for comparison: root mean squared error (RMSE), mean squared error (MSE), mean absolute deviation (MAD), and mean absolute percentage error (MAPE).

Structural Break

Structural break analysis tests whether the coefficients in different datasets are equal, and this test is most commonly used in time-series analysis to test for the presence of a structural break. A time-series dataset can be divided into two subsets. Structural break analysis is used to test each subset individually and on one another and on the entire dataset to statistically determine if, indeed, there is a break starting at a particular time period. The structural break test is often used to determine whether the independent variables have different impacts on different subgroups of the population, such as to test if a new marketing campaign, activity, major event, acquisition, divestiture, and so forth have an impact on the time-series data. Suppose, for example, a dataset has 100 time-series data points. Users can set various breakpoints to test, for instance, data points 10, 30, and 51. (This means that three structural break tests will be performed: data points 1-9 compared with 10-100; data points 1-29 compared with 30-100; and 1-50 compared with 51-100 to see if there is a break in the underlying structure at the start of data points 10, 30, and 51.). A one-tailed hypothesis test is performed on the null hypothesis ($H_o$) such that the two data subsets are statistically similar to one another, that is, there is no statistically significant structural break. The alternative hypothesis (Ha) is that the two data subsets are statistically different from one another, indicating a possible structural break. If the calculated p-values are less than or equal to 0.01, 0.05, or 0.10, then the hypothesis is rejected, which implies that the two data subsets are statistically significantly different at the 1%, 5%, and 10% significance levels. High p-values indicate that there is no statistically significant structural break.

APPENDIX

Portfolio Optimization

According to an embodiment of present invention, in the Portfolio Optimization section, the individual Options can be modeled as a portfolio and optimized to determine the best combination of projects for the portfolio. In today's competitive global economy, companies are faced with many difficult decisions. These decisions include allocating financial resources, building or expanding facilities, managing inventories, and determining product-mix strategies. Such decisions might involve thousands or millions of potential alternatives. Considering and evaluating each of them would be impractical or even impossible. A model can provide valuable assistance in incorporating relevant variables when analyzing decisions and in finding the best solutions for making decisions. Models capture the most important features of a problem and present them in a form that is easy to interpret. Models often provide insights that intuition alone cannot. An optimization model has three major elements: decision variables, constraints, and an objective. In short, the optimization methodology finds the best combination or permutation of decision variables (e.g., which products to sell and which projects to execute) in every conceivable way such that the objective is maximized (e.g., revenues and net income) or minimized (e.g., risk and costs) while still satisfying the constraints (e.g., budget and resources).

Optimization Settings

According to an embodiment of the present invention, the Options can be modeled as a portfolio and optimized to determine the best combination of projects for the portfolio in the Optimization Settings tab. Users select the decision variable type of Discrete Binary (chooses which Options to execute with a Go/No-Go binary 1/0 decision) or Continuous Budget Allocation (returns % of budget to allocate to each Option as long as the total portfolio is 100%); select the Objective (e.g., Max NPV, Min Risk, etc.); set up any Constraints (e.g., budget restrictions, number of projects restrictions, or create customized restrictions); select the Options to optimize/allocate/choose (default selection is all Options); and when completed, click Run Optimization. The software will then take users to the Optimization Results (FIG. 34).

Decision Variables

Decision variables are quantities over which users have control; for example, the amount of a product to make, the number of dollars to allocate among different investments, or which projects to select from among a limited set. As an example, portfolio optimization analysis includes a go or no-go decision on particular projects. In addition, the dollar or percentage budget allocation across multiple projects also can be structured as decision variables.

Constraints

Constraints describe relationships among decision variables that restrict the values of the decision variables. For example, a constraint might ensure that the total amount of money allocated among various investments cannot exceed a specified amount or, at most, one project from a certain group can be selected; budget constraints; timing restrictions; minimum returns; or risk tolerance levels.

Objective

According to an embodiment of the present invention, Objectives give a mathematical representation of the model's desired outcome, such as maximizing profit or minimizing cost, in terms of the decision variables. In financial analysis, for example, the objective may be to maximize returns while minimizing risks (maximizing the Sharpe's ratio or returns-to-risk ratio).

Optimization Results

According to an embodiment of the present invention, the Optimization Results tab returns the results from the portfolio optimization analysis. The main results are provided in the data grid (lower left corner), showing the final Objective function result, final Constraints, and the allocation, selection, or optimization across all individual Options within this optimized portfolio. The top left portion of the screen (FIG. 34) shows the textual details of the optimization algorithms applied, and the chart illustrates the final objective function (the chart will only show a single point for regular optimizations, whereas it will return an investment efficient frontier curve if the optional Efficient Frontier settings are set [min, max, step size] in the Optimization Settings tab).

Advanced Custom Optimization

According to an embodiment of the present invention, in the Advanced Custom Optimization tab (FIG. 35-38), users can create and solve their own optimization models. Knowledge of optimization modeling is required to set up models but users can click on Load Example and select a sample model to run. Users can use these sample models to learn how the Optimization routines can be set up. Clicking Run when done will execute the optimization routines and algorithms. The calculated results and charts will be presented on completion.

According to an embodiment of the present invention, when setting up an optimization model, it is recommended that the user go from one tab to another, starting with the Method (static, dynamic, or stochastic optimization); setting up the Decision Variables, Constraints, and Statistics (applicable only if simulation inputs have first been set up, and if dynamic or stochastic optimization is run); and setting the Objective function.

Method: Static Optimization

According to an embodiment of the present invention, in regard to the optimization, PEAT's Advanced Custom Optimization can be used to run a Static Optimization, that is, an optimization that is run on a static model, where no simulations are run. In other words, all the inputs in the model are static and unchanging. This optimization type is applicable when the model is assumed to be known and no uncertainties exist. Also, a discrete optimization can be first run to determine the optimal portfolio and its corresponding optimal allocation of decision variables before more advanced optimization procedures are applied. For instance, before running a stochastic optimization problem, a discrete optimization is first run to determine if there exist solutions to the optimization problem before a more protracted analysis is performed.

Method: Dynamic Optimization

According to an embodiment of the present invention, Dynamic Optimization is applied when Monte Carlo simulation is used together with optimization. Another name for such a procedure is Simulation-Optimization. That is, a simulation is first run, then the results of the simulation are applied back into the model, and then an optimization is applied to the simulated values. In other words, a simulation is run for N trials, and then an optimization process is run for M iterations until the optimal results are obtained or an infeasible set is found. Thus, using PEAT's optimization module, users can choose which forecast and assumption statistics to use and replace in the model after the simulation is run. Then, these forecast statistics can be applied in the optimization process. This approach is useful when users have a large model with many interacting assumptions and forecasts, and when some of the forecast statistics are required in the optimization. For example, if the standard deviation of an assumption or forecast is required in the optimization model (e.g., computing the Sharpe ratio in asset allocation and optimization problems where the mean is divided by standard deviation of the portfolio), then this approach should be used.

Method: Stochastic Optimization

The Stochastic Optimization process, in contrast, is similar to the dynamic optimization procedure with the exception that the entire dynamic optimization process is repeated T times. That is, a simulation with N trials is run, and then an optimization is run with M iterations to obtain the optimal results. Then the process is replicated T times. The results will be a forecast chart of each decision variable with T values. In other words, a simulation is run and the forecast or assumption statistics are used in the optimization model to find the optimal allocation of decision variables. Then, another simulation is run, generating different forecast statistics, and these new updated values are then optimized, and so forth. Hence, the final decision variables will each have their own forecast chart, indicating the range of the optimal decision variables. For instance, instead of obtaining single-point estimates in the dynamic optimization procedure, users can now obtain a distribution of the decision variables and, hence, a range of optimal values for each decision variable, also known as a stochastic optimization. Users should always run a Static Optimization prior to running any of the more advanced methods to test if the setup of the model is correct.

The Dynamic Optimization and Stochastic Optimization must first have simulation assumptions set. That is, both approaches require Monte Carlo Risk Simulation to be run prior to starting the optimization routines.

Decision Variables

Decision variables are quantities over which users have control; for example, the amount of a product to make, the number of dollars to allocate among different investments, or which projects to select from among a limited set. As an example, portfolio optimization analysis includes a go or no-go decision on particular projects. In addition, the dollar or percentage budget allocation across multiple projects also can be structured as decision variables.

According to an embodiment of the present invention, Users click Add to add a new Decision Variable. Users can also Change, Delete, or Duplicate an existing decision variable. Decision Variables can be set as Continuous (with lower and upper bounds), Integers (with lower and upper bounds), Binary (0 or 1), or a Discrete Range. The list of available variables is shown in the data grid, complete with their assumptions.

Constraints

Constraints describe relationships among decision variables that restrict the values of the decision variables. For example, a constraint might ensure that the total amount of money allocated among various investments cannot exceed a specified amount or, at most, one project from a certain group can be selected; budget constraints; timing restrictions; minimum returns; or risk tolerance levels.

According to an embodiment of present invention, Users click Add to add a new Constraint. Users can also Change or Delete an existing constraint.

According to an embodiment of the present invention, when users add a new constraint, the list of available Variables will be shown. By simply double-clicking on a desired variable, its variable syntax will be added to the Expression window. For example, double-clicking on a variable named "Return1" will create a syntax variable "$(Return1)$" in the window.

According to an embodiment of the present invention, users can enter their own constraint equations. For example, the following is a constraint: $(Asset1)$+$(Asset2)$+$(Asset3)$+$(Asset4)$=1, where the sum of all four decision variables must add up to 1. Users can keep adding as many constraints as needed, but they need to be aware that the higher the number of constraints, the longer the optimization will take, and the higher the probability of making an error or creating nonbinding constraints, or having constraints that violate another existing constraint (thereby introducing an error in the model).

Statistics

According to an embodiment of present invention, the Statistics subtab will be populated only if there are simulation assumptions set up. The Statistics window will only be populated if users have previously defined simulation assumptions available. If there are simulation assumptions set up, users can run Dynamic Optimization or Stochastic Optimization; otherwise users are restricted to running only Static Optimizations. In the window, users can click on the statistics individually to obtain a drop-down list. Here users can select the statistic to apply in the optimization process. The default is to return the Mean from the Monte Carlo Risk Simulation and replace the variable with the chosen statistic (in this case the average value), and Optimization will then be executed based on this statistic.

Objective

Objectives give a mathematical representation of the model's desired outcome, such as maximizing profit or minimizing cost, in terms of the decision variables. In financial analysis, for example, the objective may be to maximize returns while minimizing risks (maximizing the Sharpe's ratio or returns-to-risk ratio).

According to an embodiment of the present invention, Users can enter a customized Objective in the function window. The list of available variables is shown in the Variables window on the right. This list includes predefined decision variables and simulation assumptions. An example of an objective function equation looks something like: ($(Asset1)$*$(AS_Return1)$+$(Asset2)$*$(AS_Return2)$+$(Asset3)$*$(AS_Return3)$+$(As set4)$*$(AS_Return4)$)/sqrt(AS_Risk1)$**2*$(Asset1)$2+$(AS_Risk2)$2*$(Asset2)$* *2+$(AS_Risk3)$**2*$(Asset3)$2+$(AS_Risk4)$2*$(Asset4)$**2). Users can use some of the most common math operators such as +, −, *, /, **, where the latter is the function for "raised to the power of."

APPENDIX

Distributional Fitting

Notice that the statistical ranking methods used in the distributional fitting routines are the Chi-Square test and Kolmogorov-Smirnov test. The former is used to test discrete distributions and the latter, continuous distributions. Briefly, a hypothesis test coupled with the maximum likelihood procedure with an internal optimization routine is used to find the best-fitting parameters on each distribution tested and the results are ranked from the best fit to the worst fit. There are other distributional fitting tests such as the Anderson-Darling, Shapiro-Wilks, etc. However, these tests are very sensitive parametric tests and are highly inappropriate in Monte Carlo simulation distribution-fitting routines when different distributions are being tested. Due to their parametric requirements, these tests are most suited for testing normal distributions and distributions with normal-like behaviors (e.g., binomial distribution with a high number of trials and symmetrical probabilities) and will provide less accurate results when performed on nonnormal distributions. Take great care when using such parametric tests. The Kolmogorov-Smirnov and Chi-Square tests employed in Risk Simulator are nonparametric and semiparametric in nature and are better suited for fitting normal and nonnormal distributions.

Several statistical tests exist for deciding if a sample set of data comes from a specific distribution. The most commonly used are the Kolmogorov-Smirnov test and the Chi-Square test. Each test has its advantages and disadvantages. The following sections detail the specifics of these three tests as applied in distributional fitting in Monte Carlo simulation analysis. Other tests such as the Anderson-Darling, Jacque-Bera, and Wilkes-Shapiro are not used in Risk Simulator as these are parametric tests and their accuracy depends on the dataset being normal or near-normal. Therefore, the results of these tests are oftentimes suspect or yield inconsistent results.

Kolmogorov-Smirnov Test

The Kolmogorov-Smirnov (KS) test is based on the empirical distribution function of a sample data set and belongs to a class of nonparametric tests. This nonparametric characteristic is the key to understanding the KS test, which simply means that the distribution of the KS test statistic does not depend on the underlying cumulative distribution function being tested. Nonparametric simply means no predefined distributional parameters are required. In other words, the KS test is applicable across a multitude of underlying distributions. Another advantage is that it is an exact test as compared to the Chi-Square test, which depends on an adequate sample size for the approximations to be valid. Despite these advantages, the KS test has several important limitations. It only applies to continuous distributions, and it tends to be more sensitive near the center of the distribution than at the distribution's tails. Also, the distribution must be fully specified.

Given N ordered data points $Y_1, Y_2, \ldots Y_N$, the empirical distribution function is defined as $E_n = n_i/N$ where $n_i$ is the number of points less than $Y_i$ where $Y_i$ are ordered from the smallest to the largest value. This is a step function that increases by 1/N at the value of each ordered data point.

The null hypothesis is such that the data set follows a specified distribution while the alternate hypothesis is that the data set does not follow the specified distribution. The hypothesis is tested using the KS statistic defined as $$KS = \max_{1 \leq i \leq N} \left| F(Y_i) - \frac{i}{N} \right|$$

where F is the theoretical cumulative distribution of the continuous distribution being tested that must be fully specified (i.e., the location, scale, and shape parameters cannot be estimated from the data).

The hypothesis regarding the distributional form is rejected if the test statistic, KS, is greater than the critical value obtained from the table below. Notice that 0.03 to 0.05 are the most common levels of critical values (at the 1 percent, 5 percent, and 10 percent significance levels). Thus, any calculated KS statistic less than these critical values implies that the null hypothesis is not rejected and that the distribution is a good fit. There are several variations of these tables that use somewhat different scaling for the KS test statistic and critical regions. These alternative formulations should be equivalent, but it is necessary to ensure that the test statistic is calculated in a way that is consistent with how the critical values were tabulated. However, the rule of thumb is that a KS test statistic less than 0.03 or 0.05 indicates a good fit.

| Two-Tailed Alpha Level | KS Critical |
|---|---|
| 10% | 0.03858 |
| 5% | 0.04301 |
| 1% | 0.05155 |

Chi-Square Test

The Chi-Square (CS) goodness-of-fit test is applied to binned data (i.e., data put into classes) and an attractive feature of the CS test is that it can be applied to any univariate distribution for which you can calculate the cumulative distribution function. However, the values of the CS test statistic are dependent on how the data is binned and the test requires a sufficient sample size in order for the CS approximation to be valid. This test is sensitive to the choice of bins. The test can be applied to discrete distributions such as the binomial and the Poisson, while the KS test is restricted to continuous distributions.

The null hypothesis is such that the data set follows a specified distribution while the alternate hypothesis is that the data set does not follow the specified distribution. The hypothesis is tested using the CS statistic defined as $$\chi^2 = \sum_{i=1}^{k} (O_i - E_i)^2 / E_i$$

where $O_i$ is the observed frequency for bin i and $E_i$ is the expected frequency for bin i. The expected frequency is calculated by $E_i = N(F(Y_U) - F(Y_L))$, where F is the cumulative distribution function for the distribution being tested, $Y_U$ is the upper limit for class i, $Y_L$ is the lower limit for class i, and N is the sample size.

The test statistic follows a CS distribution with (k−c) degrees of freedom where k is the number of nonempty cells and c is the number of estimated parameters (including location and scale parameters and shape parameters) for the distribution+1. For example, for a three-parameter Weibull distribution, c=4. Therefore, the hypothesis that the data are from a population with the specified distribution is rejected if $\chi^2 > \chi^2(\alpha, k-c)$ where $\chi^2(\alpha, k-c)$ is the CS percent point function with k−c degrees of freedom and a significance level of ☐ Again, as the null hypothesis is such that the data follow some specified distribution, when applied to distributional fitting in Risk Simulator, a low p-value (e.g., less than 0.10, 0.05, or 0.01) indicates a bad fit (the null hypothesis is rejected) while a high p-value indicates a statistically good fit.

Chi-Squared Goodness-Of-Fit Test Sample Critical Values with Degrees of Freedom 23

| ALPHA LEVEL | CUTOFF |
|---|---|
| 10% | 32.00690 |
| 5% | 35.17246 |
| 1% | 41.63840 |

APPENDIX

Financial and Economic Calculations

Net Present Value

The net present value (NPV) method is simple and powerful: All future cash flows are discounted at the project's cost of capital and then summed. Complications include differing life spans and different rankings using IRR. The general rule is if NPV>0, accept the project; if NPV<0, reject the project; if NPV=0, you are indifferent (other qualitative variables need to be considered). The NPV is the sum of cash flows (CF) from time zero (t=0) to the final cash flow period (N) discounted as some discount rate (k), which is typically the weighted average cost of capital (WACC). Be aware that CF0 is usually a negative number as this may be an initial capital investment in the project.

$$NPV = CF_0 + \frac{CF_1}{(1+k)^1} + \frac{CF_2}{(1+k)^2} + \ldots + \frac{CF_N}{(1+k)^N} = \sum_{t=0}^{N} \frac{CF_t}{(1+k)^t}$$

$$NPV = CF_0 + \frac{CF_1}{(1+WACC)^1} + \frac{CF_2}{(1+WACC)^2} + \ldots + \frac{CF_N}{(1+WACC)^N} = \sum_{t=0}^{N} \frac{CF_t}{(1+WACC)^t}$$

NPV has a direct relationship between economic value added (EVA) and market value added (MVA). It is equal to the present value of the project's future EVA, and, hence, a positive NPV usually implies a positive EVA and MVA.

Internal Rate of Return

Internal rate of return (IRR) is the discount rate that equates the project's cost to the sum of the present cash flow of the project. That is, setting NPV=0 and solving for k in the NPV equation, where k is now called IRR. In other words, where:

$$NPV = \sum_{t=0}^{N} \frac{CF_t}{(1+IRR)^t} = 0$$

Note that there may exist multiple IRRs when the cash flow stream is erratic. Also, the IRR and NPV rankings may be dissimilar. The general rule is that when IRR>required rate of return or hurdle rate or cost of capital, accept the project. That is, if the IRR exceeds the cost of capital required to finance and pay for the project, a surplus remains after paying for the project, which is passed on to the shareholders. The NPV and IRR methods make the same accept/reject decisions for independent projects, but if projects are mutually exclusive, ranking conflicts can arise. If conflicts arise, the NPV method should be used. The NPV and IRR methods are both superior to the payback method, but NPV is superior to IRR. Conflicts may arise when the cash flow timing (most of the cash flows come in during the early years compared to later years in another project) and amounts (the cost of one project is significantly larger than another) are vastly different from one project to another. Finally, there sometimes can arise multiple IRR solutions in erratic cash flow streams such as large cash outflows occurring during or at the end of a project's life. In such situations, the NPV provides a more robust and accurate assessment of the project's value.

Modified Internal Rate of Return

The NPV method assumes that the project cash flows are reinvested at the cost of capital, whereas the IRR method assumes project cash flows are reinvested at the project's own IRR. The reinvestment rate at the cost of capital is the more correct approach in that this is the firm's opportunity cost of money (if funds were not available, then capital is raised at this cost).

The modified internal rate of return (MIRR) method is intended to overcome two IRR shortcomings by setting the cash flows to be reinvested at the cost of capital and not its own IRR, as well as preventing the occurrence of multiple IRRs, because only a single MIRR will exist for all cash flow scenarios. Also, NPV and MIRR will usually result in the same project selection when projects are of equal size (significant scale differences might still result in a conflict between MIRR and NPV ranking).

The MIRR is the discount rate that forces the present value of costs of cash outflows (COF) to be equal to the present value of the terminal value (the future value of cash inflows, or CIF, compounded at the project's cost of capital, k).

$$\sum_{t=0}^{N} \frac{COF_t}{(1+k)^t} = \sum_{t=0}^{N} \frac{CIF_t(1+k)^{n-t}}{(1+MIRR)^n}$$

$$\sum_{t=0}^{N} \frac{COF_t}{(1+WACC)^t} = \sum_{t=0}^{N} \frac{CIF_t(1+WACC)^{n-t}}{(1+MIRR)^n}$$

$$PV\ Costs = \frac{Terminal\ Value}{(1+MIRR)^n}$$

Profitability Index and Return on Investment

The profitability index (PI) is the ratio of the sum of the present value of cash flows to the initial cost of the project, which measures its relative profitability. A project is acceptable if PI>1, and the higher the PI, the higher the project ranks PI is mathematically very similar to return on investment (ROI), but it is a relative measure whereas ROI is an absolute measure. In addition, PI returns a ratio (the ratio is an absolute value, ignoring the negative investment cost) while ROI is usually described as a percentage.

$$PI = \frac{\sum_{t=1}^{N} \frac{CF_t}{(1+k)^t}}{CF_0} = \frac{Benefit}{Cost} = \frac{PV\ Cash\ Flows}{Initial\ Cost}$$

$$ROI = \frac{\sum_{t=1}^{N} \frac{CF_t}{(1+k)^t} - CF_0}{CF_0} = \frac{Benefit - Cost}{Cost} = PI - 1$$

Mathematically, NPV, IRR, MIRR, and PI should provide similar rankings although conflicts may sometimes arise, and all methods should be considered as each provides a different set of relevant information.

Payback Period

Simple but ineffective by itself, the payback period method calculates the time necessary to pay back the initial cost (i.e., a breakeven analysis). It does not take into account time valuation of money and it does not consider different life spans after the initial payback breakpoint and ignores the cost of capital. The payback period approach helps identify the project's liquidity in determining how long funds will be tied up in the project.

Payback=Year before full recovery+[unrecovered cost÷Cash Flow time $t$]

Discounted Payback Period

The discounted payback period method is similar to the payback period method but the cash flows used are in present values. This specification solves the issue of cost of capital, but the disadvantage of ignoring cash flows beyond the payback period still remains.

Discounted Payback=Year before full recovery+[unrecovered cost÷PV Cash Flow time $t$]

APPENDIX

Extreme Value Theory

Economic Capital is highly critical to banks (as well as central bankers and financial regulators who monitor banks) as it links a bank's earnings and returns on investment tied to risks that are specific to an investment portfolio, business line, or business opportunity. In addition, these measurements of Economic Capital can be aggregated into a portfolio of holdings. To model and measure Economic Capital, the concept of Value at Risk (VaR) is typically used in trying to understand how the entire financial organization is affected by the various risks of each holding as aggregated into a portfolio, after accounting for pairwise cross-correlations among various holdings. VaR measures the maximum possible loss given some predefined probability level (e.g., 99.90%) over some holding period or time horizon (e.g., 10 days). Senior management and decision makers at the bank usually select the probability or confidence interval, which reflects the board's risk appetite, or it can be based on Basel III capital requirements. Stated another way, we can define the probability level as the bank's desired probability of surviving per year. In addition, the holding period usually is chosen such that it coincides with the time period it takes to liquidate a loss position.

VaR can be computed several ways. Two main methodologies exist: structural closed-form models and Monte Carlo risk simulation approaches. We showcase both methods later in this case study, starting with the structural models. The much more powerful of the two approaches is the use of Monte Carlo risk simulation. Instead of simply correlating individual business lines or assets in the structural models, entire probability distributions can be correlated using more advanced mathematical Copulas and simulation algorithms in Monte Carlo risk simulation methods by using the Risk Simulator software. In addition, tens to hundreds of thousands of scenarios can be generated using simulation, providing a very powerful stress-testing mechanism for valuing VaR. Distributional fitting methods are applied to reduce the thousands of historical data into their appropriate probability distributions, allowing their modeling to be handled with greater ease.

There is, however, one glaring problem. Standard VaR models assume an underlying Normal Distribution. Under the normality assumption, the probability of extreme and large market movements is largely underestimated and, more specifically, the probability of any deviation beyond 4 sigma is basically zero. Unfortunately, in the real world, 4-sigma events do occur, and they certainly occur more than once every 125 years, which is the supposed frequency of a 4-sigma event (at a 99.995% confidence level) under the Normal Distribution. Even worse, the 20-sigma event corresponding to the 1987 stock crash is supposed to happen not even once in trillions of years.

The VaR failures led the Basel Committee to encourage banks to focus on rigorous stress testing that will capture extreme tail events and integrate an appropriate risk dimension in banks' risk management. For example, the Basel III framework affords a bigger role for stress testing governing capital buffers. In fact, a 20-sigma event, under the Normal Distribution, would occur once every googol, which is 1 with 100 zeroes after it, years. In 1996, the Basel Committee had already imposed a multiplier of four to deal with model error. The essential non-Normality of real financial market events suggests that such a multiplier is not enough. Following this conclusion, regulators have said VaR-based models contributed to complacency, citing the inability of advanced risk management techniques to capture tail events.

Hervé Hannoun, Deputy General Manager of the Bank for International Settlements, reported that during the crisis, VaR models "severely" underestimated the tail events and the high loss correlations under systemic stress. The VaR model has been the pillar for assessing risk in normal markets but it has not fared well in extreme stress situations. Systemic events occur far more frequently and the losses incurred during such events have been far heavier than VaR estimates have implied. At the 99% confidence level, for example, you would multiply sigma by a factor of 2.33. (Reference: "The Basel III Capital Framework: A Decisive Breakthrough," Hervé Hannoun, Deputy General Manager, Bank for International Settlements, BoJ-BIS High Level Seminar on Financial Regulatory Reform: Implications for Asia and the Pacific Hong Kong SAR, 22 Nov. 2010).

While a Normal Distribution is usable for a multitude of applications, including its use in computing the standard VaR where the Normal Distribution might be a good model near its mean or central location, it might not be a good fit to real data in the tails (extreme highs and extreme lows), and a more complex model and distribution might be needed to describe the full range of the data. If the extreme tail values (from either end of the tails) that exceed a certain threshold are collected, you can fit these extremes to a separate probability distribution. There are several probability distributions capable of modeling these extreme cases, including the Gumbel Distribution (also known as the Extreme Value Distribution Type I), the Generalized Pareto Distribution, and the Weibull Distribution. These models usually provide a good fit to extremes of complicated data.

The shapes of these distributions are similar. The Gumbel Max (Extreme Value Distribution Type I, right skew), Weibull 3, and Generalized Pareto all have a similar shape, with a right or positive skew (higher probability of a lower value, and a lower probability of a higher value). Typically, we would have potential losses listed as positive values (a potential loss of ten million dollars, for instance, would be listed as $10,000,000 losses instead of −$10,000,000 in returns) as these distributions are unidirectional. The Gumbel Min (Extreme Value Distribution Type I, left skew), however, would require negative values for losses (e.g., a potential loss of ten million dollars would be listed as −$10,000,000 instead of $10,000,000).

The probability distributions and techniques disclosed in this present invention can be used on a variety of datasets. For instance, you can use extreme value analysis on stock prices or any other macroeconomic data such as interest rates or price of oil and so forth. Typically, macroeconomic shocks (extreme shocks) can be modeled using a combination of such variables. The same approach can be applied to any time-series macroeconomic data.

The first step in extreme value analysis is to download the relevant time-series data on the selected macroeconomic variable. The second step is to determine the threshold—data above and beyond this threshold is deemed as extreme values (tail ends of the distribution)—where these data will be analyzed separately.

Then, the basic statistics and confidence intervals of an asset's historical returns are computed. As an initial test, we select the 5th percentile (−6.61%) as the threshold. That is, all stock returns at or below this −6.00% (rounded) threshold are considered potentially extreme and significant. Other approaches can also be used such as (i) running a GARCH model, where this Generalized Autoregressive Conditional Heteroskedasticity model (and its many variations) is used to model and forecast volatility of the stock returns, thereby smoothing and filtering the data to account for any autocorrelation effects; (ii) creating Q-Q quantile plots of various distributions (e.g., Gumbel, Generalized Poisson, or Weibull) and visually identifying at what point the plot asymptotically converges to the horizontal; and (iii) testing various thresholds to see at what point these extreme value distributions provide the best fit.

The filtered data where losses exceed the desired test threshold are used. Losses are listed as both negative values as well as positive (absolute) values. Then the distributional fitting results using distributional fitting routines applying the Kolmogorov-Smirnov test are run.

Negative losses fit the Gumbel Minimum Distribution the best, whereas the absolute positive losses fit the Gumbel Maximum Distribution the best. These two probability distributions are mirror images of each other and therefore using either distribution in your model would be fine. As an example, two additional sets of distributional fit on data with 4% and 7% loss thresholds, respectively, were applied. We see that the best-fitting dataset for the extreme value is at the 7% loss threshold (a higher p-value means a better fit, and a p-value of 93.71% on the 7% threshold data returns the best fit among the three). The null hypothesis tested is that the theoretically fitted distribution is the correct distribution, or that the error between the theoretical distribution tested and the empirical distribution of the data is zero, indicating a good fit. Therefore, a high p-value would allow us to not reject this null hypothesis and accept that the distribution tested is the correct distribution (any fitting errors are statistically insignificant).

We recommend using the Kolmogorov-Smirnov method as it is a nonparametric test and would be best suited for fitting extreme value tail events. You can also try the other fitting methods available in Risk Simulator's BizStats module, including Anderson-Darling, Akaike Information Criterion, Schwartz/Bayes Criterion, Kuiper's Statistics, and so forth. A GARCH model can be run on the historical macroeconomic data. See the technical section later in this disclosure for the various GARCH model specifications (e.g., GARCH, GARCH-M, TGARCH, EGARCH, GJR-GARCH, etc.). In most situations, we recommend using either GARCH or EGARCH for extreme value situations. The generated GARCH volatility results can also be charted and we can visually inspect the periods of extreme fluctuations and refer back to the data to determine what those losses are. The volatilities can also be plotted as Control Charts in order to determine at what point the volatilities are deemed statistically out of control, that is, extreme events.

As an example, if we run a simulation for 100,000 trials on both the Gumbel Minimum and Gumbel Maximum Distributions, we obtain the VaR at 99% to be a loss of −16.75% (averaged and rounded, taking into account both simulated distributions' results). Compare this −16.75% value, which accounts for extreme shocks on the losses to, say, the empirical historical value of a −11.62% loss, only accounting for a small window of actual historical returns, which may or may not include any extreme loss events. The VaR at 99.9% is computed as −21.35%. Further, as a comparison, if we assumed and used only a Normal Distribution to compute the VaR, the results would be significantly below what the extreme value stressed results should be. An example of the results from the Normal Distribution VaR, where the 99% and 99.9% VaR show a loss of −8.99% and −11.99%, respectively, a far cry from the extreme values of −16.75% and −21.35%.

Another approach to predict, model, and stress test extreme value events is to use a Jump-Diffusion Stochastic Process with a Poisson Jump Probability as discussed in the previous appendix. Such a model will require historical macroeconomic data to calibrate its inputs. For instance, using Risk Simulator's Statistical Analysis module, the historical Google stock returns were subjected to various tests and the stochastic parameters can be easily calibrated per the previous appendix's details. Stock returns were used as the first-differencing creates added stationarity to the data. The calibrated model has a 50.99% fit (small probabilities of fit are to be expected because we are dealing with real-life nonstationary data with high unpredictability). The inputs were then modeled. The results generated as an example, if we use the end of Year 1's results and set an assumption, in this case, a Normal Distribution with whatever mean and standard deviation is computed in the results, a Monte Carlo risk simulation is run and the forecast results indicate that the VaR at 99% for this holding period is a loss of −11.33%. Notice that this result is consistent with the 1% percentile (left 1% is the same as right tail 99%) of −11.62%. In normal circumstances, this stochastic process approach is valid and sufficient, but when extreme values are to be analyzed for the purposes of extreme stress testing, the underlying requirement of a Normal Distribution in stochastic process forecasting would be insufficient in estimating and modeling these extreme shocks. And simply fitting and calibrating a stochastic process based only on extreme values would also not work as well as using, say, the Extreme Value Gumbel or Generalized Poisson Distributions.

Extreme Value Distributions (Gumbel and Fréchet Distributions)

The Extreme Value Distribution (Type 1) is commonly used to describe the largest value of a response over a period of time, for example, in flood flows, rainfall, and earthquakes. Other applications include the breaking strengths of materials, construction design, and aircraft loads and tolerances. The Extreme Value Distribution is also known as the Gumbel Distribution.

The mathematical constructs for the Extreme Value Distribution are as follows:

$$f(x) = \frac{1}{\beta} z e^{-z} \text{ where } z = e^{\frac{x-\alpha}{\beta}} \text{ for } \beta > 0; \text{ and any value of } x$$

Mean $= \alpha + 0.577215\beta$

Standard Deviation $= \sqrt{\frac{1}{6}\pi^2\beta^2}$

Skewness $= \frac{12\sqrt{6}\,(1.2020569)}{\pi^3} = 1.13955$ (this applies for all values of mode and scale)

Excess Kurtosis = 5.4

(this applies for all values of mode and scale)

Mode ($\alpha$) and scale ($\beta$) are the distributional parameters.

There are two standard parameters for the Extreme Value Distribution: mode and scale. The mode parameter is the most likely value for the variable (the highest point on the probability distribution). After you select the mode parameter, you can estimate the scale parameter. The scale parameter is a number greater than 0. The larger the scale parameter, the greater the variance.

The Gumbel Maximum Distribution has a symmetrical counterpart, the Gumbel Minimum Distribution. Both are available in Risk Simulator. These two distributions are mirror images of each other where their respective standard deviations and kurtosis are identical, but the Gumbel Maximum is skewed to the right (positive skew), with a higher probability on the left and lower probability on the right, as compared to the Gumbel Minimum, where the distribution is skewed to the left (negative skew). Their respective first moments are also mirror images of each other along the scale ($\beta$) parameter.

Input Requirements:

Mode Alpha can be any value.

Scale Beta>0.

In addition, another extreme value distribution is the Fréchet distribution (Type II), commonly used to describe the largest value of a response over a period of time, for example, in flood flows, rainfall, and earthquakes. Other applications include the breaking strengths of materials, construction design, and aircraft loads and tolerances. The extreme value distribution is also known as the Generalized Pareto distribution. The maximum extreme value distribution is positively skewed, with a higher probability of lower values and lower probability of higher extreme values. This distribution is the mirror reflection of the minimum extreme value distribution at the mode. Shape ($\alpha$) and scale ($\beta$) are the distributional parameters.

Input Requirements:

Shape Alpha can be anything.

Scale Beta>0.

Location can be anything.

Generalized Pareto Distribution

The Generalized Pareto Distribution is often used to model the tails of another distribution.

The mathematical constructs for the Extreme Value Distribution are as follows:

$$f(x) = \frac{1}{\sigma}\left[1 + \frac{\varepsilon(x-\mu)}{\sigma}\right] \exp\left(-\frac{1}{\varepsilon} - 1\right) \text{ for all nonzero } \varepsilon \text{ else}$$

$$f(x) = \frac{1}{\sigma} \exp\left(\frac{-(x-\mu)}{\sigma}\right)$$

Mean $= \mu + \frac{\sigma}{1-\varepsilon}$ if $\varepsilon < 1$

Standard Deviation $= \sqrt{\frac{\sigma^2}{(1-\varepsilon)^2(1-2\varepsilon)}}$ if $\varepsilon < 0.5$ Location($\mu$), scale($\sigma$), -continued and shape(ε)are the distributional parameters.

Input requirements

Location Mu can be any value.

Scale Sigma > 0.

Shape Epsilon can be any value. ε<0 would create a long-tailed distribution with no upper limit, whereas ε>0 would generate a short-tailed distribution with a smaller variance and thicker right tail, where $\mu \leq x < \infty$. If Shape Epsilon and Location Mu are both zero, then the distribution reverts to the Exponential Distribution. If the Shape Epsilon is positive and Location Mu is exactly the ratio of Scale Sigma to Shape Epsilon, we have the regular Pareto Distribution. The Location Mu is sometimes also known as the threshold parameter.

Distributions whose tails decrease exponentially, such as the Normal Distribution, lead to a Generalized Pareto Distribution's Shape Epsilon parameter of zero. Distributions whose tails decrease as a polynomial, such as Student's T Distribution, lead to a positive Shape Epsilon parameter. Finally, distributions whose tails are finite, such as the Beta Distribution, lead to a negative Shape Epsilon parameter.

CLOSING SUMMARY

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, C#.NET, Visual Basic, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of Web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computerized method for integrating risk management methodologies, risk modeling, and risk analytics into a computing device, the method comprising:

generating a user interface on a display of a computing device, said user interface comprising a plurality of user-selectable risk tabs comprising: (1) a credit risk tab, (2) a market risk tab, and (3) an operational risk tab, wherein selection of said credit risk tab causes a processor of said computing device to generate a drop down list of selectable credit loan types comprising: (1) residential mortgages, (2) revolving credit, (3) other miscellaneous credit, and (4) wholesale corporate and sovereign debt, wherein each credit loan type has an associated risk model that automatically calculates a credit risk for said credit loan type, receiving a selected credit loan type;

receiving historical data for said credit loan type;

automatically mapping by the processor said historical data to a plurality of variables required for calculating a credit risk for said credit loan type, wherein said variables comprise: credit issue data, customer information, product type, central bank ratings, amount of the loan, interest payment, principal payment, and last payment date;

receiving a credit value at risk (VaR) percentile as input in said interface;

automatically calculating and automatically reporting by the processor a value at risk (VaR) based, at least in part, on said VaR percentile;

automatically calculating and reporting by the processor said credit risk using the model corresponding to said credit loan type, wherein said credit risk is reported using Key Risk Indicators (KRI) that include Probability of Default (PD), Loss Given Default (LGD), Exposure at Default (EAD), and Expected Losses (EL), and wherein said credit risk comprises: (1) a probability of default (PD) that is based, at least in part, on a percentage of defaults for said credit type over a specified period, (2) a loss given default (LGD) which is a percentage of losses of loans that cannot be recovered in the event of default over said period, (3) an exposure at default (EAD) which is the total amount of loans outstanding over said period, (4) expected losses (EL) which is the product of PD, LGD, and EAD, and (5) required economic capital based on Basel II and Basel III requirements, and automatically create a repository of historical and forward-looking KRI results, and automatically plots and displays one or more graphs showing past or forecast changes in KRI over time.

2. The computerized method of claim 1, wherein selection of said market risk tab causes said processor to generate a market risk user interface on said display, said market risk user interface comprising a market data tab, a value at risk (VaR) tab, a central bank VaR tab, and a Results Visual tab that is configured to automatically display the results, wherein said market risk user interface is configured to receive inputted data comprising:
  a number of investment assets and currency assets held in a portfolio;
a current balance for each asset and currency entered, wherein an asset position is calculated for each of said investment and currency assets by multiplying the number of each asset by the current balance for the respective asset;
a total number of historical data points that are used to automatically perform a market risk analysis;
  a volatility calculation method;
  and said computerized method further comprises the steps of:
automatically calculating and automatically reporting a market value at risk (market VaR) by multiplying at least one of said asset positions by: (1) a result of said volatility calculation method, (2) an inverse standard normal distribution of said market VaR percentile, and (3) the square root of a time horizon in days for holding said investment and currency assets; and
  providing an update option for automatically recalculating said market value at risk (VaR).

3. The computerized method of claim 1, wherein said user interface further comprises an advanced analytics tab,
  wherein selection of said advanced analytics tab causes said processor to generate a key risk indicator (KRI) tab, a scenarios tab, a risk simulation tab,
  wherein selection of said KM tab causes said processor to generate a KRI dashboard comprising a plurality of automatically generated key risk indicator charts.

4. The computerized method of claim 3, wherein selection of said scenarios tab causes said processor to generate a scenario builder interface, wherein said scenario builder interface provides an option to run interest rate scenarios to automatically calculate an effect of simulated interest rate changes on a set of assets and liabilities, and a second option to run a net interest margin analysis to automatically determine the effect of changed interest rates on net interest margin, wherein said scenario builder interface is configured to automatically receive a plurality of parameters that define different interest rate scenarios, said parameters comprising a range of basis points and a step size, such that the effects of said interest rate changes at each step are automatically calculated and the automatically generated results are automatically displayed in said scenario builder interface.

5. The computerized method of claim 4, wherein each of said automatically generated results is automatically displayed in a color that corresponds to a predetermined value condition satisfied by said result.

6. The computerized method of claim 3, wherein selection of said risk simulation tab causes said processor to generate a risk simulation interface configured to receive:
  a starting asset portfolio value,
  a portfolio holding period in years,
asset information for each asset in said portfolio, wherein individual asset information comprises:
  an asset name,
  historical returns for the asset,
  asset volatility,
  current asset allocation weight,
  minimum and maximum allocation weight,
  correlation between asset pairs,
wherein, said risk simulation interface provides an option for automatically running a monte carlo simulation on said portfolio value, based at least in part, on said portfolio holding period and said asset information.

7. A computerized method for integrating risk management methodologies, risk modeling, and risk analytics into a computing device, wherein the method generates a user interface on a display of a computing device, said user interface comprising a plurality of user-selectable risk tabs comprising an asset liability management (ALM) tab, wherein selection of said asset liability management (ALM) tab causes said processor to generate an ALM user interface on said display, said ALM user interface comprising an interest rate risk tab and a liquidity risk tab, wherein selection of said interest rate risk tab automatically generates an input assumptions tab, a gap analysis tab, an economic value of equity tab, and a net income margin tab, wherein selection of said input assumptions tab generates a settings tab, a rate sensitive assets & liabilities tab, and a historical interest rates tab, wherein selection of said settings tab generates an ALM user interface configured to receive inputted data comprising:
  a bank regulatory capital requirement, which is a multiple of capital needed to avoid insolvency at a specified degree of probability;
  a number of trading days in the current calendar year;
  a local currency;
  a time period for performing an ALM analysis;
  a number of Value at Risk (VaR) percentiles to run;
  a number of scenarios to run;
  a basis point sensitivity for each scenario; and
  foreign currencies held in an investment portfolio;
  wherein selection of said rate sensitive assets & liabilities tab causes said processor to generate a table for receiving asset and liability data;
  wherein selection of said historical interest rates tab causes said processor to generate a table for receiving historical interest rate data;
  wherein selection of said gap analysis tab causes said processor to generate gap analysis results based on: (1) the inputted data received in said ALM interface, (2) the asset and liability data, and (3) the historical interest rate data, wherein said gap analysis results are automatically generated for said local currency and any inputted foreign currencies;
  wherein selection of said economic value of equity tab causes said processor to automatically generate a chart that indicates an impact on regulatory capital requirements based on interest rate risks defined by said gap analysis results;
  wherein selection of said net income margin tab causes said processor to generate a second input assumptions tab and a net income margin (NIM) results tab, wherein selection of said second input assumptions tab automatically generates a table configured to receive inputted data required to automatically calculate a net income margin (NIM);

wherein selection of said NIM results tab causes said processor to automatically generate a chart that shows a net interest income impact based on automatically simulated changes in interest rates, as determined by a specified increase in basis points;

wherein selection of said liquidity risk tab causes said processor to generate a third input assumptions tab, a scenario analysis tab, a stress testing tab, a gap analysis tab, and a charts tab, wherein selection of said third input assumptions tab automatically generates a table for receiving cash flows and historical monthly balances for different classes of assets and liabilities;

wherein selection of said scenario analysis tab causes said processor to generate a user interface configured to receive different scenarios for automatically testing how said assets and liabilities respond to changes in interest rates;

wherein selection of said stress testing tab generates a table that automatically shows fluctuations in said liabilities in response to extreme conditions where deposits are reduced to a lower limit, wherein said lower limit can be entered as a value or percentage change from a base case;

wherein selection of said gap analysis tab causes said processor to generate a table that shows results of the automatic testing of any previously entered scenarios and automatically generated fluctuation displays of entered stress test conditions, wherein a gap is the difference between monthly assets and liabilities;

wherein selection of said analytical models tab causes said processor to generate a structural tab, a time series tab, a portfolio tab, and an analytics tab, wherein selection of the structural models tab causes said processor to generate a user interface for selecting an analysis category, wherein each analysis category has one or more associated mathematical models that may be selected for use in automatically performing calculations as part of the analysis denoted by said analysis category;

wherein, the user selects a number of times the selected model is automatically computed and the degree of precision of the automated results.

8. A system configured to perform financial risk analytics and provide financial risk awareness, said system comprising:

at least one non-transitory computer-readable storage medium on which a plurality of credit risk models are stored;

a sub-system configured to generate at least one graphical user interface (GUI) for automatic display on a computer-based visual sub-system, said GUI comprising a plurality of user-selectable risk tabs comprising: (1) a credit risk tab, (2) a market risk tab, and (3) an operational risk tab;

at least one sub-system configured to receive input from a user in the form of a selection of one of said user-selectable risk tabs and other input configured by a user in said interactive GUI, wherein said other input includes:

a credit value at risk (VaR) percentile;

a computer machine configured to:
receive said selection of one of said user-selectable tabs as computer machine input;

wherein selection of said credit risk tab causes said GUI sub-system to generate a drop down list of selectable credit loan types comprising: (1) residential mortgages, (2) revolving credit, (3) other miscellaneous credit, and (4) wholesale corporate and sovereign debt, wherein each credit loan type has an associated credit risk model stored in said non-transitory computer-readable storage medium that is used to automatically calculate a credit risk for said credit loan type, receive a selected credit loan type;

automatically receive or automatically request historical data for said credit loan type from at least one of: a remote server, a selected file stored in said non-transitory computer-readable storage medium, and manual entry of said historical data using said user GUI;

automatically map said historical data to a plurality of variables required for calculating said credit risk for said credit loan type, wherein said variables comprise: credit issue data, customer information, product type, central bank ratings, loan amount, interest payment, principal payment, and last payment date;

automatically calculate and automatically report a value at risk (VaR) based, at least in part, on said VaR percentile;

automatically calculate and report said credit risk based, at least in part, on the model corresponding to said credit loan type, wherein said credit risk is reported using Key Risk Indicators (KRI) that include Probability of Default (PD), Loss Given Default (LGD), Exposure at Default (EAD), and Expected Losses (EL), and wherein said credit risk comprises: (1) a probability of default (PD) that is based, at least in part, on a percentage of defaults for said credit type over a specified period, (2) a loss given default (LGD) which is a percentage of losses of loans that cannot be recovered in the event of default over said period, (3) an exposure at default (EAD) which is the total amount of loans outstanding over said period, (4) expected losses (EL) which is the product of PD, LGD, and EAD, and (5) required economic capital based on Basel II and Basel III requirements, and automatically create a repository of historical and forward-looking KRI results, and automatically plots and displays one or more graphs showing past or forecast changes in KRI over time.

9. A system configured to perform financial risk analytics and provide financial risk awareness, said system comprising:

a processor;
a memory;
a display;
a non-transitory computer-readable storage medium on which a plurality of credit risk models are stored and accessed by said processor;
a network communications device;
computer readable instructions residing in said memory, wherein said instructions are configured to:
generate a user interface on said display, said user interface comprising a plurality of user-selectable risk tabs comprising: (1) a credit risk tab, (2) a market risk tab, and (3) an operational risk tab, wherein selection of said credit risk tab causes said processor to generate a drop down list of selectable credit loan types comprising: (1) residential mortgages, (2) revolving credit, (3) other miscellaneous credit, and (4) wholesale corporate and sovereign debt, wherein each credit loan type has an associated credit risk model stored in said non-transitory computer-readable storage medium that is used to automatically calculate a credit risk for said credit loan type, receive a selected credit loan type;

automatically receive or automatically request historical data for said credit loan type from at least one of: a remote server using said network communications device, a selected file stored in said non-transitory computer-readable storage medium, and manual entry of said historical data using said user interface;

automatically map said historical data to a plurality of variables required for calculating said credit risk for said credit loan type, wherein said variables comprise: credit issue data, customer information, product type, central bank ratings, loan amount, interest payment, principal payment, and last payment date;

receive a credit value at risk (VaR) percentile as input in said interface;

automatically calculate and automatically report a value at risk (VaR) based, at least in part, on said VaR percentile;

automatically calculate and automatically report said credit risk based, at least in part, on the model corresponding to said credit loan type, wherein said credit risk is reported using Key Risk Indicators (KRI) that include Probability of Default (PD), Loss Given Default (LGD), Exposure at Default (EAD), and Expected Losses (EL), and wherein said credit risk comprises: (1) a probability of default (PD) that is based, at least in part, on a percentage of defaults for said credit type over a specified period, (2) a loss given default (LGD) which is a percentage of losses of loans that cannot be recovered in the event of default over said period, (3) an exposure at default (EAD) which is the total amount of loans outstanding over said period, (4) expected losses (EL) which is the product of PD, LGD, and EAD, and (5) required economic capital based on Basel II and Basel III requirements, and automatically create a repository of historical and forward-looking KRI results, and automatically plots and displays one or more graphs showing past or forecast changes in KRI over time.

10. A computer-implemented system for providing a user with a set of interoperable functions and options facilitating the structured data input and analysis of credit, market, operational, business, and liquidity risk, comprising:

an Asset Liability Management, Credit, Market, Operational, and Liquidity Risk (ALM-CMOL) module comprising physical memory storing instructions that cause the ALM-CMOL module to:

provide a user, via said ALM-CMOL module, a user interface for integrated risk modeling, evaluation of options, and analysis of Asset Liability Management, Credit, Market, Operational, and Liquidity risk;

present said user with a plurality of integrated risk modeling and analysis methodologies comprising quantitative models, Monte Carlo risk simulations, credit models, business statistical models, portfolio optimization, wherein said integrated risk modeling and analysis methodologies are applied to automatically model and automatically quantify Regulatory Capital, Key Risk Indicators (KRI), Probability of Default (PD), Exposure at Default (EAD), Loss Given Default (LGD), Liquidity Ratios, Value at Risk (VaR), and Operational Risk, wherein said user interface comprises four rows of functions, the first row comprising a plurality of user selectable primary modes, including: Credit Risk mode, Market Risk mode, Asset Liability Management mode, Analytical Models mode, Advanced Analytics mode, and Operational Risk mode, wherein selecting a primary mode automatically populates a second row with user selectable functions associated with the selected primary mode, where each of said second row functions is either a primary option tab or a secondary mode, wherein selecting a secondary mode automatically populates a third row with user selectable functions associated with the selected secondary mode, where each of said third row functions is either a secondary option tab or a tertiary mode, wherein selecting a tertiary mode automatically populates a fourth row with user selectable functions associated with the selected tertiary mode, where each of said fourth row functions is a tertiary option tab, wherein said Credit Risk mode is configured to automatically perform a Credit Risk analysis using a combination of inputted historical loan data and credit risk parameters to automatically calculate Probability of Default (PD), Exposure at Default (EAD), Expected Losses (EL), Economic Capital (EC), and Regulatory Capital (RC), wherein said Market Risk mode is configured to automatically perform a Market Risk analysis using a combination of inputted historical asset data and market risk parameters to automatically calculate and automatically report the Market Value at Risk (VaR) over a time series, wherein said Asset Liability Management mode is configured to automatically perform an Asset Liability Risk analysis to automatically quantify and manage risks arising from mismatches between a set of inputted assets and liabilities in a portfolio, where said Asset Liability Management mode comprises an Interest Rate Risk secondary mode for automatically calculating the effect of interest rate risk on said portfolio, said Asset Liability Management mode comprising a Gap Analysis, Economic Value of Equity analysis, Net Income Margin (NIM) analysis, and a Liquidity Risk secondary mode for automatically calculating the fluctuations in assets and liabilities and the impact of said fluctuations on the asset-liability management balance of a portfolio of said assets and liabilities, and wherein said Asset Liability Management mode is configured to display an automatically generated yield curve and its numerical interest rates, and to display in the effects of interest rate fluctuations on the Asset Liability Management (ALM) Interest Rate model and Net Interest Margin (NIM) models in an automatically generated results area, wherein said Analytical Models mode is configured to automatically analyze historical performance levels and automatically forecast simulated performance of a set of inputted historical performance data elements using a plurality of Analytical Model categories comprising Structural, Time Series, Portfolio, and Analytics categories, wherein said Advanced Analytics mode is configured to automatically:

calculate Economic Capital (EC) and Economic Regulatory Capital (ERC) requirements for said historical performance data elements using Monte Carlo risk simulation, historical bootstrap simulation, and scenario analysis;

optimize investment allocation weights and minimize the Value at Risk (VaR) for a set of said historical performance data elements, where said historical performance data elements comprise a portfolio of assets and liabilities;

simulate the effect of extreme market events on said historical performance data elements using Monte Carlo risk simulations to calculate the Value at Risk (VaR) and best-fitting extreme value distributions;

calculate the effects of interest rate fluctuations by modeling interest rate yield curves using said historical performance data elements;

wherein said Operational Risk mode is configured to automatically perform an Operational Risk analysis for a set of inputted historical or current operational risk events selected from a group of operational risk categories consisting of litigation risks, security risks, reputation risks, fraud risks, information technology risks, staffing risks, human resource risks, and development risks, wherein all entered and automatically calculated operational risk events are automatically reported, summarized and displayed by monthly or yearly periods aggregated by risk segments and counts, and wherein said operational risk events are automatically charted and displayed as control charts that show specific risk events as in- or out-of-control, wherein said Operational Risk analysis comprises: automatically calculating the probability of occurrence for each of said operational risk events using probability density and cumulative distribution functions; automatically analyzing said set of operational risk events using control charts to automatically determine whether each of said risk events are in or out of control; and automatically calculating the expected simulated losses for said set of operational risk events using Monte Carlo risk simulations and probabilistic loss distributions, wherein said user interface further comprises a Data Prep function within one of said primary modes, which automatically analyzes one or more user-inputted standard financial statements and automatically generates a set of values and parameters corresponding to the required inputs of one or more of said Credit Risk Analysis, Market Risk Analysis, and Asset Liability Risk Analysis modes, and wherein the user interface automatically creates a repository of historical and forward-looking KM results comprising Value at Risk (VaR), Loss Given Default (LGD), Exposure at Default (EAD), Economic Capital (EC), and Economic Regulatory Capital (ERC), and automatically plots and displays one or more graphs showing past or forecast changes in KM over time.

11. The computer-implemented method of claim 10, wherein the automatically created KRI results are shown in heat map matrixes that are automatically displayed as a KM heat map and plotted in time-series charts to show said KM levels over time; and wherein the heat map comprises one or more risks type and periodicity based on a plurality of historical performance levels and based on stress-tested, scenario-based, simulated future forecast levels; and wherein said heat map is color coded to show a plurality of historical performance levels.

12. The computer-implemented method of claim 11, wherein the ALM-CMOL module is configured to automatically perform historical performance mapping and automatically display results that show how each of one or more historical performance data elements affects each risk type.

13. A computer-implemented method for providing a user with a set of interoperable functions and options facilitating the structured data input and analysis of credit, market, operational, business, and liquidity risk, comprising the steps of:

providing a user with an Asset Liability Management, Credit, Market, Operational, and Liquidity Risk (ALM-CMOL) module comprising physical memory storing instructions that cause the ALM-CMOL module to:

provide said user, via said ALM-CMOL module, a user interface for integrated risk modeling, evaluation of options, and analysis of Asset Liability Management, Credit, Market, Operational, and Liquidity risk;

present said user with a plurality of integrated risk modeling and analysis methodologies comprising quantitative models, Monte Carlo risk simulations, credit models, business statistical models, portfolio optimization, wherein said integrated risk modeling and analysis methodologies are applied to automatically model and automatically quantify Regulatory Capital, Key Risk Indicators (KRI), Probability of Default (PD), Exposure at Default (EAD), Loss Given Default (LGD), Liquidity Ratios, Value at Risk (VaR), and Operational Risk, wherein said user interface comprises four rows of functions, the first row comprising a plurality of user selectable primary modes, including: Credit Risk mode, Market Risk mode, Asset Liability Management mode, Analytical Models mode, Advanced Analytics mode, and Operational Risk mode, wherein selecting a primary mode automatically populates a second row with user selectable functions associated with the selected primary mode, where each of said second row functions is either a primary option tab or a secondary mode, wherein selecting a secondary mode automatically populates a third row with user selectable functions associated with the selected secondary mode, where each of said third row functions is either a secondary option tab or a tertiary mode, wherein selecting a tertiary mode automatically populates a fourth row with user selectable functions associated with the selected tertiary mode, where each of said fourth row functions is a tertiary option tab, wherein said Credit Risk mode is configured to automatically perform a Credit Risk analysis using a combination of inputted historical loan data and credit risk parameters to automatically calculate Probability of Default (PD), Exposure at Default (EAD), Expected Losses (EL), Economic Capital (EC), and Regulatory Capital (RC), wherein said Market Risk mode is configured to automatically perform a Market Risk analysis using a combination of inputted historical asset data and market risk parameters to automatically calculate and automatically report the Market Value at Risk (VaR) over a time series, wherein said Asset Liability Management mode is configured to automatically perform an Asset Liability Risk analysis to automatically quantify and manage risks arising from mismatches between a set of inputted assets and liabilities in a portfolio, where said Asset Liability Management mode comprises an Interest Rate Risk secondary mode for automatically calculating the effect of interest rate risk on said portfolio, said Asset Liability Management mode comprising a Gap Analysis, Economic Value of Equity analysis, Net Income Margin analysis, and a Liquidity Risk secondary mode for automatically calculating the fluctuations in assets and liabilities and the impact of said fluctuations on the asset-liability management balance of a portfolio of said assets and liabilities, wherein said Analytical Models mode is configured to automatically analyze historical performance levels and automatically forecast simulated performance of a set of inputted historical performance data elements using a plurality of Analytical Model categories comprising Structural, Time Series, Portfolio, and Analytics categories, wherein said Advanced Analytics mode is configured to automatically:

calculate Economic Capital (EC) and Economic Regulatory Capital (ERC) requirements for said historical performance data elements using Monte Carlo risk simulation, historical bootstrap simulation, and scenario analysis;

optimize investment allocation weights and minimize the Value at Risk (VaR) for a set of said historical performance data elements, where said historical performance data elements comprise a portfolio of assets and liabilities;

simulate the effect of extreme market events on said historical performance data elements using Monte Carlo risk simulations to calculate the Value at Risk (VaR) and best-fitting extreme value distributions;

calculate the effects of interest rate fluctuations by modeling interest rate yield curves using said historical performance data elements;

wherein said Operational Risk mode is configured to automatically perform an Operational Risk analysis for a set of inputted historical or current operational risk events selected from a group of operational risk categories consisting of litigation risks, security risks, reputation risks, fraud risks, information technology risks, staffing risks, human resource risks, and development risks, wherein all entered and automatically calculated operational risk events are automatically reported, summarized and displayed by monthly or yearly periods aggregated by risk segments and counts, and wherein said operational risk events are automatically charted and displayed as control charts that show specific risk events as in- or out-of-control, wherein said Operational Risk analysis comprises: automatically calculating the probability of occurrence for each of said operational risk events using probability density and cumulative distribution functions; automatically analyzing said set of operational risk events using control charts to determine whether each of said risk events are in or out of control; and automatically calculating the expected simulated losses for said set of operational risk events using Monte Carlo risk simulations and probabilistic loss distributions, wherein said user interface further comprises a Data Prep function within one of said primary modes, which automatically analyzes one or more user-inputted standard financial statements and automatically generates a set of values and parameters corresponding to the required inputs of one or more of said Credit Risk Analysis, Market Risk Analysis, and Asset Liability Risk Analysis modes, and wherein the user interface automatically creates a repository of historical and forward-looking KRI results comprising Value at Risk (VaR), Loss Given Default (LGD), Exposure at Default (EAD), Economic Capital (EC), and Economic Regulatory Capital (ERC), and automatically plots and displays one or more graphs showing past or forecast changes in KRI over time.

* * * * *